United States Patent
Olarig et al.

(10) Patent No.: US 11,947,826 B2
(45) Date of Patent: *Apr. 2, 2024

(54) METHOD FOR ACCELERATING IMAGE STORING AND RETRIEVING DIFFERENTIAL LATENCY STORAGE DEVICES BASED ON ACCESS RATES

(71) Applicant: Samsung Electronics Co., Ltd., Suwon-si (KR)

(72) Inventors: Sompong Paul Olarig, Pleasanton, CA (US); William David Schwaderer, Sparks, NV (US); Chandranil Chakraborttii, San Francisco, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,128

(22) Filed: Aug. 18, 2022

(65) Prior Publication Data

US 2022/0391123 A1 Dec. 8, 2022

Related U.S. Application Data

(63) Continuation of application No. 16/708,429, filed on Dec. 9, 2019, now Pat. No. 11,449,256, which is a (Continued)

(51) Int. Cl.
*G06F 12/00* (2006.01)
*G06F 3/06* (2006.01)
(Continued)

(52) U.S. Cl.
CPC .......... *G06F 3/0647* (2013.01); *G06F 3/0611* (2013.01); *G06F 3/0679* (2013.01);
(Continued)

(58) Field of Classification Search
CPC .... G06F 16/538; G06F 16/583; G06F 3/0611; G06F 3/0647; G06F 3/0679; G06F 3/0683
See application file for complete search history.

(56) References Cited

U.S. PATENT DOCUMENTS 8,468,244 B2 6/2013 Redlich et al.
8,874,835 B1 10/2014 Davis et al.
(Continued)

FOREIGN PATENT DOCUMENTS

JP 2006235960 A 9/2006
JP 5723812 B2 5/2015
(Continued)

OTHER PUBLICATIONS

Advisory Action for U.S. Appl. No. 16/708,429, dated Apr. 22, 2022.
(Continued)

*Primary Examiner* — Yong J Choe
(74) *Attorney, Agent, or Firm* — Renaissance IP Law Group LLP

(57) ABSTRACT

A storage system is described. The storage system may include a plurality of storage tiers, each including at least one storage device, each storage device including storage and a controller. Metadata storage may store metadata for an image stored in the plurality of storage tiers, which includes a location in the plurality of storage tiers where the image is stored. A receiver may receive a request to access the image from a host. Retrieval software, executed by a processor, may retrieve the image from the plurality of storage tiers using the location where the image is stored. A transmitter may transmit the image to the host.

17 Claims, 32 Drawing Sheets

Related U.S. Application Data continuation-in-part of application No. 16/056,515, filed on Aug. 6, 2018, now Pat. No. 10,949,087.

(60) Provisional application No. 62/927,672, filed on Oct. 29, 2019, provisional application No. 62/672,043, filed on May 15, 2018.

(51) Int. Cl.
*G06F 16/538* (2019.01)
*G06F 16/583* (2019.01)

(52) U.S. Cl.
CPC .......... *G06F 3/0683* (2013.01); *G06F 16/538* (2019.01); *G06F 16/583* (2019.01)

(56) References Cited

U.S. PATENT DOCUMENTS

| | | | |
|---|---|---|---|
| 9,025,868 B2 | 5/2015 | Gurbuz | |
| 9,706,111 B2 | 7/2017 | Saad et al. | |
| 9,826,231 B2 | 11/2017 | Gamei et al. | |
| 9,854,241 B2 | 12/2017 | Rosewarne et al. | |
| 9,883,187 B2 | 1/2018 | Tu et al. | |
| 10,225,511 B1 | 3/2019 | Lim et al. | |
| 2008/0199084 A1 | 8/2008 | Kasahara | |
| 2008/0199085 A1 | 8/2008 | Kasai et al. | |
| 2012/0191900 A1 | 7/2012 | Kunimatsu et al. | |
| 2012/0201476 A1 | 8/2012 | Carmel et al. | |
| 2015/0146976 A1 | 5/2015 | Ma et al. | |
| 2015/0172616 A1 | 6/2015 | Ye et al. | |
| 2016/0099810 A1 | 4/2016 | Li et al. | |
| 2016/0182913 A1 | 6/2016 | Joshi et al. | |
| 2017/0127090 A1 | 5/2017 | Rosewarne et al. | |
| 2017/0188000 A1 | 6/2017 | Rosewarne et al. | |
| 2019/0034734 A1 | 1/2019 | Yen et al. | |
| 2019/0043201 A1 | 2/2019 | Strong et al. | |
| 2019/0356940 A1 | 11/2019 | Mallett | |
| 2021/0166733 A1* | 6/2021 | Miwa | H04N 5/77 |

FOREIGN PATENT DOCUMENTS

| | | |
|---|---|---|
| WO | 2012020544 A1 | 2/2012 |
| WO | 2015005634 A1 | 1/2015 |
| WO | 2016057960 A1 | 4/2016 |

OTHER PUBLICATIONS

Final Office Action for U.S. Appl. No. 16/056,515, dated Aug. 17, 2020.

Final Office Action for U.S. Appl. No. 16/708,429, dated Jan. 21, 2022.

Lin, Chin-Teng, et al., "An HVS-Directed Neural-Network-Based Image Resolution Enhancement Scheme for Image Resizing," IEEE Transactions on Fuzzy Systems, vol. 15, No. 4, Aug. 2007, pp. 605-615.

Notice of Allowance for U.S. Appl. No. 16/056,515, dated Nov. 12, 2020.

Notice of Allowance for U.S. Appl. No. 16/708,429, dated May 16, 2022.

Office Action for U.S. Appl. No. 16/056,515, dated Feb. 21, 2020.
Office Action for U.S. Appl. No. 16/708,429, dated Jul. 7, 2021.
Wu, Chin-Hsien, et al., "An Efficient B-Tree Layer for Flash-Memory Storage Systems," ACM Transactions on Embedded Computing Systems 6(3), Jul. 2007, 20 pages.

* cited by examiner

METHOD FOR ACCELERATING IMAGE STORING AND RETRIEVING DIFFERENTIAL LATENCY STORAGE DEVICES BASED ON ACCESS RATES

RELATED APPLICATION DATA

This application is a continuation of U.S. patent application Ser. No. 16/708,429, filed Dec. 9, 2019, which is a continuation-in-part of U.S. patent application Ser. No. 16/056,515, filed Aug. 6, 2018, now U.S. Pat. No. 10,949,087, issued Mar. 16, 2021, which claims the benefit of U.S. Provisional Patent Application Ser. No. 62/672,043, filed May 15, 2018, both of which are incorporated by reference herein for all purposes.

This application is a continuation of U.S. patent application Ser. No. 16/708,429, filed Dec. 9, 2019, which claims the benefit of U.S. Provisional Patent Application Ser. No. 62/927,672, filed Oct. 29, 2019, which is incorporated by reference herein for all purposes.

FIELD

The inventive concepts relate generally to storage devices, and more particularly to managing storage of image files in across multiple storage tiers.

BACKGROUND

Computing systems increasingly store images for a variety of applications. Such images consume significant storage. Since a variety of applications access images for different purposes, storage systems store the images in a variety of resolutions, complicating storage administration procedures and application development/processing.

Chroma Subsampling is a mechanism for encoding visual information that exploits human vision characteristics that favor image luma (brightness) information over color (Chroma) information. Specifically, to perform Chroma Subsampling, it is necessary to separate image luma (black and white image) information from Chroma (color) information, after which an image may be stored using only particular color or luma subsamples, to reduce image storage size.

Conventional systems leave file management up to each application that uses the image file. This approach may result in multiple copies of the same file, at the same resolution and same Chroma Subsampling rate, being stored on the storage devices (in different locations selected by different applications). Further, this process may result in generating many images that are related (in that they are derived from the same original image) but only differ in resolution or Chroma Subsampling method. This approach may also make it difficult for an application to locate a particular image file: the application might have to scan the entire file system to locate a file with the desired resolution/Chroma Subsampling rate, assuming the application takes the time to search for any potentially existing copy of the file at the desired resolution/Chroma Subsampling rate. This problem is exacerbated when there is more than one storage device offered: the application might have to search every storage device to find a copy of the file with a desired property (such as a particular resolution or Chroma Subsampling rate).

A need remains for a way to classify each image with a probability of being accessed so the images may be stored in appropriate storage devices to achieve more optimal Total Cost of Ownership (TCO).

DETAILED DESCRIPTION

Figure 1:
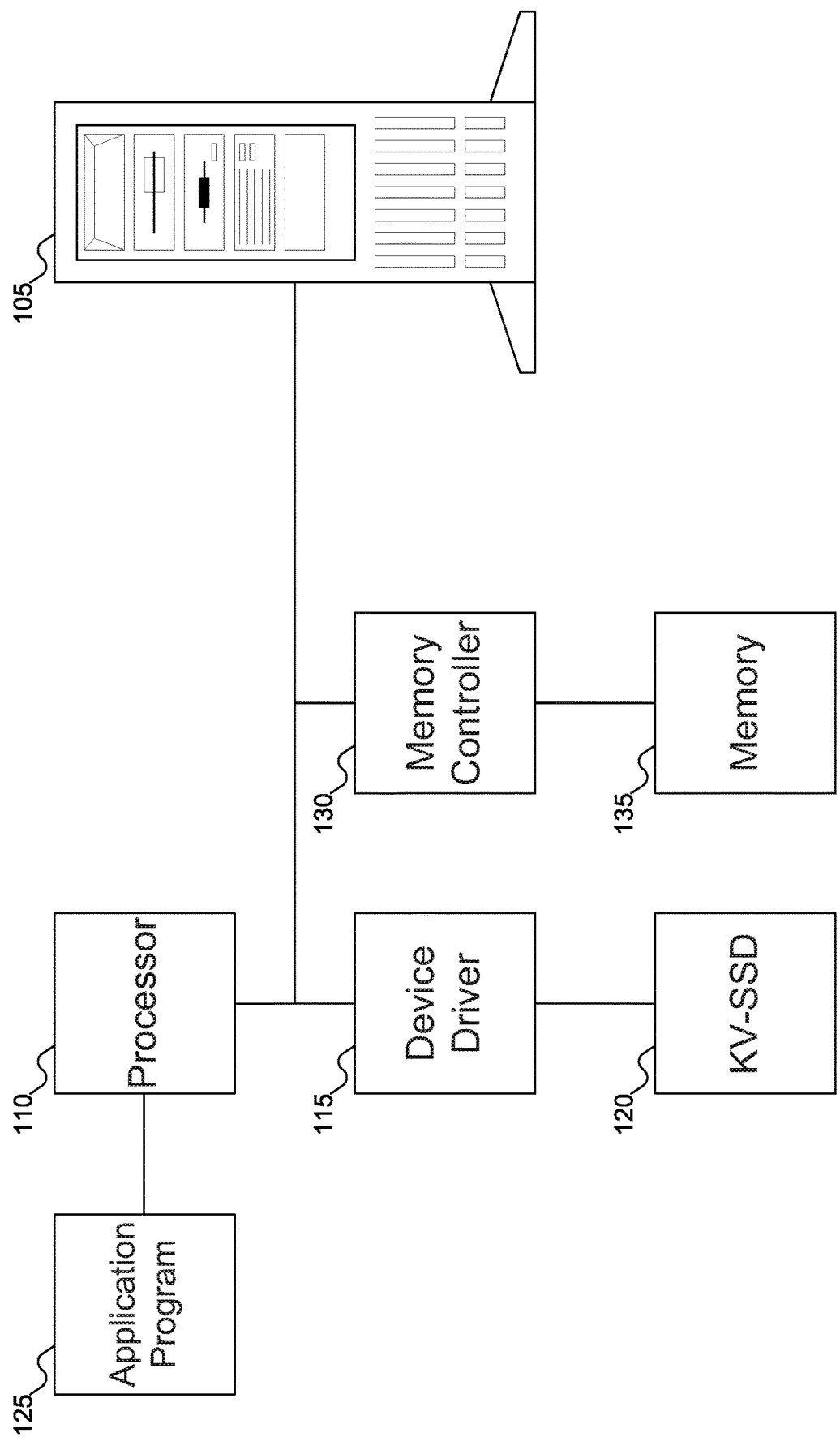
FIG. 1 shows a machine supporting centralized storage of Chroma subsampled image values in a Key-Value Solid State Drive (KV-SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Although the human brain needs no programming (other than experience) to process image data, storing and manipulating image data using computers may be a complex process. The more detail that is included in the image (such as the number of colors supported in the image format), the larger and more complex the image file may become.

Early image file formats stored images in relatively simple formats. For example, each pixel might be represented individually, storing values for the strength of the red, green, and blue signals in the pixel. But even using a relatively small number of bits per pixel for each color may result in a large image file. For example, an image that is 640×480 pixels contains a total of 307,200 pixels. If eight bits (one byte) are used to store the color information for each pixel, the image requires 307,200 bytes of storage. Increase the number of bits per pixel to 24 (eight bits for each value of red, green, and blue), and the image requires almost 1 MB of storage. Increase the number of bits per pixel for each color, or increase the size of the image, and the space requires increase further.

Other image file formats may improve on these storage requirements by "cheating" in various ways. For example, YUV encoding takes advantage of the fact that the human eye is much more sensitive to luminance (brightness) than to color, and may store less color information than everything that is in the original image. Thus, while the luma (Y) may be stored in full, the Chroma data (U and V) may be sampled in various ways so that when the image is seen by the human eye, the brain either does not notice the missing data or tolerates the absence of the missing data without difficulty.

There are several Chroma separation methods that produce similar results. Although embodiments of the inventive concept focus on the Chroma separation method known as YCbCr, other Chroma separation approaches are analogous and may be used as well.

To convert an RGB image's pixels into YUV image pixels, each pixel's Y component value represents the pixel's luma component and the Cb and Cr values represent the Chroma components. For example, if $E_R$, $E_B$, and $E_G$ are analog values between 0 and 1 representing how much red, green, and blue there is in a pixel, respectively, the following equations may be used to convert the RGB values to YCbCr values:

$$E_Y = 0.299 \cdot E_R + 0.587 \cdot E_G + 0.114 \cdot E_B$$

$$E_{Cb} = -0.169 \cdot E_R - 0.331 \cdot E_G + 0.500 \cdot E_B$$

$$E_{Cr} = 0.500 \cdot E_R - 0.419 \cdot E_G - 0.081 \cdot E_B$$

Collectively, the converted pixel values represent the image content in another format that enables subsequent Chroma Subsampling compression methods offering different compression results. Some common Chroma Subsampling methods include methods known as 4:0:0, 4:2:0, 4:2:2, etc. that algorithmically discard Chroma values at designated pixel positions. More generally, Subsampling strategies may be known as 4:N:M, where N and M typically have the same value and are drawn from the set {0, 2, 4}; however, embodiments of the inventive concept may support N and M having different values, and having values other than just 0, 2, or 4. Applications subsequently using the compressed image simply substitute the remaining Chroma values in their place. Meanwhile, the images enjoy Chroma Subsampling compression when stored on the storage device.

In practice, different applications have varying image resolution and Chromatic information requirements. Consequently, the same image may be stored as multiple YUV formatted images using a variety of Chroma Subsampling schemes and resolutions.

Conventional solutions did not organize the storage of these YUV formatted images. Applications were free to store the images anywhere they desired, without having to coordinate or share information with other applications. As a result, the same image, using the same Chroma Subsampling scheme and the same resolution, might be stored multiple times by different applications, or an application might not be able to locate a particular image using a particular Chroma Subsampling scheme and resolution, even though that image might be stored somewhere convenient. Further, this variety of application use may result in generating many images that are related (in that they are derived from the same original image) but only differ in resolution or Chroma Subsampling method. Aside from the difficulties in locating a particular image file and the possibility of redundant storage of the same image, applications might suffer from the delay associated with generating the image file they need, since they might not locate (or otherwise know about) the image file they need even though it is already stored on the storage device.

Storing all generated resolutions with associated Chroma Subsample information within a single image object simplifies storage, accelerates application development and subsequent application processing. One way to achieve this benefit is by using hierarchical tables or containers in a storage object to organize the various image values.

When an object contains a multiplicity of image resolutions and/or Chroma Subsampling schemes, applications that subsequently access the object enjoy a natural application processing acceleration when the application needs to resize the image. This benefit is because the various image values in an object may have reduced size images that contain less image data requiring resizing, re-sampling, or otherwise reprocessing. Thus, the application may select the most appropriate resized image within the object as application input. That is, an application generating a new image need not always use the user-designated base image, if a pre-existing image of closer resolution and/or Chroma Subsampling to the desired result may be found. The consequent reduced processing activity accelerates the application, and reduces response time as well as reduces infrastructure equipment capital, power, and cooling costs.

Different storage devices offer a variety of capacities, costs, and performance tradeoffs. Magnetic disc drives may store terabytes of data at a reduced cost relative to Solid State Drives (SSDs), but incur an access performance penalty: the time required to retrieve data may be longer for magnetic disc drives than for SSDs. Embodiments of the inventive concept may use a machine learning system running on the host CPU to monitor how various resolution images are accessed in order to sort them into access probability images. In other words, any image may have an assigned probability number associated with it. The system may then store images in the "hot", "warm", or "cold" tier depending on the probability number associated with each image.

In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination. Processor 110 may run device driver 115, which may support access to storage device 120, shown as a Key-Value Solid State Drive (KV-SSD): different device drivers may support access to other components of machine 105. KV-SSD 120 uses a key-value interface to access data: an application or operating system may provide KV-SSD 120 with a key, which KV-SSD 120 may then map to a location on KV-SSD 120. KV-SSD 120 may then access and return the value stored at that location on KV-SSD 120. Unlike the complex command set offered by a conventional file system on conventional storage devices, KV-SSD 120 typically offers a fairly small set of commands, such as: GET (to retrieve the value associated with a provided key), PUT (to store the provided value on the KV-SSD, associated with either a provided key or with a KV-SSD generated key, which may be returned), and ERASE (to delete the value associated with the provided key from the KV-SSD, and remove the key-value association from the KV-SSD tables) (KV-SSD 120 may support other commands as well and may use different command names than those shown, but the principles are generally as described). KV-SSD 120 may also be replaced with any other storage device that supports object storage as described in the embodiments of the invention below. Processor 110 may also run application program 125, which may process image data that is stored using Chroma Subsampling techniques.

Machine 105 may also include memory controller 130, which may be used to manage access to main memory 135. Memory 135 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 135 may also be any desired combination of different memory types.

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines. In addition, while FIG. 1 shows machine 105 as including both KV-SSD 120 and application program 125, embodiments of the inventive concept could have these components in separate machines: for example, KV-SSD 120 might be installed on a server that is connected to machine 105 (and application program 125) via a network connection traversing one or more networks of any types (wired, wireless, global, etc.).

Figure 2:
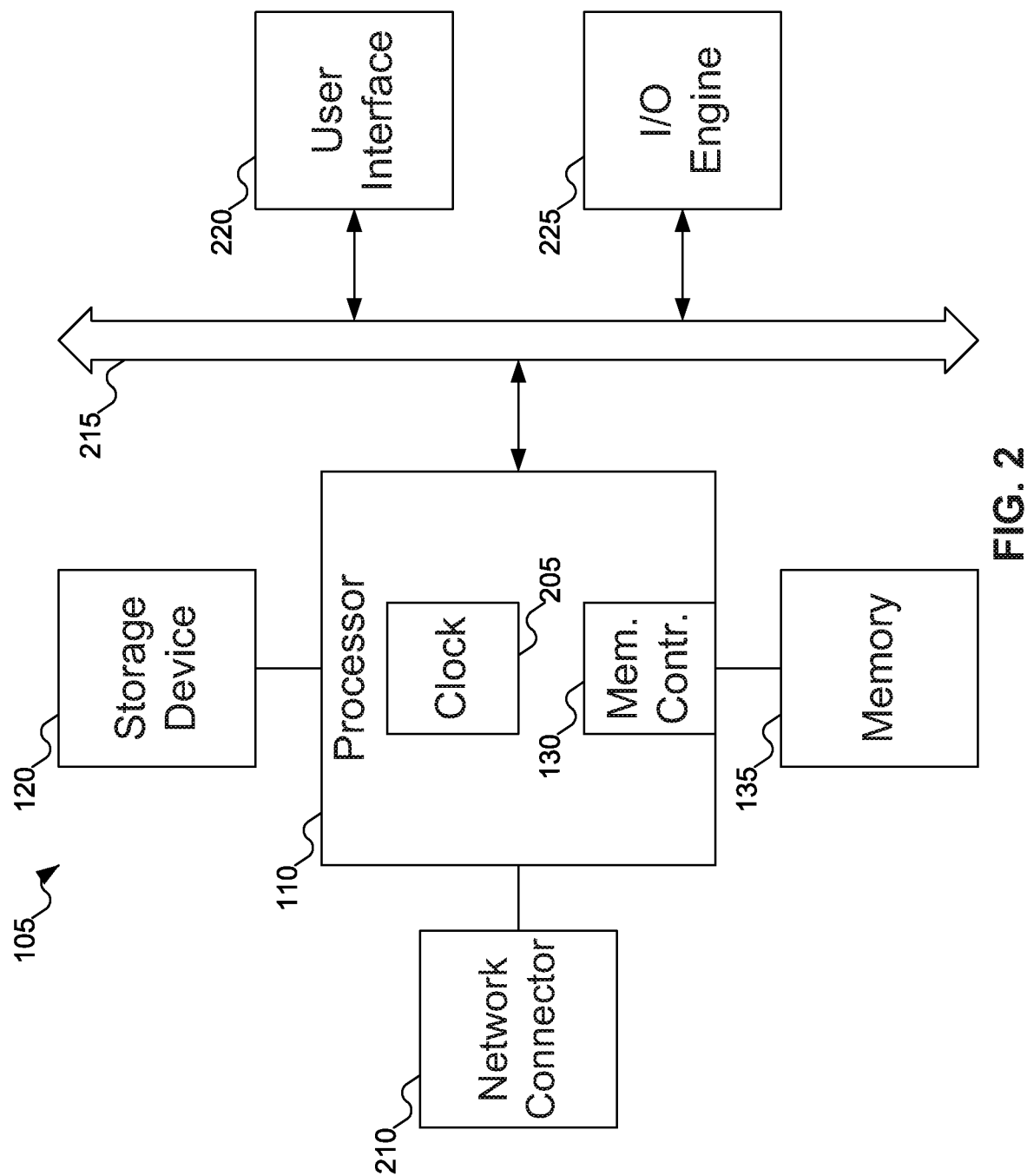
FIG. 2 shows additional details of the machine of FIG. 1.

FIG. 2 shows additional details of the machine of FIG. 1. In FIG. 2, typically, machine 105 includes one or more processors 110, which may include memory controllers 130 and clocks 205, which may be used to coordinate the operations of the components of device 105. Processors 110 may also be coupled to memories 135, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
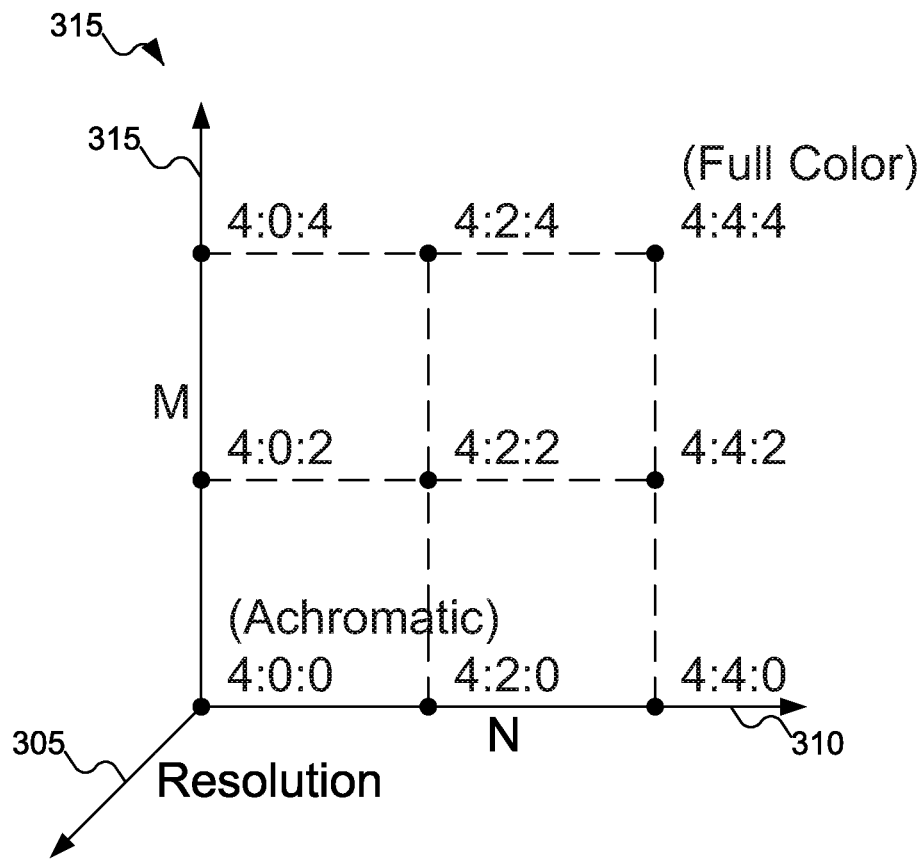
FIG. 3 shows various dimensions including resolution and Chroma Subsampling rates that may be used in embodiments of the inventive concept.

FIG. 3 shows various dimensions including resolution and Chroma Subsampling rates that may be used in embodiments of the inventive concept. Recall that Chroma Subsampling schemes may be represented as 4:N:M, where N and M are usually (but not necessarily always) 0, 2, or 4. In general, the values of N and M reflect the relative Chroma resolution in the horizontal and vertical directions of the image. Thus, for example, the Chroma Subsampling scheme 4:0:0 represents a black-and-white image, with no color data, whereas the Chroma Subsampling scheme 4:4:4 represents a full color image (with color data taken from every pixel).

In FIG. 3, the three-dimensional (resolution, N, M) space consists of a lattice of possible transcoded images with varying resolutions and Chroma Subsample strategies. While resolution (along axis 305) is often represented at discrete levels, such as 25%, 50%, and 100%, the resolution dimension is a resolution continuum, with any values possible. On the other hand, the Chroma subsample dimensions only provide discreet Chroma Subsampling schemes for any given resolution.

In addition, while FIG. 3 shows dimensions N (along axis 310) and M (along axis 315) as separate dimensions, embodiments of the inventive concept may combine these dimensions into a single dimension. That is, instead of N and M representing separate dimensions, the number of Chroma Subsampling schemes are finite in number, and may be listed individually. Thus, for example, a single dimension might be used to represent every possible Chroma Subsampling scheme 4:N:M for the acceptable values of N and M.

Before getting into embodiments of the inventive concept showing data structures that may be used to store image data, a preliminary topic is useful to understand. Aside from storing data objects, KV-SSDs may also store containers. A "container" is a KV data structure that functionally stores multiple KV data objects (or links to multiple data objects through their keys). In essence, the container may become its own mini-KV store, housing keys and associated data, or alternatively just housing a list of keys that reference pointers (other keys) to elsewhere. In a loose sense, containers perform a function for KV-SSDs akin to folders (or directories) in a file system storage device: containers provide a mechanism by which related KV pairs may be grouped together. Note that containers may exist within an individual data object and/or may group together multiple data objects, as the data object in a KV-SSD is pure data, without any externally imposed structure, requirements, or format.

Figure 7:
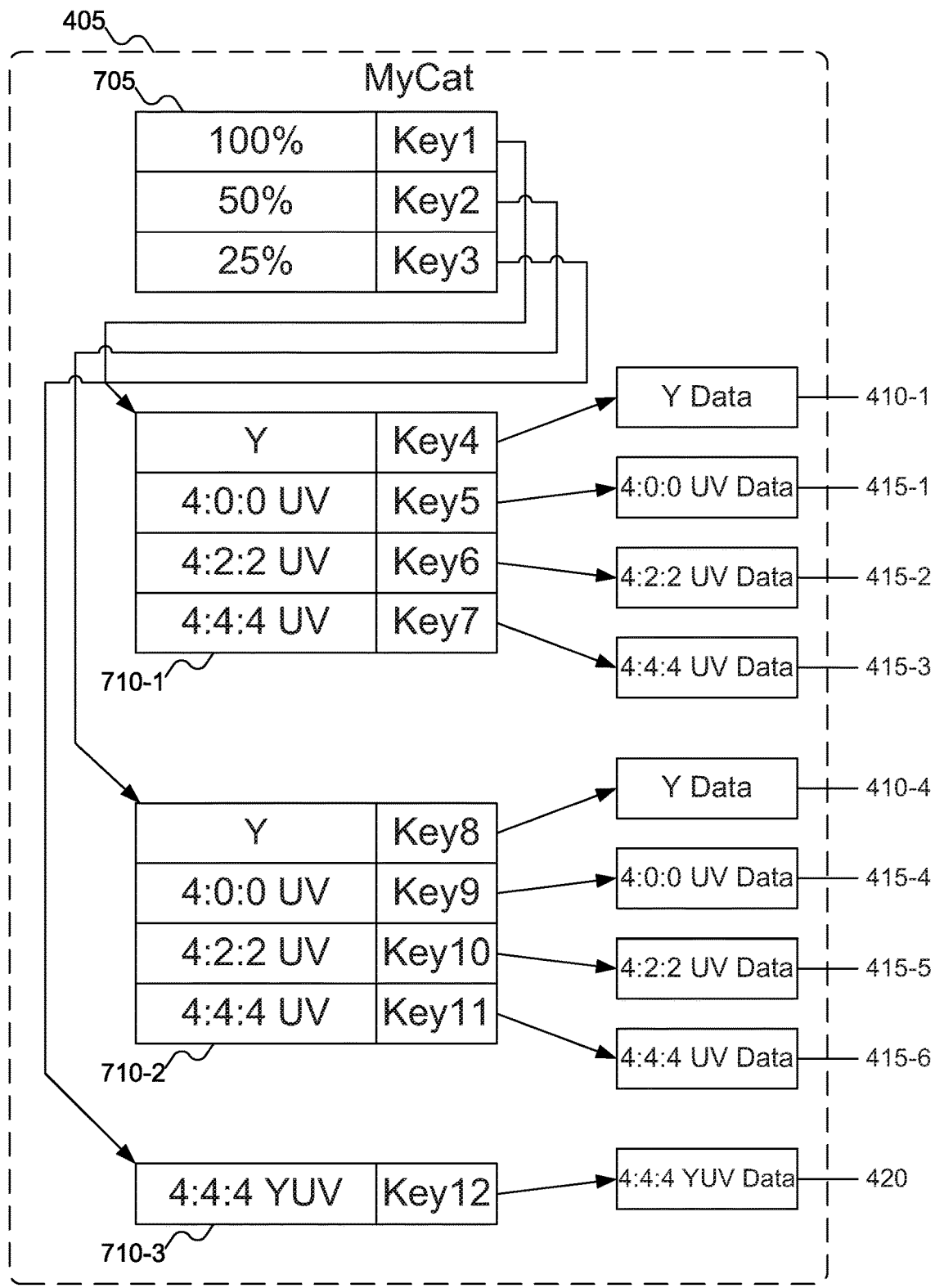

The term "container" is not intended to limit the scope of the claims to just "containers". The term "container" is intended to encompass any data structure that may be used to organize the various values and other image data stored within image object 405. For example, tables may be used to organize the image values, with the tables indexed by values along one dimension, with the entries in the table pointing to other tables or image values that organize the data along one or more additional dimensions, as shown in FIG. 7 below. Thus, for example, image object 405 might alternatively include a first table that contains entries for resolutions of 100%, 50%, and 25%; these entries might point to additional tables that include pointers to the image values 410-1 through 410-6, 415-1 through 415-6, and 420.

Figure 4:
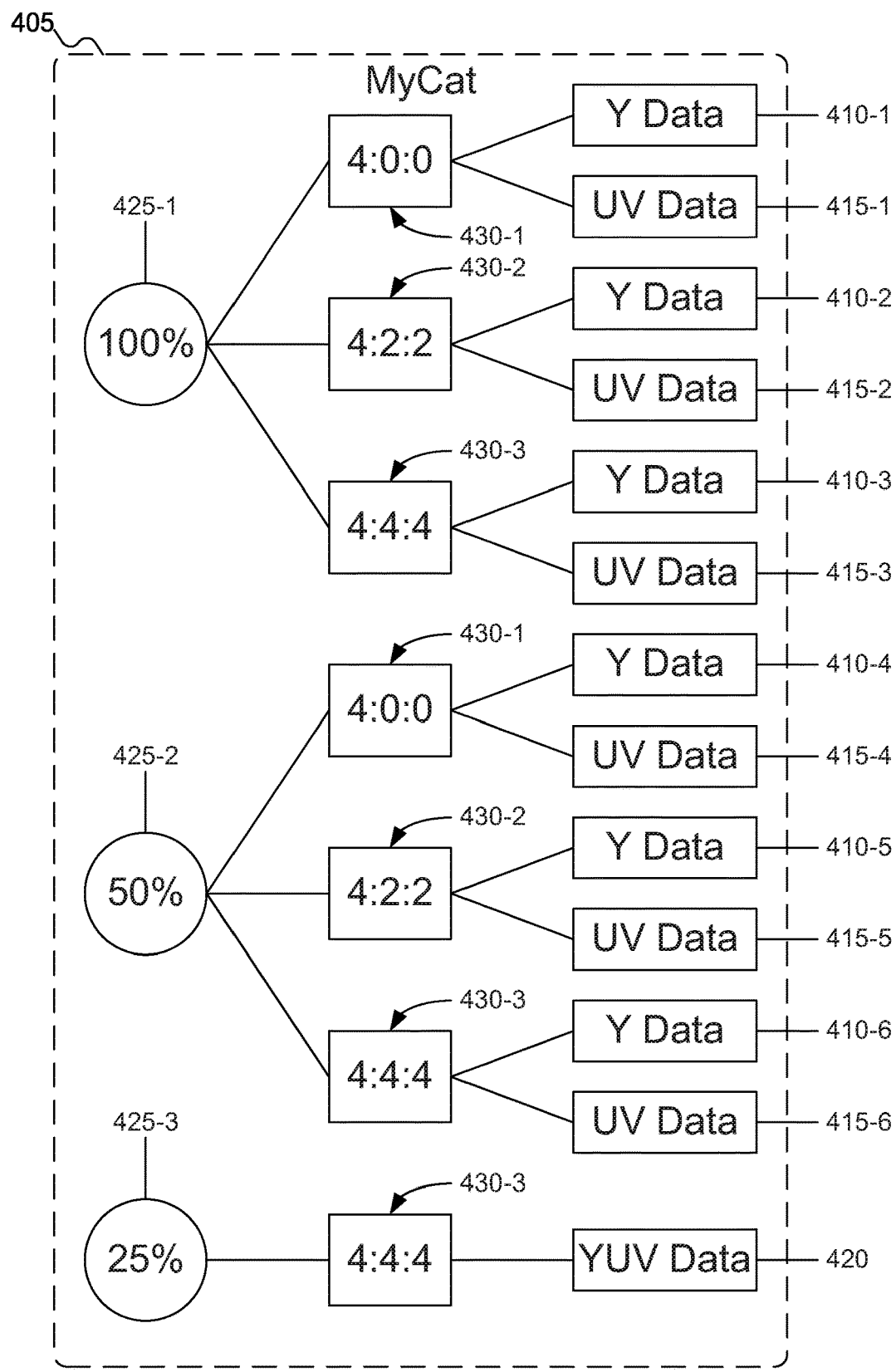
FIGS. 4-7 show various ways in which image values may be organized in an image object, according to embodiments of the inventive concept.

FIGS. 4-11 show various ways in which image values may be organized in an image object, according to embodiments of the inventive concept. In FIG. 4, image object 405 is shown, which stores image data for an image named "MyCat". Image values are organized within image object 405 using resolution as the first dimension and Chroma Subsampling scheme as the second dimension. Thus, for example, containers 425-1, 425-2, and 425-3 store images are resolutions of 100%, 50%, and 25%, respectively.

The resolutions of 100%, 50%, and 25% represent possible scaled resolutions of the original image, and may be replaced with any alternative labels: for example, by using a particular pixel resolution. Thus, for example, if the original image included 640 pixels by 480 pixels (commonly denoted as "640×480"), the 100% label could be replaced with "640×480", the 50% label could be replaced with "320×240", and the 25% label could be replaced with "160×120".

Within each first dimension container, additional containers may be used to store data in a second dimension. Thus, for example, first dimension containers 425-1 and 425-2 each include second dimension containers 430-1, 430-2, and 430-3 to store images using Chroma Subsampling schemes 4:0:0, 4:2:2, and 4:4:4, respectively, and first dimension container 425-3 includes second dimension container 430-3 to store images using Chroma Subsampling scheme 4:4:4.

There are several points worth noting in FIG. 4. First, note that in FIG. 4, second dimension containers 430-1, 430-2, and 430-3 are mostly shown storing the luma and Chroma data separately. For example, container 430-1 stores luma data value 410-1 and Chroma data value 415-1, container 430-2 stores luma data value 410-2 and Chroma data value 415-2, and so on. This is optional: the luma data and Chroma data need not be separated. For example, second dimension container 430-3 in first dimension container 425-3 stores image value 420, which stores the entire image in a single value, rather than separating the luma and Chroma data. Separating the luma and Chroma data has the advantage that if application program 125 of FIG. 1 only needs to process, say, Chroma data 415-1, luma data 410-1 does not need to be retrieved. On the other hand, if application program 125 of FIG. 1 wants the entire image, then both luma data 410-1 and Chroma data 415-1 are retrieved and returned to application program 125 of FIG. 1. This may require re-combining the luma and Chroma data into a single image file, depending on the expectations of application program 125 of FIG. 1.

Second, note that the Chroma Subsampling scheme 4:0:0 is an achromatic image: the image includes no color data. In such an image, the UV data might be non-existent (since the UV data represents the color portion of the image). Thus, Chroma data values 415-1 and 415-4 might not exist as they store no data. They are represented in FIG. 4 for completeness of description, and not because these values must be stored in image object 405.

Third, since the luma data is the same for all images in the same resolution, luma data values 410-1, 410-2, and 410-3 are redundant: only one copy actually needs to be stored. There are many ways in which redundant copies of luma data values 410-1, 410-2, and 410-3 may be eliminated. For example, the luma data value might be stored directly within first dimension container 425-1 rather than within each of second dimension containers 430-1, 430-2, and 430-3. Or, the luma data value might be stored once (for example, within second dimension container 430-1), with second dimension containers 430-2 and 430-3 storing pointers to that value. Embodiments of the inventive concept may extend to include other techniques to eliminate redundant copies of the luma data.

Fourth, while image object 405 is designed to optimize the storage and management of Chroma image values, there is no reason that image object 405 may not store related image data values in other formats. For example, the original image file might have been in RGB format (or JPEG/JPG format, or GIF format, or any other format, whether lossy or lossless) at 640×480 resolution: this image value may also be stored within image object 405. By storing the original image value in image object 405, if application program 125 of FIG. 1 needs the original data file for some reason (as opposed to the 4:4:4 Chroma Subsampling scheme at 100% resolution), that original image may be easily located and retrieved as well.

Fifth, although FIG. 4 shows Chroma data at 4:0:0, 4:2:2, and 4:4:4 Subsampling schemes for images at 100% and 50% resolution, at 25% resolution (first dimension container 425-3) only stores image data for Chroma Subsampling scheme 4:4:4. Thus, it is not required that image object 405 include every possible Chroma Subsampling scheme at every possible resolution. Indeed, since the resolution continuum may be thought of as essentially continuous, requiring or expecting image object 405 to store image data for every possible Chroma Subsampling scheme at every possible resolution is not only unrealistic, it is likely infeasible. But storing a subset of all possible combinations of resolution and Chroma Subsampling scheme (as needed by application program 125 of FIG. 1 using or generating the images) is entirely realistic and feasible.

As a corollary, note that image object 405 may grow as application program 125 of FIG. 1 generates image data in new resolutions and/or Chroma Subsampling schemes. For example, assume application program 125 of FIG. 1 needs to process image data at a 75% resolution using Chroma Subsampling scheme 4:4:4. As may be seen from FIG. 4, no container yet exists to store data in this resolution in image object 405. Upon requesting image data at this resolution, application program 125 of FIG. 1 may learn that no such image data exists. Then, after application program 125 of FIG. 1 generates the needed image data (how this occurs will be discussed below), a new first dimension container may be added to image object 405 for 75% resolution, with an embedded new second dimension container to store data for Chroma Subsampling scheme 4:4:4, into which one or more image values may be stored as generated by application program 125 of FIG. 1. The same principle holds true when application program 125 of FIG. 1 generates new image data at an existing resolution but new Chroma Subsampling scheme; the only difference is that in such a situation a new first dimension container would not be added (since an existing first dimension container represents the generated resolution). (The concept may even be extended to creating image object 405 when the first Chroma data is generated for the image.) In the situation where application program 125 of FIG. 1 requests image data at a combination of resolution and Chroma Subsampling that does not already exist in image object 405, application program 125 of FIG. 1 will need to generate the required image data. For example, in image object 405, no image data exists for the combination of 25% resolution and Chroma Subsampling scheme 4:0:0. Thus, if application program 125 of FIG. 1 requires image data at this resolution and Chroma Subsampling scheme, application program 125 of FIG. 1 will need to generate this image data.

Conventional application programs already are capable of such image generation, as they may not assume that the required image data already exists, nor do conventional application programs need to be modified to support such data generation. But while application program 125 of FIG. 1 may generate starting from the original image data (which might be, say, image values 410-3 and 415-3, representing image data at full color resolution using YCbCr encoding, or an RGB image value), it might be sufficient for application program 125 of FIG. 1 to start with image data at 50% resolution using Chroma Subsampling scheme 4:0:0 (i.e., image values 410-4 and 415-4) and scale them down to 25% resolution to be stored in first dimension container 425-3 (within a new second dimension container for Chroma Subsampling scheme 4:0:0). Alternatively, application program 125 of FIG. 1 might request any image value stored in first dimension container 425-3 (such as image value 420)— which would be at the correct resolution—and process the image value to extract just the luma data from that image, which again may be stored in first dimension container 425-3 (again, within a newly created second dimension container for Chroma Subsampling scheme 4:0:0). In this manner, image object 405 may grow as new versions of the image are generated by application program 125 of FIG. 1 (or other application programs also operating on image object 405), requiring less overall processing and data movement.

Similar approaches may be taken when application program 125 of FIG. 1 needs an image file that is not achromatic. Application program 125 of FIG. 1 may select an appropriate image value that already exists and modify it accordingly. For example, if application program 125 of FIG. 1 needs Chroma data in a 4:2:4 Subsampling scheme of the image at 50% resolution, application program 125 of FIG. 1 might start with Chroma value 415-6 (50% resolution with full 4:4:4 Chroma Subsampling) and sample the data appropriately to generate the image file in a 4:2:4 Subsampling scheme. Then, application 125 of FIG. 1 may store the generated image value in a new second dimension container of first dimension container 425-2.

As noted above, in FIG. 4 some redundant data is shown. Specifically, the Y (luma) data for a given resolution does not change with the Chroma Subsampling scheme. In other words, image values 410-1, 410-2, and 410-3 are all the same values. In FIG. 4, there is a minor benefit to this redundancy, as a given container hierarchy (such as dimension containers 425-1 and 430-1) may include all pertinent data. But this redundancy may be eliminated by storing data that is independent of the Chroma Subsampling scheme someplace where it may always be found (for example, in dimension container 425-1) or by only storing the data once and including pointers from the various dimension containers to where the data is actually stored. For example, image value 425-1 might be the true data, and image values 425-2 and 425-3 may simply be pointers to image value 425-1. Other embodiments of the inventive concept, such as those shown in FIGS. 6-7, offer other solutions to the possibility of redundant data.

Figure 5:
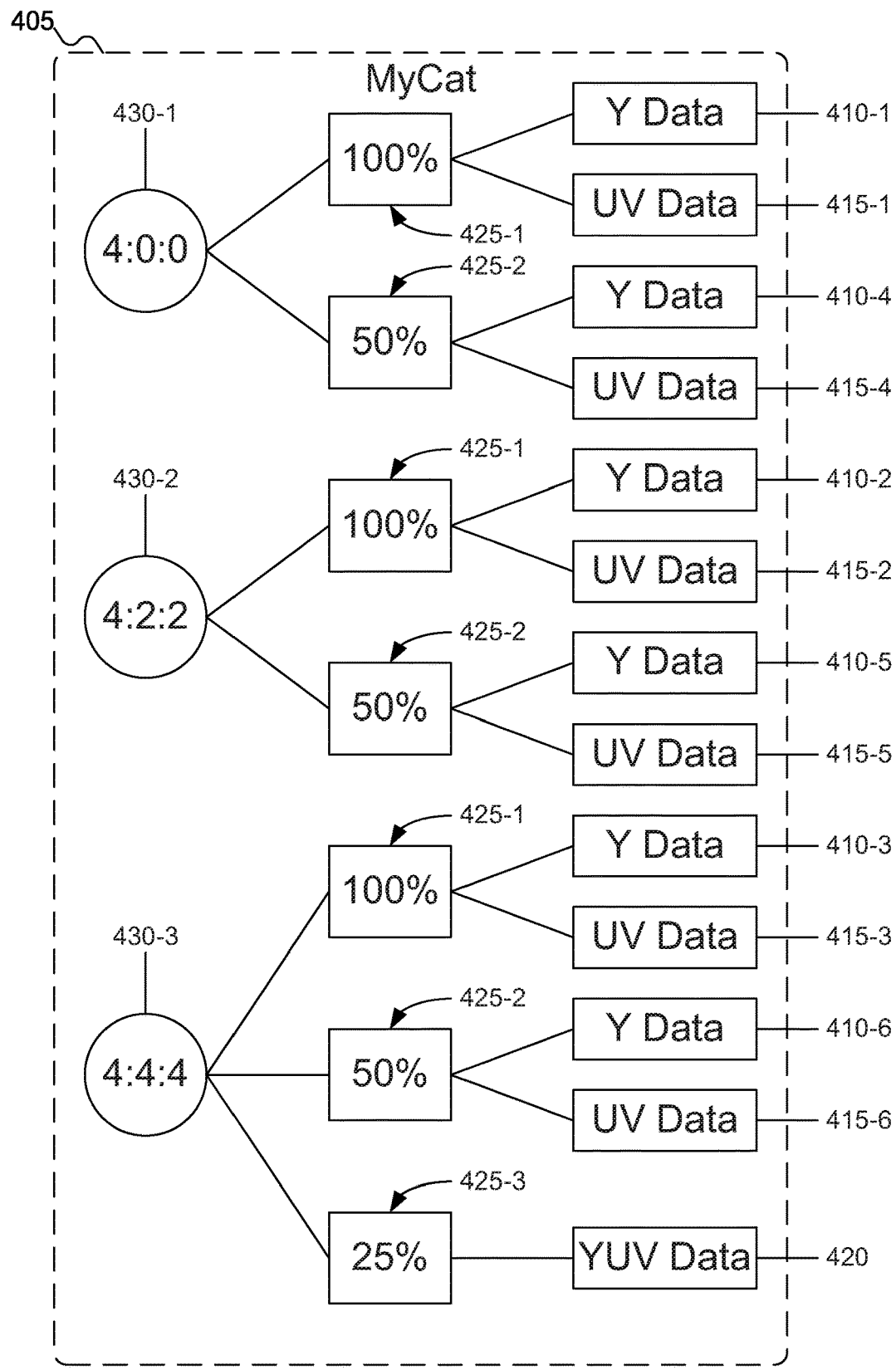

In FIG. 4, the image data is organized first along the resolution dimension, then along the Chroma Subsampling dimension. But embodiments of the inventive concept may organize the image data in other ways. FIG. 5 illustrates organizing the image data first along the Chroma Subsampling dimension, and then along the resolution dimension.

In FIG. 5, first dimension containers 430-1, 430-2, and 430-3 are shown for Chroma Subsampling schemes 4:0:0, 4:2:2, and 4:4:4, respectively. Within each of first dimension containers 430-1, 430-2, and 430-3, second dimension containers 425-1, 425-2, and 425-3 are used to organize image data according to resolution. As with FIG. 4, image object 405 in FIG. 5 does not have to store containers that represent every combination of resolution and Chroma Subsampling scheme. Thus, for example, first dimension containers 430-1 and 430-2 do not include second dimension container 425-3, which is stored only within first dimension container 430-3. This organization reflects that image object 405 only stores image data at 25% resolution using the 4:4:4 Chroma Subsampling scheme.

In embodiments of the inventive concept as shown FIGS. 4-5 (and in other embodiments of the inventive concept as well), application program 125 of FIG. 1 may provide the keys/containers that help KV-SSD 120 of FIG. 1 to identify the particular image value to retrieve. For example, assume that image object 405 contained the image values for an image named "MyCat". Application program 125 of FIG. 1 might provide a KV request using the key "MyCat4:2: 250Chroma". KV-SSD 120 of FIG. 1 could parse this information into a series of "internal" keys/containers: "MyCat" (the key/container identifying image data object 405), "4:2:2" (a first key/container, identifying the desired Chroma Subsampling scheme), "50" (a second key/container identifying the desired resolution), and "Chroma" (the key for the particular image value desired). Using this parse, KV-SSD 120 of FIG. 1 may, for example, locate image object 405 of FIG. 5 (which in some embodiments of the inventive concept may be thought of as a container itself), then container 430-2 within image object 405, then container 425-2 within container 430-2, and finally image value 415-5 within container 425-2. Note that while this example leaves it to KV-SSD 120 of FIG. 1 to determine where one piece of the provided information ends and another begins, embodiments of the inventive concept may use explicit characters to separate the portions of the provided information. For example, if "/" is considered a special character for parse purposes and does not appear in any key or container name, then application program 125 of FIG. 1 might provide "MyCat/4:2:2/50/Chroma" to explicitly indicate how to parse the provided information.

Application program 125 of FIG. 1 may also provide such information in the embodiments of the inventive concept shown in FIGS. 6-7 and 9-11 below, although the specific information provided (and how it is parsed) may depend on the embodiment of the inventive concept being used. For example, in the embodiments of the inventive concept shown in FIGS. 4-5 above, both the desired resolution and the desired Chroma Subsampling scheme may be containers used to isolate the desired image value; in the embodiment of the inventive concept shown in FIG. 6 below, one of these indicators may be part of the key used to locate the desired image value.

In yet other embodiments of the inventive concept, rather than expecting KV-SSD 120 of FIG. 1 to parse the provided information, application program 125 of FIG. 1 might provide the key and the container information separately. Thus, continuing the example above, to access the Chroma value for the file "MyCat" at 50% resolution and Chroma Subsampling scheme 4:2:2, application program 125 might provide (as separate inputs) key "MyCatChroma" and container "50/4:2:2" (or "4:2:2/50"). By separating the containers from the key, KV-SSD 120 may more efficiently search for the desired image value (since KV-SSD 120 would not need to parse the input information to attempt to identify the container(s)).

While FIGS. 4-5 (and FIGS. 6 and 9-10 below) show dimension containers 425-1, 425-2, 425-3, 430-1, 430-2, and 430-3 all within image object 405, embodiments of the inventive concept may organize the image data using other mechanisms. For example, first dimension container 425-1 might include all image data that are at full (100%) resolution (or, alternatively, all image data that are at a particular pixel resolution, such as 640×480); within first dimension container 425-1, second dimension container 430-1 may group together all image values (that are at 100% resolution) that use the 4:0:0 Chroma Subsampling scheme. Thus, for application program 125 of FIG. 1 to retrieve the image data at 100% resolution that uses Chroma Subsampling scheme 4:0:0 (UV data 415-1), application program 125 of FIG. 1 may specify the desired resolution (100%) and the desired Chroma Subsampling scheme (4:0:0) to identify the particular container to search for the value associated with a particular key. It should be readily apparent how FIGS. 4-5 (as well as FIGS. 6-7 and 9-11 below) may be generalized to use containers 425-1, 425-2, and 425-3 to store image values for all images, and not just those that are considered part of image object 405.

It is also worth noting that, due to the isolation imposed upon containers, in some embodiments of the inventive concept keys may be locally unique rather than globally unique across KV-SSD 120. For example, consider again FIGS. 4-5, where containers 425-1, 425-2, 425-3, 430-1, 430-2, and 430-3 organize the image values within image object 405. Given the specific image object 405 and a particular set of containers that isolate the particular desired image value, the key used to retrieve the image value might be reduced to just "Luma" or "Chroma". For example, in FIG. 4, if application program 125 of FIG. 4 were to specify image object 405 and containers 425-1 and 430-1, application program has already reduced the set of image values to just image values 410-1 and 415-1. By providing the key "Luma" or "Chroma", KV-SSD 120 may select between these two image values. Note that the same key ("Luma" or "Chroma") may distinguish between the files in each of the other second dimension containers 430-2 and 430-3. Thus, the keys themselves are only locally unique within container 430-1, and not globally unique across KV-SSD 120 of FIG. 1, or even unique within image object 405: but since the container hierarchy prevents key collisions, KV-SSD 120 of FIG. 1 may still return the desired image value.

Figure 6:
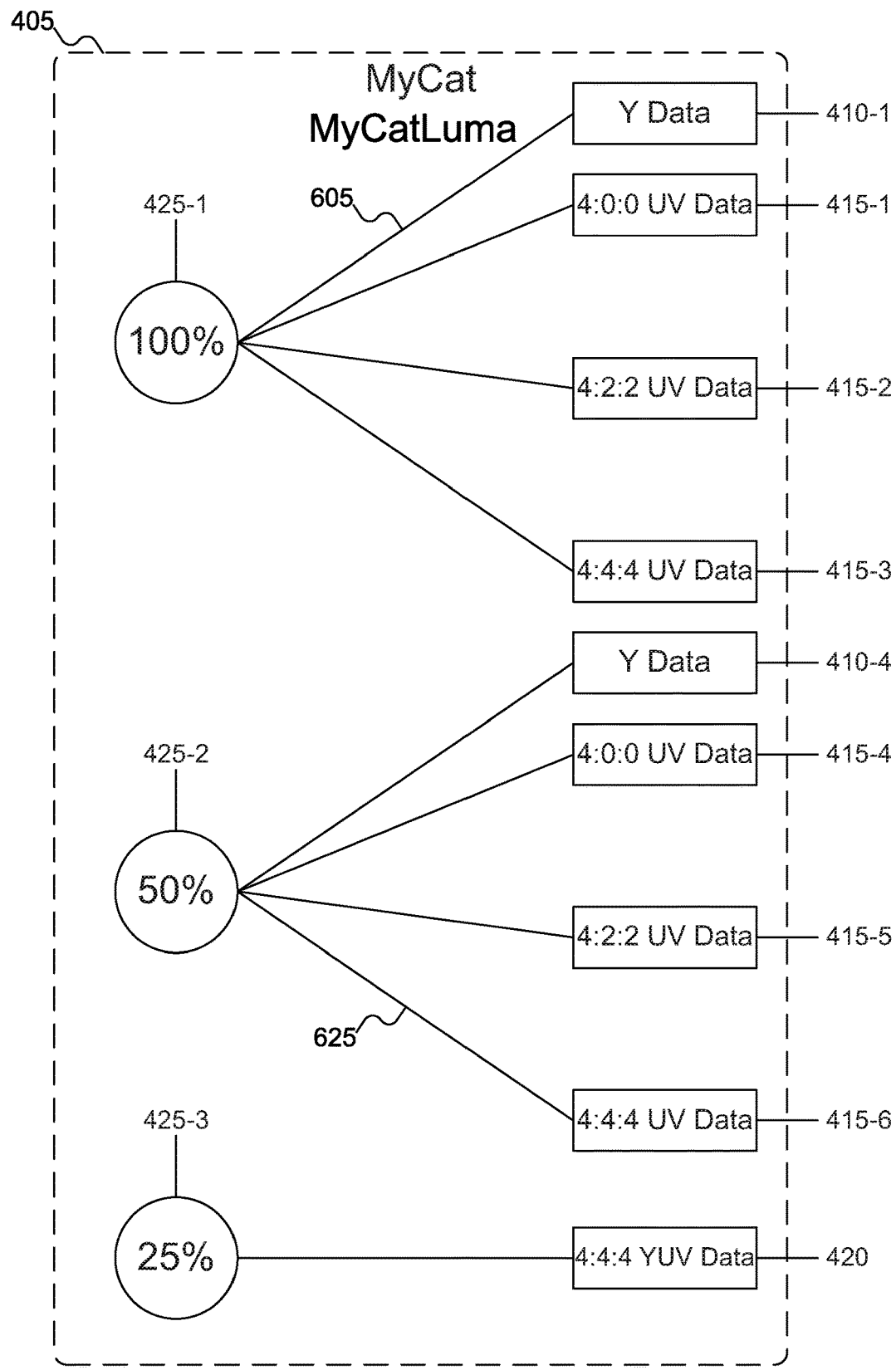

FIG. 6 illustrates another embodiment of the inventive concept. In FIG. 6, the image data is organized first along the resolution dimension, as in FIG. 4. But rather than organizing the data within first dimension containers 425-1 425-2, and 425-3, a key may be used to identify the particular image value desired. Thus, first dimension container 425-1 directly contains image values 410-1, 410-2, 410-3, 415-1, 415-2, and 415-3, rather than indirectly (through second dimension containers 430-1, 430-2, and 430-3, as in FIG. 4). To select a particular image value, such as the luma data for the image at 100% resolution, application program 125 of FIG. 1 may specify first dimension container 425-1 along with a key that uniquely identifies the desired value from first dimension container 425-1.

For example, to select the luma data for an image named "MyCat" at 100% resolution, application program 125 of FIG. 1 might provide the information "100MyCatLuma" ("MyCat100Luma", or any other desired ordering of the desired image value key and container information: as long as KV-SSD 120 of FIG. 1 may parse the information, the specific order may not matter). This information uniquely identifies the desired image value, as shown by link 605. In a similar manner, providing the information "50MyCat4:4: 4Chroma" would uniquely identify the full Chroma Subsampling data for the image "MyCat" at 50% resolution. Note that by changing the name of the image (e.g., to "MyDog") would retrieve the same type of data, but for a different image, using the same dimension container hierarchy.

When FIG. 6 is organized as shown, there is an implicit additional level of hierarchy: image object 405 itself. That is, containers 425-1, 425-2, and 425-3 are not global to the entirety of KV-SSD 120 of FIG. 1, but are "part" of image object 405—in essence, image object 405 may be structured as a container itself. In that sense, containers 425-1, 425-2, and 425-3 are specific to image object 405, and any containers with the same label in different image objects may be considered different containers. Since the image data would be organized first by image object, and then by dimension containers, the individual image values are still uniquely identified, even with different containers (in different image objects) labeled identically. In other embodiments of the inventive concept, FIG. 6 may be organized so that containers 425-1, 425-2, and 425-3 are at the highest level (higher than any individual image objects. Such an organization reduces the number of containers (which are themselves data objects) on KV-SSD 120 of FIG. 1, but then the key would need to specify image object 405 to distinguish among image values in the same container which may represent the same resolution and/or Chroma Subsampling scheme, but for different images.

It is also possible to store image data on KV-SSD 120 of FIG. 1 without using any "containers" at all. The term "containers" is quoted because there may still be a data structure that organizes image values, but in FIG. 7 application program 125 of FIG. 1 may be responsible for retrieving this data structure, accessing its data, and making additional requests from KV-SSD 120 of FIG. 1, rather than KV-SSD 120 of FIG. 1 processing information that specifies both the desired image value and any hierarchical structure organizing the desired image value. (If KV-SSD 120 of FIG. 1 is responsible for receiving the hierarchical information as well as the key of the desired image value, then FIG. 7 may be thought of as demonstrating a structure for the containers shown in FIGS. 4-6, but implementation is otherwise unchanged from the embodiments of the inventive concept shown in FIGS. 4-6.)

In FIG. 7, application program 125 of FIG. 1 may provide a key for an image object representing all stored variations of the image data, regardless of resolution or Chroma Subsampling scheme. This key does not actually return image data; instead, this key accesses an object that stores table 705, which is analogous to first dimension container 425-1 of FIG. 4: table 705 stores information about different resolutions of the image stored on KV-SSD 120. Each different resolution is associated with another key: for example, 100% resolution is associated with key1, 50% resolution is associated with key2, and 25% resolution is associated with key3.

Application program 125 of FIG. 1 may then provide the key associated with the desired resolution to KV-SSD 120. For example, key1 may identify an object that stores table 710-1, key2 may identify an object that stores table 710-2, and key3 may identify an object that stores table 710-3. Tables 710-1, 710-2, and 710-2 are analogous to second dimension tables 430-1, 430-2, and 430-3 of FIG. 4, in that they further narrow the set of image values that might be desired. Application program 125 of FIG. 1 may then use the information in the retrieved table to select the specific image value desired. For example, if application program 125 of FIG. 1 desires the image value storing the luma data for the image at 100% resolution, application program 125 of FIG. 1 may provide key1 to KV-SSD 120, retrieve table 710-1, locate key4, provide key4 to KV-SSD 120, and receive image value 410-1.

The advantages and disadvantages of FIG. 7 relative to other embodiments of the inventive concept should be apparent. Where application program 125 of FIG. 1 receives tables 705, 710-1, 710-2, and/or 710-3 from KV-SSD 120 of FIG. 1, application program 125 of FIG. 1 knows exactly what image values are stored on KV-SSD 120 of FIG. 1, and therefore may avoid requesting an image value that is not currently stored on KV-SSD 120 of FIG. 1. Therefore, application program 125 of FIG. 1 does not need to address the possibility of receiving a "no-value" message (described below with reference to FIG. 8) from KV-SSD 120 of FIG. 1.

The disadvantage of the embodiment of the inventive concept shown in FIG. 7 is that application program 125 of FIG. 1 may need to make multiple read requests of KV-SSD 120 before ultimately receiving the desired image value. For example, performing three read requests as described above means that application program 125 of FIG. 1 is three times as likely to be delayed due to one or more Garbage Collection operations (performed by SSD storage devices to recover erased data blocks for reuse). Depending on the latency of KV-SSD 120, the time KV-SSD 120 may need to perform Garbage Collection, and the speed at which application program 125 of FIG. 1 is expected to operate, performing multiple read requests of KV-SSD 120 may be unacceptably slow.

As discussed above, FIG. 5 above represents the same information as in FIG. 4, but organized using dimensions 305, 310, and 315 of FIG. 3 in a different order. While alternative organizations of the information shown in FIGS. 6-7 are not shown, embodiments of the inventive concept may extend to include variations on FIGS. 6-7 where the information is organized along the various dimensions 305, 310, and 315 in different orders.

When application program 125 of FIG. 1 needs image files, application program 125 of FIG. 1 obviously could request the entire image object 405 of FIGS. 4-7 and then locate the pertinent image values. But that approach requires transmitting a large amount of data that application program 125 of FIG. 1 ultimately does not need. For example, if application program 125 of FIG. 1 is only interested in Chroma data for the image at 50% resolution using Chroma Subsampling scheme 4:2:2, application program 125 of FIG. 1 has no need for any other image values: transmitting them would waste resources and energy (within KV-SSD 120 of FIG. 1, application program 125 of FIG. 1 and machine 105 of FIG. 1, and any communications paths connecting application program 125 of FIG. 1 and KV-SSD 120 of FIG. 1). Thus, embodiments of the inventive concept may benefit from being able to isolate the desired image values at KV-SSD 120 of FIG. 1 and only transmitting those image values actually needed by application program 125 of FIG. 1.

Figure 8:
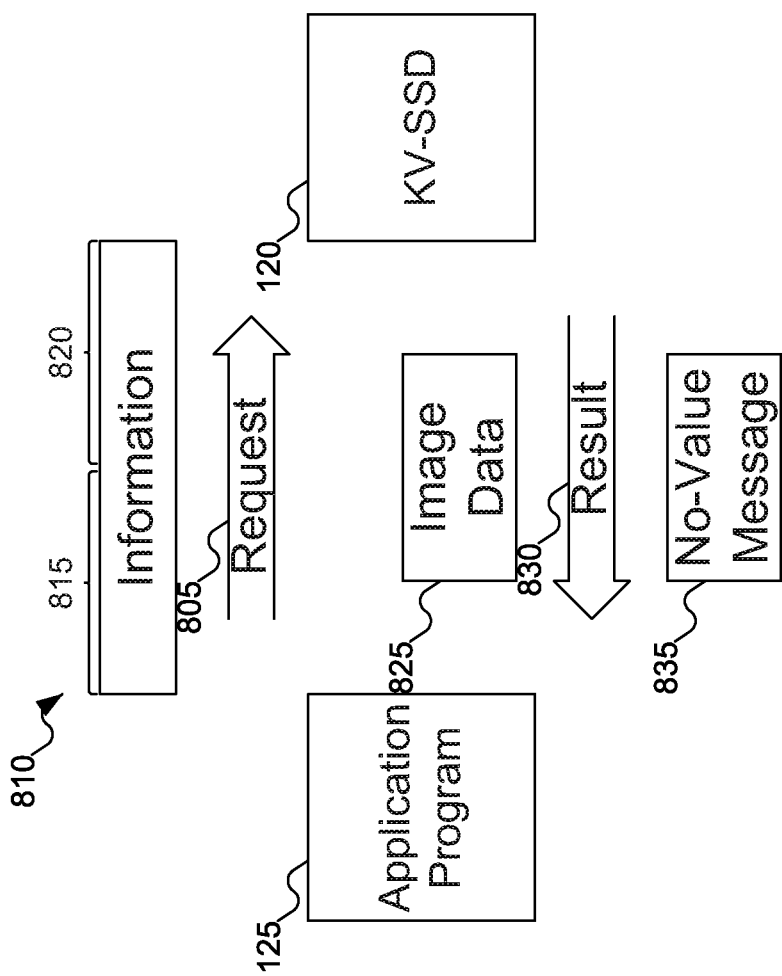
FIG. 8 shows the application program requesting image data from the image object of FIGS. 4-7 in the KV-SSD of FIG. 1 and receiving results.

FIG. 8 shows application program 125 of FIG. 1 requesting image data from image object 405 of FIGS. 4-7 in the KV-SSD of FIG. 1 and receiving results. In FIG. 8, application program 125 may issue read request 805, sent to KV-SSD 120. Request 805 may include information 810, which may specify key 815 and/or container 820. Key 815 may specify image object 405 of FIGS. 4-7, much like the key in any key-value pair may be used to identify the particular object storing the desired data. Container 820 may be used to isolate the particular container within image object 405 of FIGS. 4-7, so that only the image values stored in that container are retrieved and returned.

Note that information 810 may consist of just key 815 or container 820, or information 810 may include both key 815 and container 820, depending on the embodiment of the inventive concept. And while FIG. 8 suggests that information 810 may be divided equally into key 815 and container 820, embodiments of the inventive concept may have key 815 and container 820 "mixed" together in information 810, leaving it to KV-SSD 120 to parse key 815 and container 820 from information 810. For example, as described above with reference to FIGS. 4-5, information 810 might be "MyCat4:2:250Chroma", which may include containers "4:2:2" and "50" (the Chroma Subsampling scheme and resolution, respectively) as container 820, with "MyCatChroma" representing key 815.

For example, consider again FIG. 4. Assume that key "0x1234" identifies image object 405. Application program 125 of FIG. 8 may send information 810 of FIG. 8 as "0x1234/100%/4:4:4". Key 0x1234 may map to image object 405, and container "100%/4:4:4" may identify, first, container 425-1, and then container 430-3 within container 425-1. KV-SSD 120 of FIG. 8 may then identify that application program 125 of FIG. 1 specifically wants image values 410-3 and 415-3 (assuming they exist, as discussed below).

Returning to FIG. 8, KV-SSD 120 may then retrieve image values 410-3 and 415-3. These image values may then be prepared as image data 825, which may be returned to application program 125 in result 830.

Now, what if image object 405 of FIGS. 4-7 does not store the requested image values? For example, what if key 810 were still "0x1234", but container 820 were specified as, say, "50%/4:2:4"? A glance at image object 405 of FIG. 4 shows that there is no container labeled 4:2:4. In this situation, KV-SSD 120 may return "no-value" message 835 to application program 125 to report that no value could be found matching provided information 810. In this situation, application program 125 may request image values using another information 810. For example, application program 125 might be able to work with image at a different resolution or Chroma Subsampling (or both), or application program 125 might be able to generate the requested image data from the alternative image values. Other alternatives would be to return the original image value, or to return all image values: in either case, permitting application program 125 to generate (in some manner) the image file at the desired resolution and Chroma Subsampling scheme.

Note also that in some embodiments of the inventive concept—for example, the embodiments shown in FIG. 7 (and FIG. 11 below)—application program 125 of FIG. 1 may have enough information to know what combinations of resolution and Chroma Subsampling schemes are available, enabling application program 125 of FIG. 1 to determine what available image value is the best starting point from which to generate the desired image file (or, alternatively, to use directly without generating a new image file). Embodiments of the inventive concept may include KV-SSD 120 of FIG. 1 returning information about the available image values to application program 125 of FIG. 1—such as the information stored in each container in image object 405 of FIGS. 4-7—whether or not KV-SSD 120 of FIG. 1 returns "no-value" message 835, giving application program 125 of FIG. 1 a more complete picture of the image values stored on KV-SSD 120 of FIG. 1 for its own uses.

Note that once application program 125 has requested data from image object 405 of FIGS. 4-7 from KV-SSD 120, KV-SSD 120 may expect that application program 125 will do other things with image object 405 of FIGS. 4-7. This is particularly (although not exclusively) true when KV-SSD 120 returns "no-value" message 835: KV-SSD 120 may expect application program 125 to request data using another information 810, and also that application program 125 may write new image values to image object 405 of FIGS. 4-7. Thus, KV-SSD 120 may keep image object 405 of FIGS. 4-7 ready for further requests from application program 125: for example, by storing image object in Dynamic Random Access Memory (DRAM) within KV-SSD 120. By keeping image object 405 of FIGS. 4-7 ready, KV-SSD 120 may expedite future requests from application program 125, permitting application program 125 to begin processing the image data sooner.

In the above description, request 805 is described as a read request. But application program 125 may also issue a write request, to write a new image value to image object 405 of FIGS. 4-7. When application program issues request 805 as a write request, KV-SSD 120 may use key 815 as before to identify image object 405 of FIGS. 4-7, and container 820 to identify the particular container within image object 405 of FIGS. 4-7 to store the new image value. KV-SSD 120 may also use container 820 to create new container(s) within image object 405 of FIGS. 4-7 to store the new image value (if the specified container combination does not already exist within image object 405 of FIGS. 4-7).

Conventional KV-SSDs are designed to return the entirety of the object (the "value") associated with key 815. KV-SSD 120 may be modified to support extracting the desired data from image object 405 of FIGS. 4-7 without returning the entirety of image object 405 of FIGS. 4-7 in any desired manner. For example, KV-SSD 120 may be modified so that only the desired data (as identified by container 820) is read from the storage in KV-SSD 120. Or, KV-SSD might use conventional key-value read mechanisms to retrieve the entire image object 405 of FIGS. 4-7, but then store image object 405 of FIGS. 4-7 in local storage associated with an in-storage computing processor, and then use the in-storage computing processor to extract the desired data, which is then returned to application program 125 (without returning the rest of image object 405 of FIGS. 4-7). Note that image object 405 of FIGS. 4-7 may be retained in local storage within KV-SSD 120 in the expectation that application program 125 might need to further access image object 405 of FIGS. 4-7 (either by reading other image data or writing a new image value).

FIGS. 4-7 above show various different ways in which the image values may be organized. But it may occur that different application programs 125 of FIG. 1 each want to access image values in image object 405, but expect the containers to be organized in different ways. For example, one application program might expect the image values to be organized as in FIG. 4, whereas another application program might expect the image values to be organized as in FIG. 5. If image object 405 of FIGS. 4-7 were locked into one or the other manner of organization, one or the other application program might be unable to access image values from image object 405 of FIGS. 4-7.

One possible solution would be to permit KV-SSD 120 to reorganize the container 820. For example, if image object 405 were organized as in FIG. 5 but application program 125 provided container 820 as "100%/4:0:0", KV-SSD 120 could change the order of the containers to "4:0:0/100%", which could then be used to locate image values 410-1 and 415-1 of FIG. 5. Essentially, KV-SSD 120 might parse key 815 and/or container 820 from information 810 to determine the various dimensions represented within information 810, and then reconstruct information 810 appropriate to the particular structure used to store the image values. The risk is that permitting KV-SSD 120 to change container 820 as provided by application program 125 might result in an incorrect rearrangement, leaving KV-SSD 120 unable to satisfy request 805. Instead, embodiments of the inventive concept may include both organizations shown in FIGS. 4-7 to be combined in a single image object. For example, consider FIG. 9 (which presents a much-reduced illustration relative to both FIGS. 4-5, but is sufficient for comprehension). As in FIG. 4, image object 405 includes first dimension container 425-1 and second dimension container 430-1, which may uniquely locate image values 410-1 and 415-1.

Figure 9:
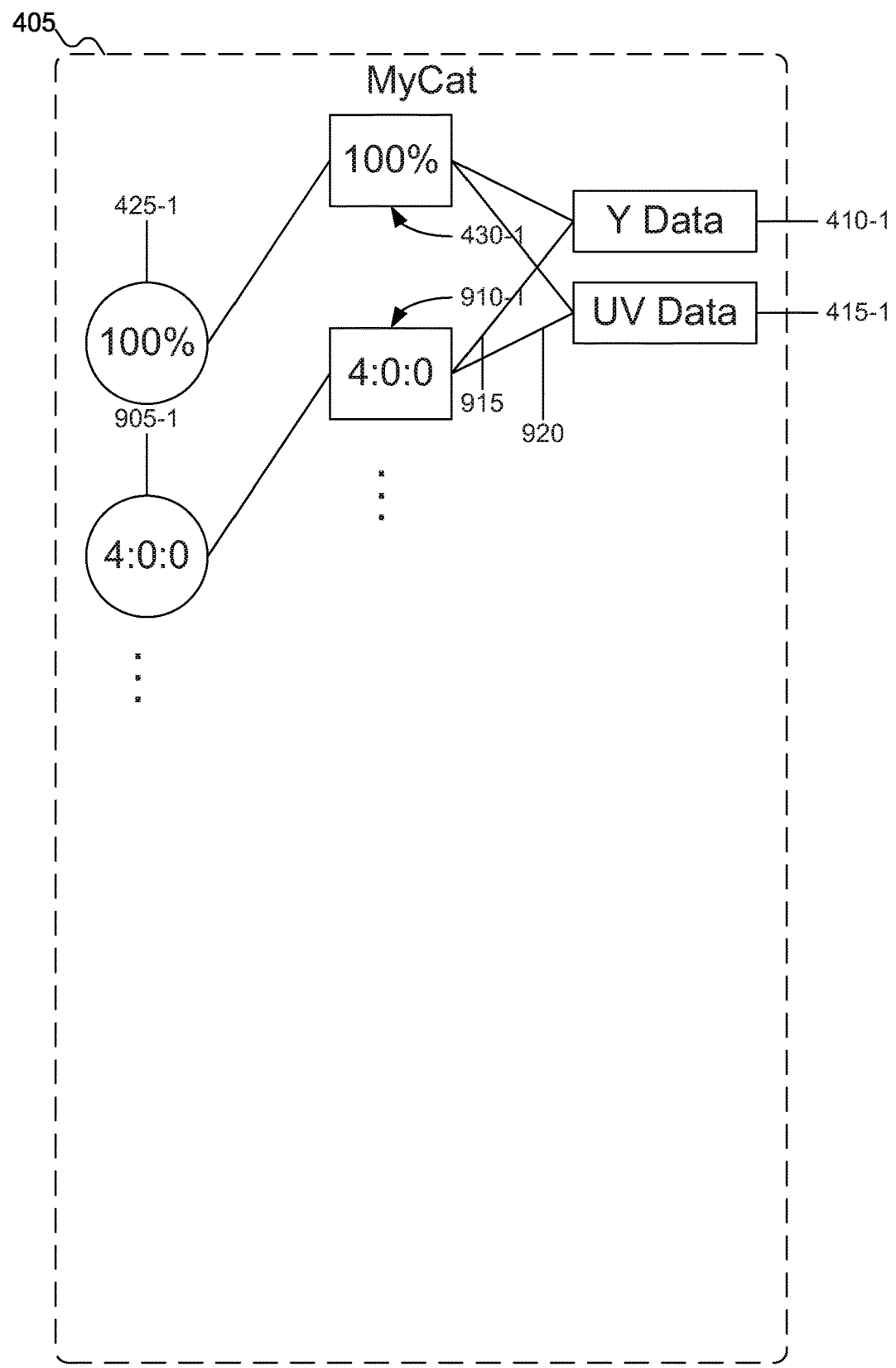
FIGS. 9-11 show other ways in which the image values of FIGS. 4-7 may be organized in the image object of FIGS. 4-7, according to embodiments of the inventive concept.

This arrangement permits application program 125 of FIG. 8 to provide container 820 of FIG. 8 as "100%/4:0:0". But in addition, FIG. 9 shows image object 405 as also including a third container 905-1 and fourth container 910-1. Third container 905-1 and fourth container 910-1 are essentially first dimension container 430-1 and second dimension container 425-1, respectively, of FIG. 5. Further, fourth container 910-1 may include pointers to image values 410-1 and 415-1, so that it appears as if image values 410-1 and 415-1 are located within fourth container 910-1 as well. Thus, application program 125 of FIG. 8 may provide container 820 of FIG. 8 as "4:0:0/100%", and still locate image values 410-1 and 415-1.

Note that containers 425-1 and 905-1 are both first dimension containers, but using different dimensions, and containers 430-1 and 910-1 are both second dimension containers, but (again) using different dimensions. In effect, image object 405 of FIG. 9 combines both data structures from FIGS. 4-5. In this manner, application program 125 of FIG. 8 does not need to worry about the particular order in which container 820 of FIG. 8 is specified.

Figure 10:
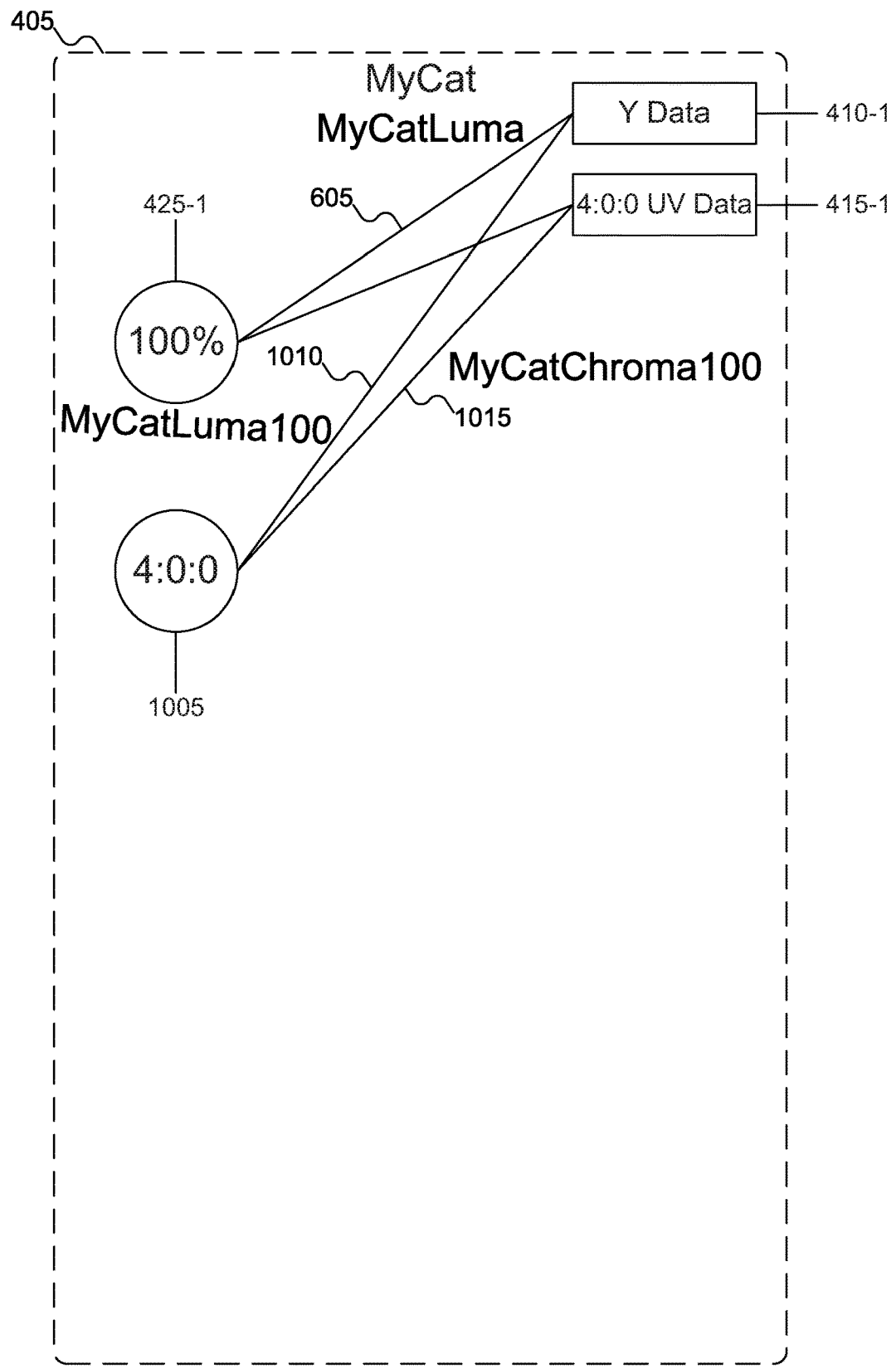

FIG. 10 is similar to FIG. 9, but shows a variation on the embodiment of the inventive concept shown in FIG. 6. Like FIG. 9, FIG. 10 is a reduced presentation sufficient for comprehension. In FIG. 10, two first dimension containers 425-1 and 1005 are shown: first dimension container 425-1 uses resolution as the first dimension, whereas first dimension container 1005 uses the Chroma Subsampling scheme as the first dimension. Both first dimension containers 425-1 and 1005 identify image values 410-1 and 415-1. But whereas the key "MyCatLuma" would be paired with first dimension container 425-1 to uniquely identify image value 410-1 (note that the key "MyCatLuma" includes information about what Chroma Subsampling scheme data is being requested as part of the key), the key "MyCatLuma100" would be paired with first dimension container 1005 to use link 1010 to access image value 410-1. The reason the key to use link 1010 would still need to include "Luma" is because the Chroma data may include multiple different Chroma files, even for a given Chroma Subsampling scheme: as shown in FIG. 6, the luma and Chroma data may be stored as separate image values. Similarly, to access image value 415-1 using first dimension container 1005 would require key "MyCatChroma100" to specify that the Chroma data is desired, for the image at 100% resolution.

Figure 11:
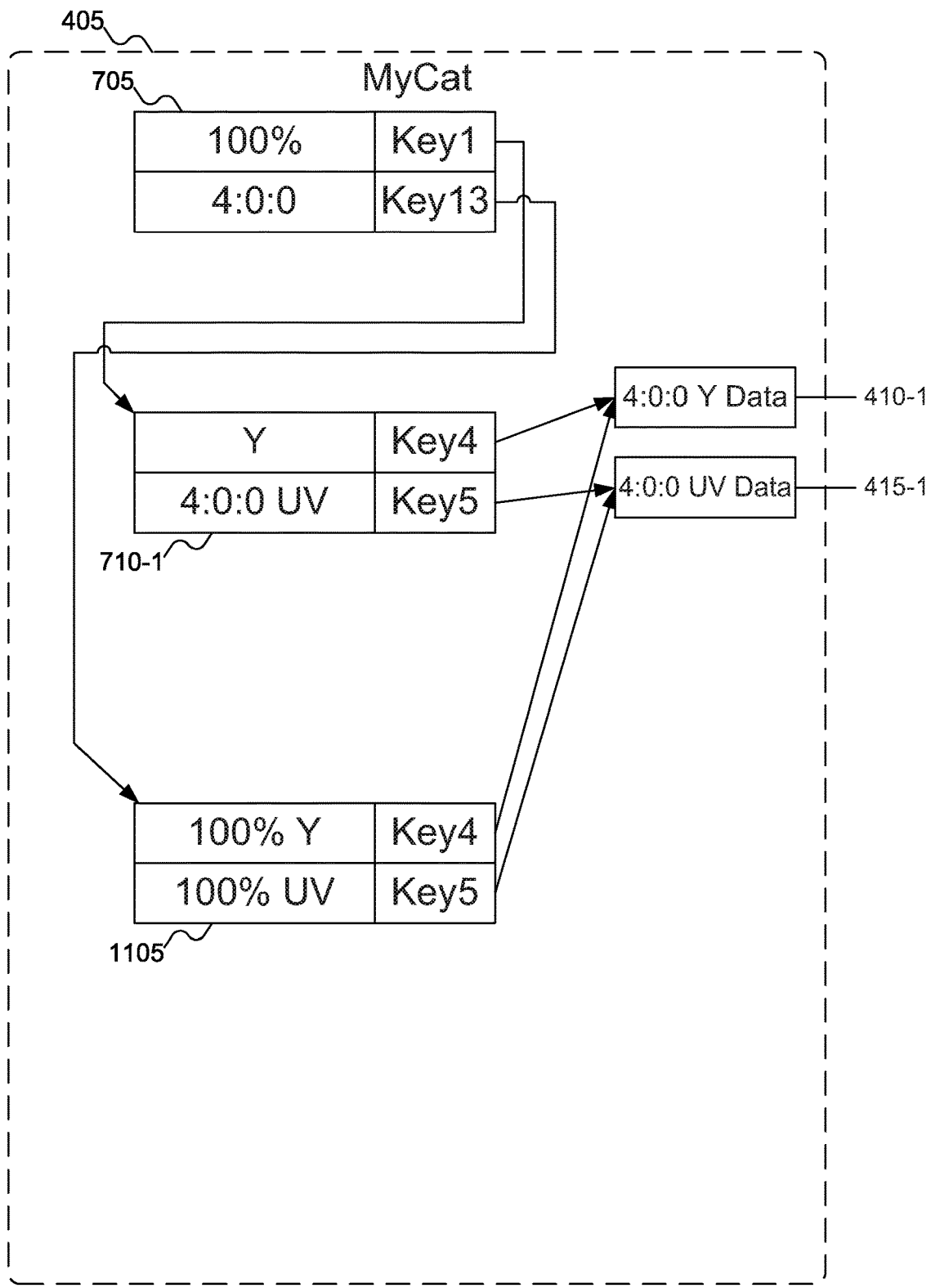

FIG. 11 is also similar to FIG. 9, but shows a variation on the embodiment of the inventive concept shown in FIG. 7. Like FIGS. 9-6, FIG. 11 is a reduced presentation sufficient for comprehension. In FIG. 11, table 705 may include entries along more than one dimension. Application program 125 of FIG. 1 may locate the entry in table 705 that represents the desired value for the dimension of interest, and use the associated key to access additional information. Thus, for example, if application program 125 of FIG. 1 were using resolution first, application program 125 of FIG. 1 may access key1 from table 705; otherwise, application program 125 of FIG. 1 may access key 13 from table 705. Either way, application program 125 of FIG. 1 may provide the selected key to KV-SSD 120, and receive either table 710-1 or table 1105 in response. But note that in both tables 710-1 and 1105, the keys for image objects 410-1 and 415-1 are the same, enabling application program 125 of FIG. 1 to access image objects 410-1 and 415-1 using the dimensions in any desired order.

Figure 12:
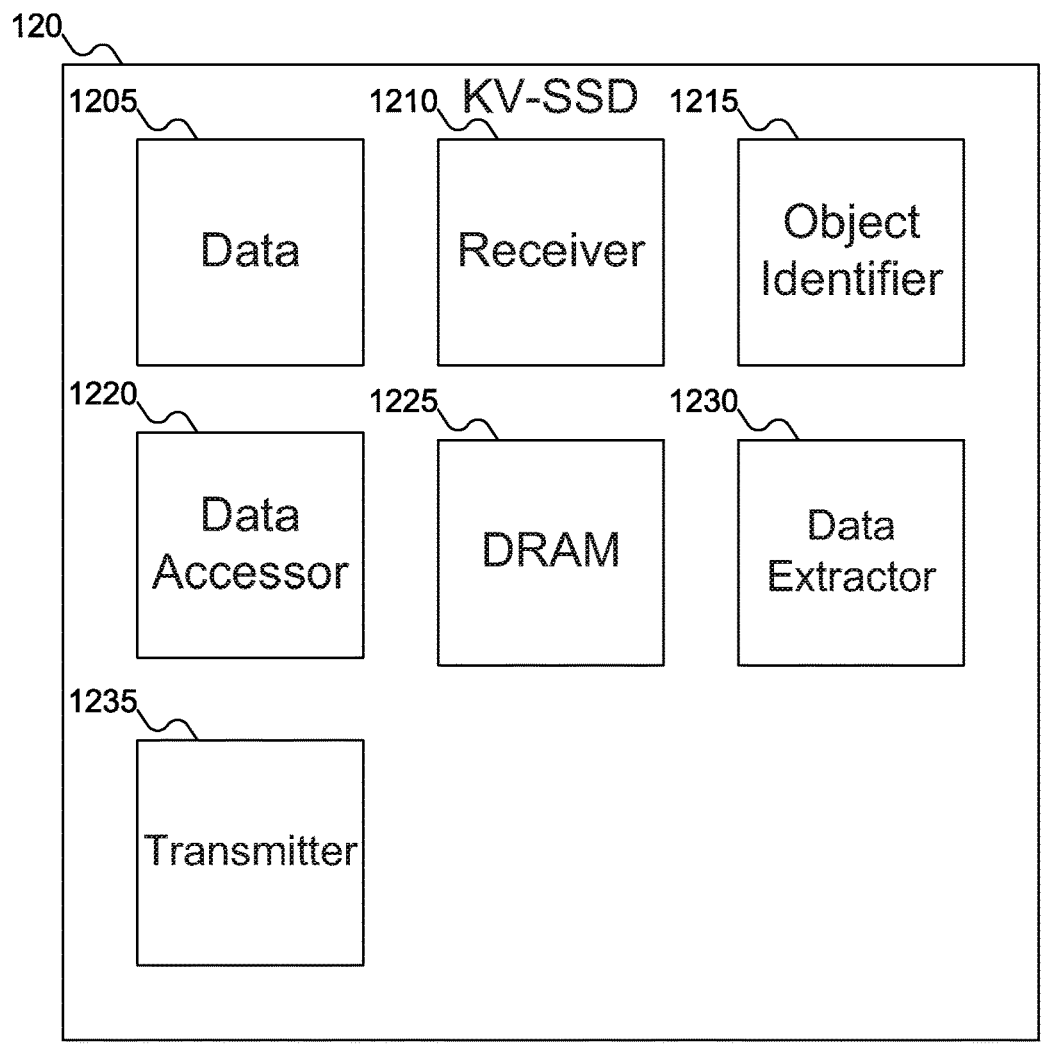
FIG. 12 shows details of the KV-SSD of FIG. 1.

FIG. 12 shows details of KV-SSD 120 of FIG. 1. In FIG. 12, a much-simplified KV-SSD 120 is shown, omitting details about how data is stored on flash memory chips in KV-SSD 120, the interface with machine 105 of FIG. 1, and other such details that are unchanged relative to conventional KV-SSDs.

In FIG. 12, KV-SSD 120 may include data 1205. Data 1205 may be stored in flash memory chips or any other desired format that may be used with KV-SSD 120: data 1205 may include image object 405 of FIGS. 4-7 and 9-11. KV-SSD 120 may also include receiver 1210, object identifier 1215, data accessor 1220, DRAM 1225, data extractor 1230, and transmitter 1235. Receiver 1210 may receive requests, such as request 805 of FIG. 8, from application program 125 of FIG. 1. As described above with reference to FIG. 8, request 805 may be either a read request or a write request, and may include information 810 and image data (if new image values are to be written to image object 405 of FIGS. 4-7 and 9-11). Object identifier 1215 may take key 815 of FIG. 8 from information 810 and map key 815 of FIG. 8 to an object stored in data 1205. Data accessor 1220 may then access image object 405 of FIGS. 4-7 and 9-11, as identified by object identifier 1215, from data 1205. DRAM 1225 may be used to store a copy of image object 405 of FIGS. 4-7 and 9-11 in a faster form of storage, in the expectation that image object 405 of FIGS. 4-7 and 9-11 will be used again. Although FIG. 12 shows DRAM 1225, embodiments of the inventive concept may store image object 405 of FIGS. 4-7 and 9-11 in other forms of storage than DRAM: any other form of storage may be used, as desired. Data extractor 1230 may extract particular image values from image object 405 of FIGS. 4-7 and 9-11: for example, if container 820 of FIG. 8 is "100%/4:0:0", data extractor 1230 may extract image values 410-1 and 415-1. Finally, transmitter 1235 may transmit any extracted image values (or the entirety of image object 405 of FIGS. 4-7 and 9-11, if appropriate) to application program 125 of FIG. 8.

Figure 13A:
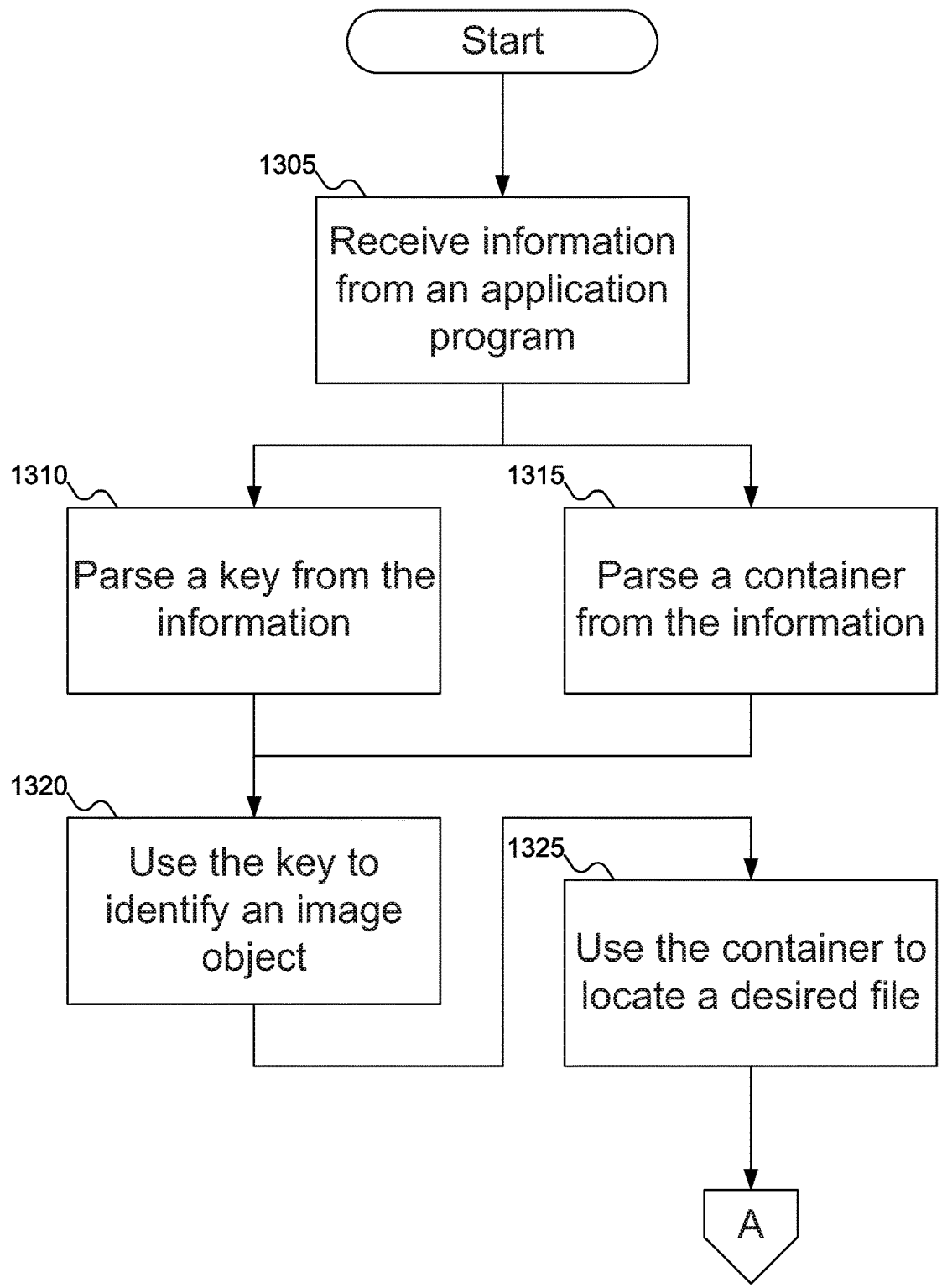
FIGS. 13A-13B show a flowchart of an example procedure for the KV-SSD of FIG. 1 to respond to a request for image data in the image object of FIGS. 4-5 and 9 in the KV-SSD of FIG. 1, according to an embodiment of the inventive concept.
Figure 13B:
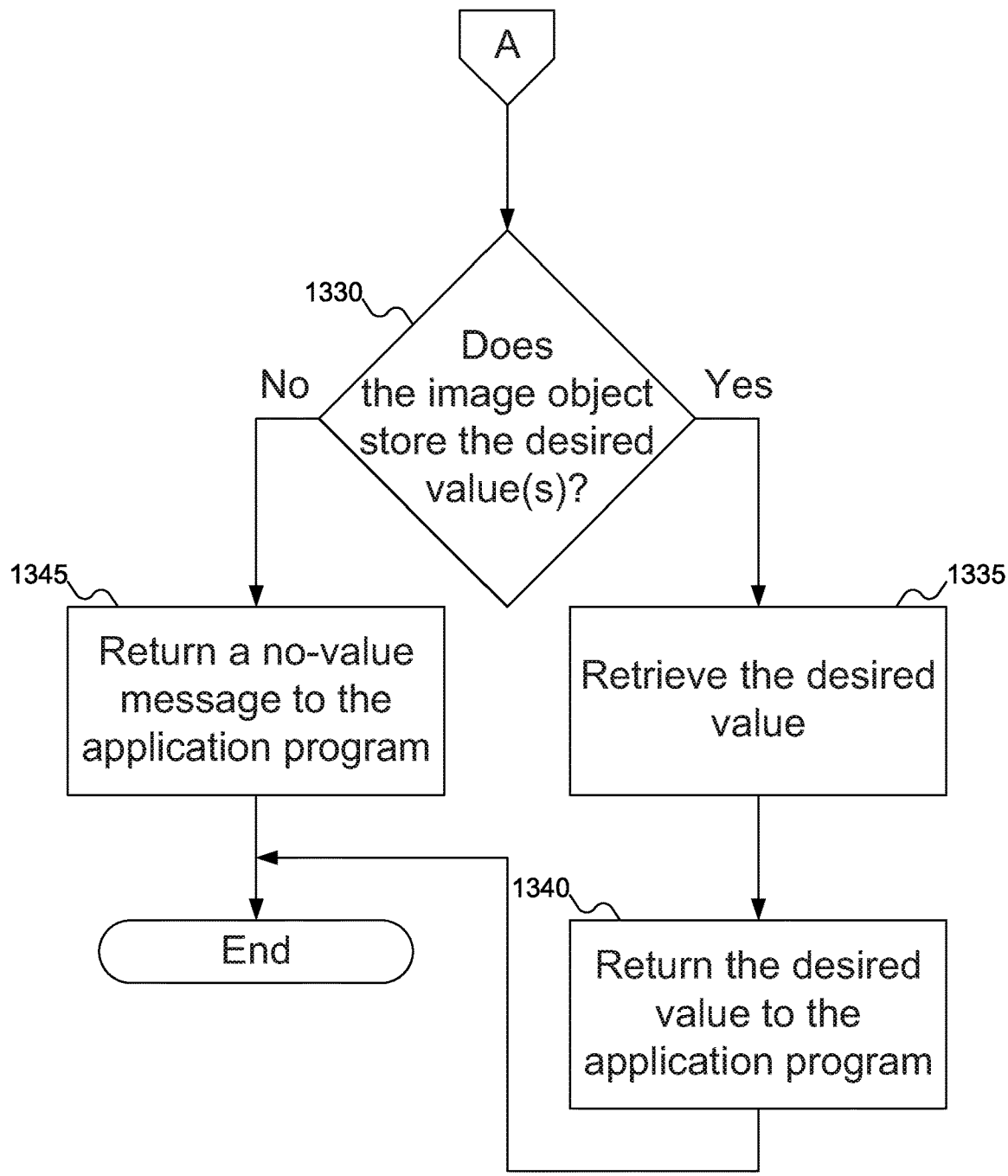

FIGS. 13A-13B show a flowchart of an example procedure for KV-SSD 120 of FIG. 1 to respond to a request for image data in image object 405 of FIGS. 4-5 and 9 in the KV-SSD of FIG. 1, according to an embodiment of the inventive concept. In FIG. 13A, at block 1305, receiver 1210 of FIG. 12 may receive request 805 of FIG. 8 from application program 125 of FIG. 8, which may include information 810 of FIG. 8. In FIGS. 13A-13B, request 805 is intended to be a read request: write requests are described in FIG. 14. At block 1310, KV-SSD 120 of FIG. 1 may parse information 810 of FIG. 8 to identify key 815 of FIG. 8 within information 810 of FIG. 8. At block 1315, KV-SSD 120 of FIG. 1 may parse information 810 of FIG. 8 to identify container 820 of FIG. 8 within information 810 of FIG. 8. Note that blocks 1310 and 1315 are not exclusive: depending on the embodiment of the inventive concept, either of blocks 1310 and 1315 may be executed or both blocks 1310 and 1315 may be executed, and in either order. At block 1320, object identifier 1215 of FIG. 12 may use key 815 of FIG. 8 from information 810 of FIG. 8 to identify image object 405 of FIGS. 4-5 and 9. At block 1325, data accessor 1220 of FIG. 12 may use container 820 of FIG. 8 from information 810 of FIG. 8 to identify a particular container in image object 405 of FIGS. 4-5 and 9 containing the desired image data.

At block 1330 (FIG. 13B), KV-SSD 120 of FIG. 8 may determine if the desired image values exist: for example, the desired image values might not exist if their containers do not exist. If the desired image values exist, then at block 1335 data accessor 1220 of FIG. 12 accesses the image values, and at block 1340 transmitter 1235 of FIG. 12 may transmit the accessed image values to application program 125 of FIG. 8. If the desired image values do not exist, then at block 1345 transmitter 1235 of FIG. 12 may transmit a "no-value" message to application program 125 of FIG. 8.

Figure 14:
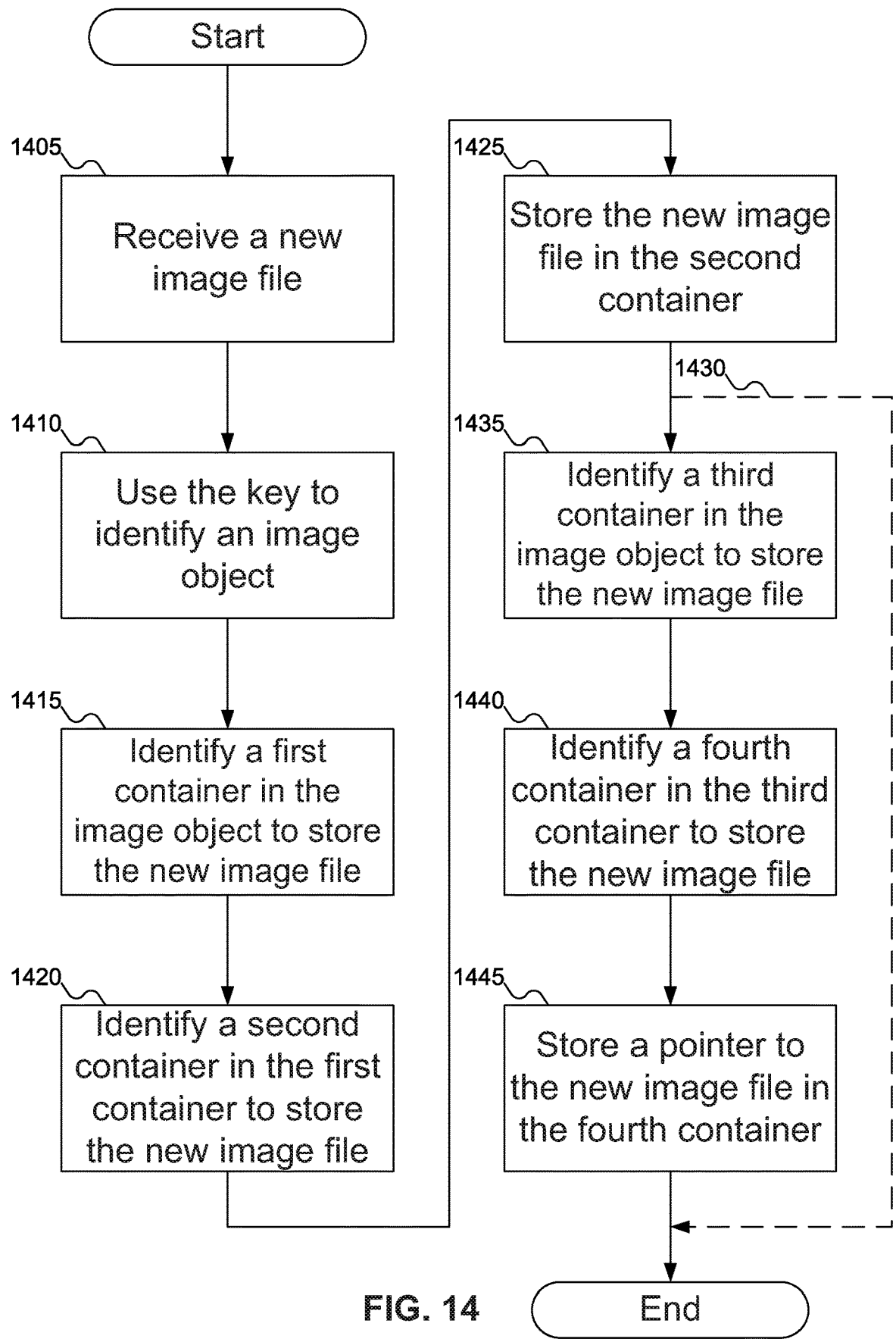
FIG. 14 shows a flowchart of an example procedure for the KV-SSD of FIG. 1 to store a new image value in the image object of FIGS. 4-5 and 9, according to an embodiment of the inventive concept.

FIG. 14 shows a flowchart of an example procedure for KV-SSD 120 of FIG. 1 to store a new image value in image object 405 of FIGS. 4-5 and 9, according to an embodiment of the inventive concept. In FIG. 14, at block 1405, receiver 1210 of FIG. 12 may receive request 805 of FIG. 8, along with information 810 of FIG. 8 and a new image file (or more than one new image file) from application program 125 of FIG. 8. At block 1410, object identifier 1215 of FIG. 12 may use key 815 of FIG. 8 from information 810 of FIG. 8 to identify image object 405 of FIGS. 4-5 and 9. At block 1415, data accessor 1220 of FIG. 12 may use container 820 of FIG. 8 from information 810 of FIG. 8 to identify a target first dimension container in image object 405 of FIGS. 4-5 and 9. At block 1420, data accessor 1220 of FIG. 12 may use container 820 of FIG. 8 from information 810 of FIG. 8 to identify a target second dimension container in image object 405 of FIGS. 4-5 and 9. In the remaining discussion of FIG. 14, it is assumed that the target first dimension container and the target second dimension containers exist; if not, then KV-SSD 120 of FIG. 8 may create these containers within image object 405 of FIGS. 4-5 and 9 as needed to proceed.

At block 1425, KV-SSD 120 of FIG. 8 may store the new image value(s) in the target second dimension container, after which processing may conclude (as shown by dashed arrow 1430). But if image object 405 of FIGS. 4-5 and 9 includes multiple overlapping container structures as described above with reference to FIG. 9, then at block 1435 KV-SSD 120 of FIG. 8 may locate another first dimension container that ought to contain the new image value (for example, by changing the order of containers within container 820 of FIG. 8 from information 810 of FIG. 8), and at block 1440 KV-SSD 120 of FIG. 8 may locate another second dimension container that ought to contain the new image value. Finally, at block 1445, KV-SSD 120 of FIG. 8 may store the new image value in the additional second dimension container (or link the image value stored in block 1425 to the additional second dimension container, perhaps using a pointer). Although FIG. 14 as shown completes processing at this point, control may also return again to block 1435 to repeat the process to store the new image value in yet another container path, if appropriate.

Figure 15:
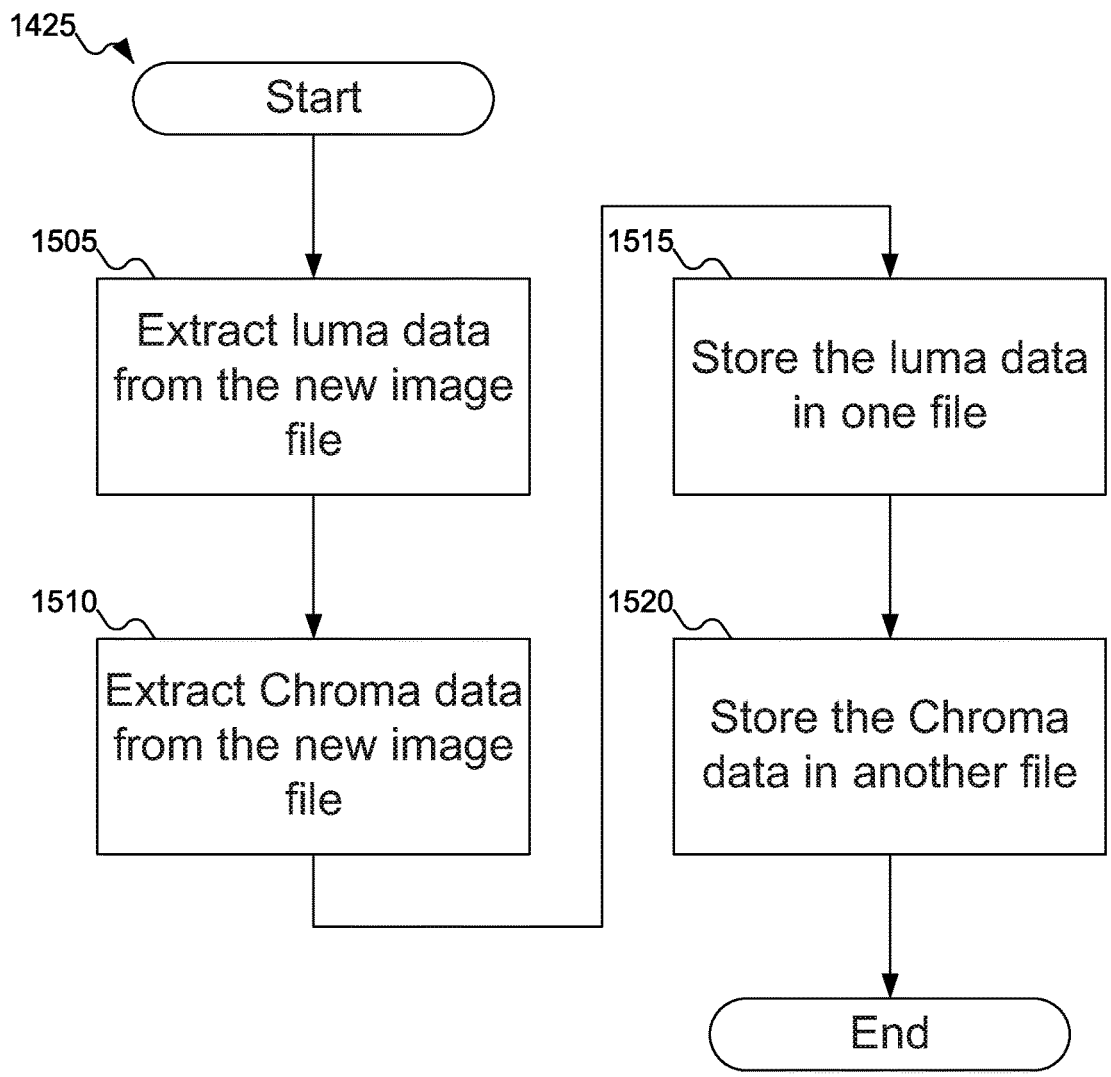
FIG. 15 shows a flowchart of an example procedure for the KV-SSD of FIG. 1 to store a new image value in the image object of FIGS. 4-5 and 9, according to an embodiment of the inventive concept.

FIG. 15 shows a flowchart of an example procedure for KV-SSD 120 of FIG. 1 to store a new image value in image object 405 of FIGS. 4-5 and 9, according to an embodiment of the inventive concept. In FIG. 15, at block 1505, data extractor 1230 of FIG. 12 may extract the luma data from the new image file, and at block 1510, data extractor 1230 of FIG. 12 may extract the Chroma data from the new image file. At block 1515, KV-SSD 120 of FIG. 8 may store the extracted luma data in one value in data 1205 of FIG. 12, and at block 1520, KV-SSD 120 of FIG. 8 may store the extracted Chroma data in another value in data 1205 of FIG. 12.

Figure 16A:
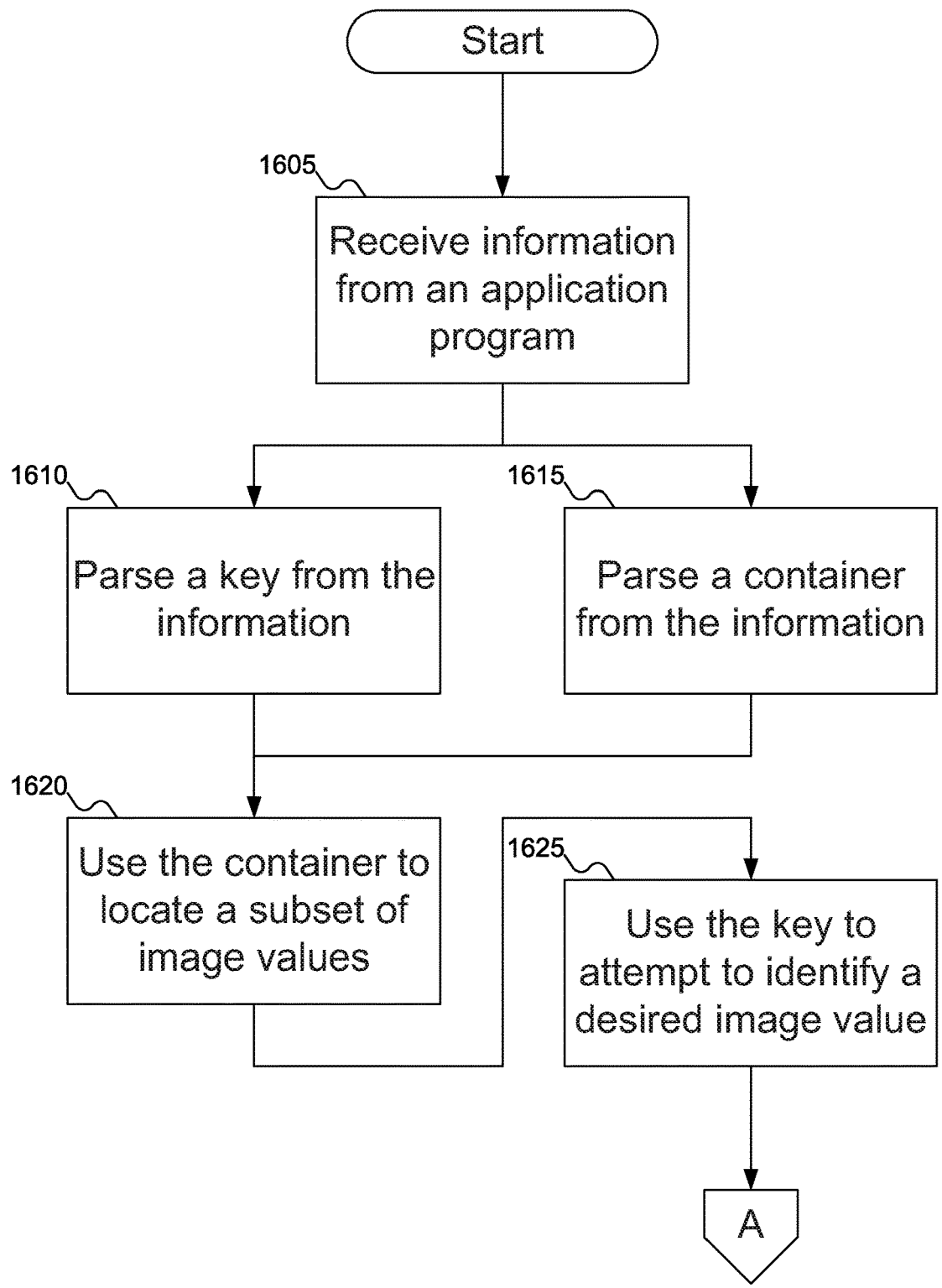
FIGS. 16A-16B show a flowchart of an example procedure for the KV-SSD of FIG. 1 to respond to a request for image data in the image object of FIGS. 6 and 10 in the KV-SSD of FIG. 1, according to an embodiment of the inventive concept.
Figure 16B:
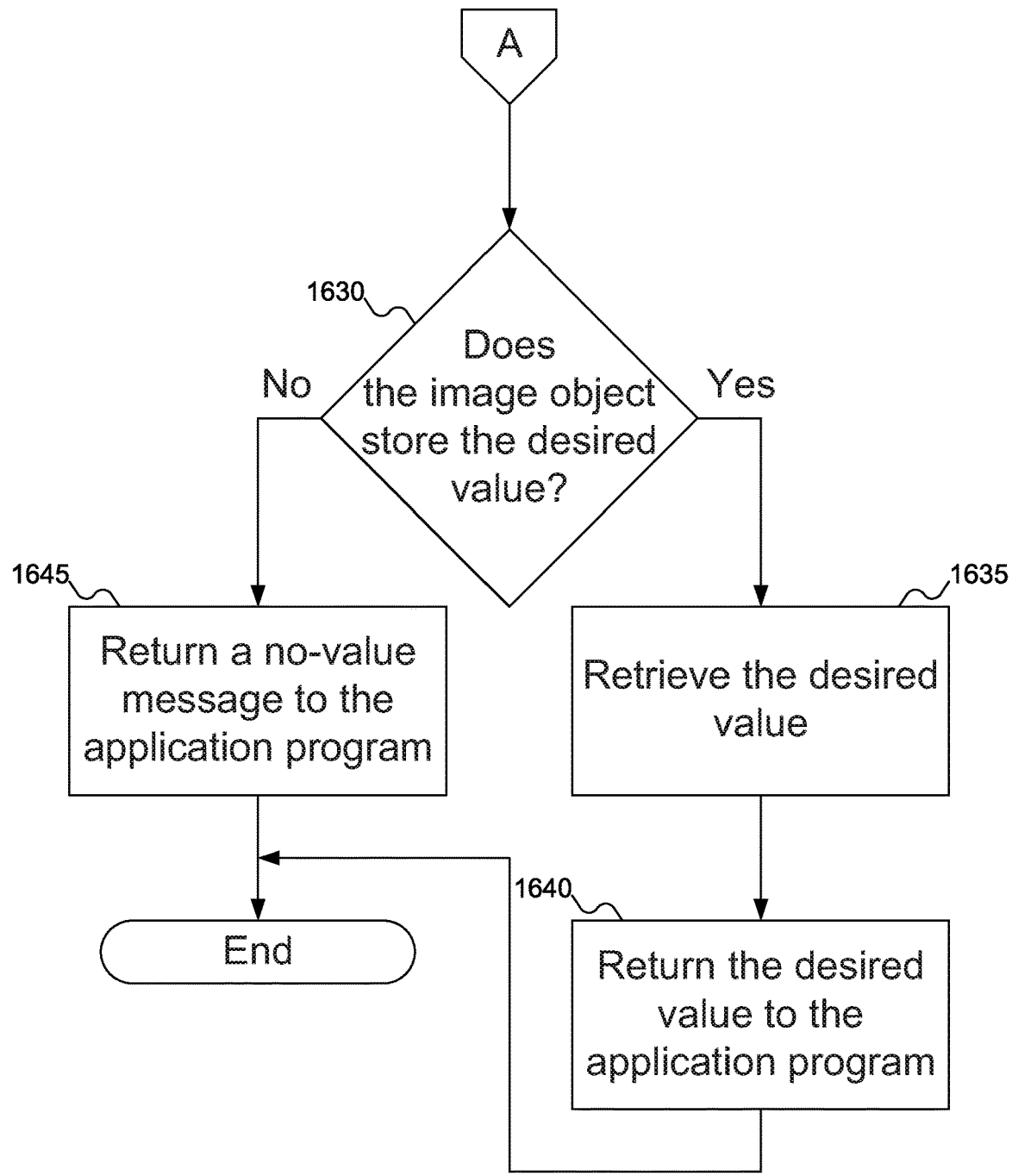

FIGS. 16A-16B show a flowchart of an example procedure for KV-SSD 120 of FIG. 1 to respond to a request for image data in image object 405 of FIGS. 6 and 9 in KV-SSD 120 of FIG. 1, according to an embodiment of the inventive concept. In FIG. 16A, at block 1605, KV-SSD 120 of FIG. 1 may receive information 810 of FIG. 8 from application program 125 of FIG. 1. At block 1610, KV-SSD 120 of FIG. 1 may parse information 810 of FIG. 8 to identify key 815 of FIG. 8 within information 810 of FIG. 8. At block 1615, KV-SSD 120 of FIG. 1 may parse information 810 of FIG. 8 to identify container 820 of FIG. 8 within information 810 of FIG. 8. Note that blocks 1610 and 1615 are not exclusive: depending on the embodiment of the inventive concept, either of blocks 1610 and 1615 may be executed or both blocks 1610 and 1615 may be executed, and in either order. At block 1620, KV-SSD 120 of FIG. 1 may use container 820 of FIG. 8 of information 810 of FIG. 8 to identify first dimension container 425-1, 425-2, or 425-3 of FIG. 6. At block 1625, KV-SSD 120 of FIG. 1 may use key 815 of FIG. 8 of information 810 of FIG. 8 to attempt to identify desired image value 410-1, 410-4, 415-1, 415-2, 415-3, 415-4, 415-5, 415-6, or 420 of FIG. 6 in the identified first dimension container.

At block 1630 (FIG. 16B), KV-SSD 120 of FIG. 1 may determine if the desired image value is found in the identified first dimension container. If yes, then at block 1635 KV-SSD 120 of FIG. 1 may retrieve the desired image value, and at block 1640 KV-SSD 120 of FIG. 1 may send the desired image value to application program 125 of FIG. 1. Otherwise, at block 1645, KV-SSD 120 of FIG. 1 may send "no-value" message 835 of FIG. 8 to application program 125 of FIG. 1, indicating that the desired image value could not be found in the identified first dimension container.

Figure 17:
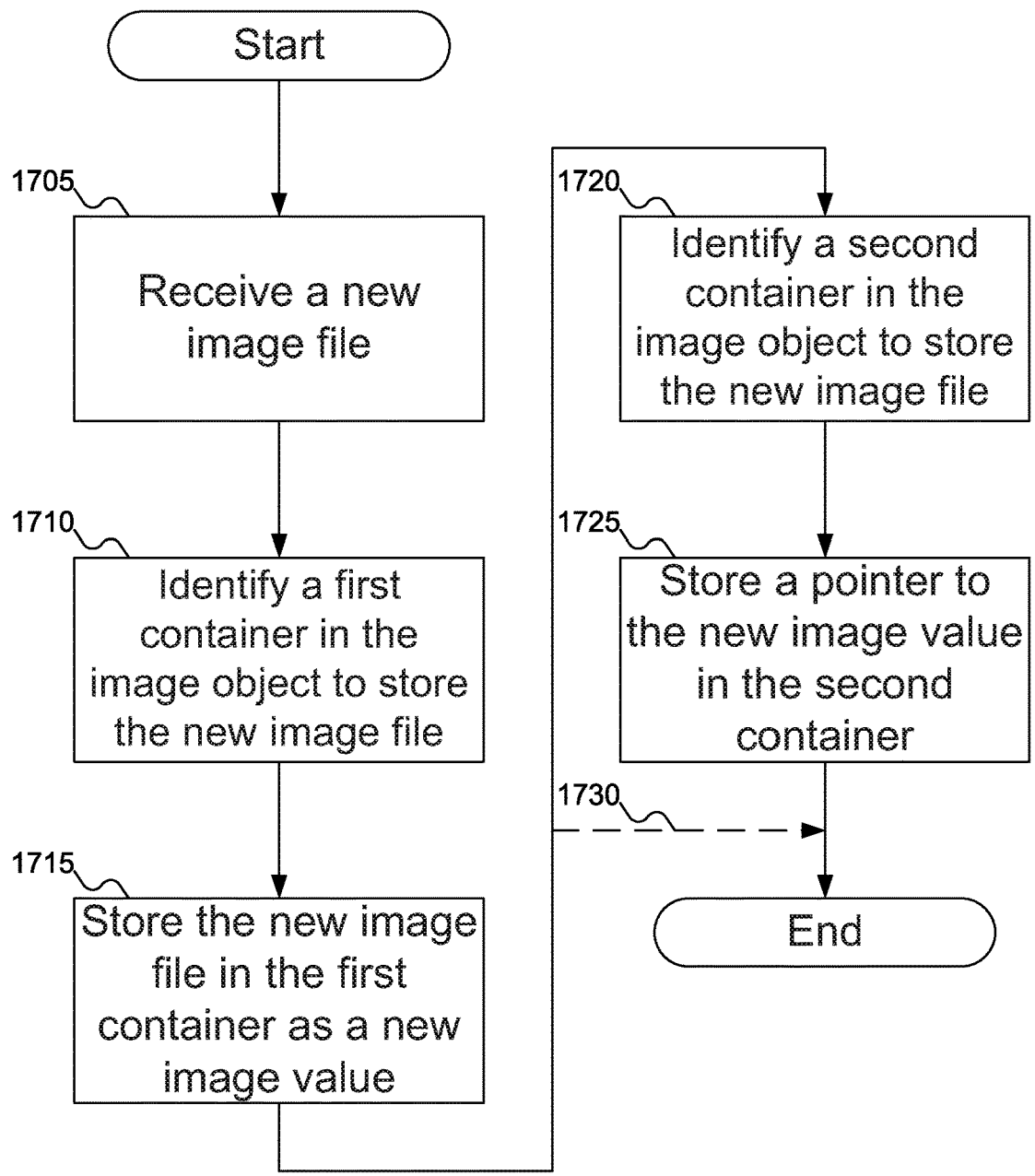
FIG. 17 shows a flowchart of an example procedure for the KV-SSD of FIG. 1 to store a new image value in the image object of FIGS. 6 and 10, according to an embodiment of the inventive concept.

FIG. 17 shows a flowchart of an example procedure for KV-SSD 120 of FIG. 1 to store a new image value in image object 405 of FIGS. 6 and 9, according to an embodiment of the inventive concept. In FIG. 17, at block 1705, KV-SSD 120 of FIG. 1 may receive a new image file from application program 125 of FIG. 1. At block 1710, KV-SSD 120 of FIG. 1 may identify first dimension container 425-1, 425-2, or 425-3 of FIG. 6, within which the new image file is to be stored as a new image value. Note that if the identified first dimension container does not exist, it may be created. For example, if the new image file was at 25% resolution and first dimension container 425-3 of FIG. 6 did not exist, first dimension container 425-3 of FIG. 6 may be created first. Then, at block 1715, KV-SSD 120 of FIG. 1 may store the new image value in the identified first dimension container.

At block 1720, KV-SSD 120 of FIG. 1 may identify second dimension container 1005 of FIG. 10, within which the new image file is also to be stored as the new image value. Note that if the identified second dimension container does not exist, it may be created. For example, if the new image file used the 4:0:0 Chroma Subsampling scheme and second dimension container 1005 of FIG. 10 did not exist, second dimension container 1005 of FIG. 10 may be created first. Then, at block 1725, KV-SSD 120 of FIG. 1 may store the new image value in the identified second dimension container. Blocks 1720 and 1725 may be skipped, as shown by dashed line 1730.

Figure 18A:
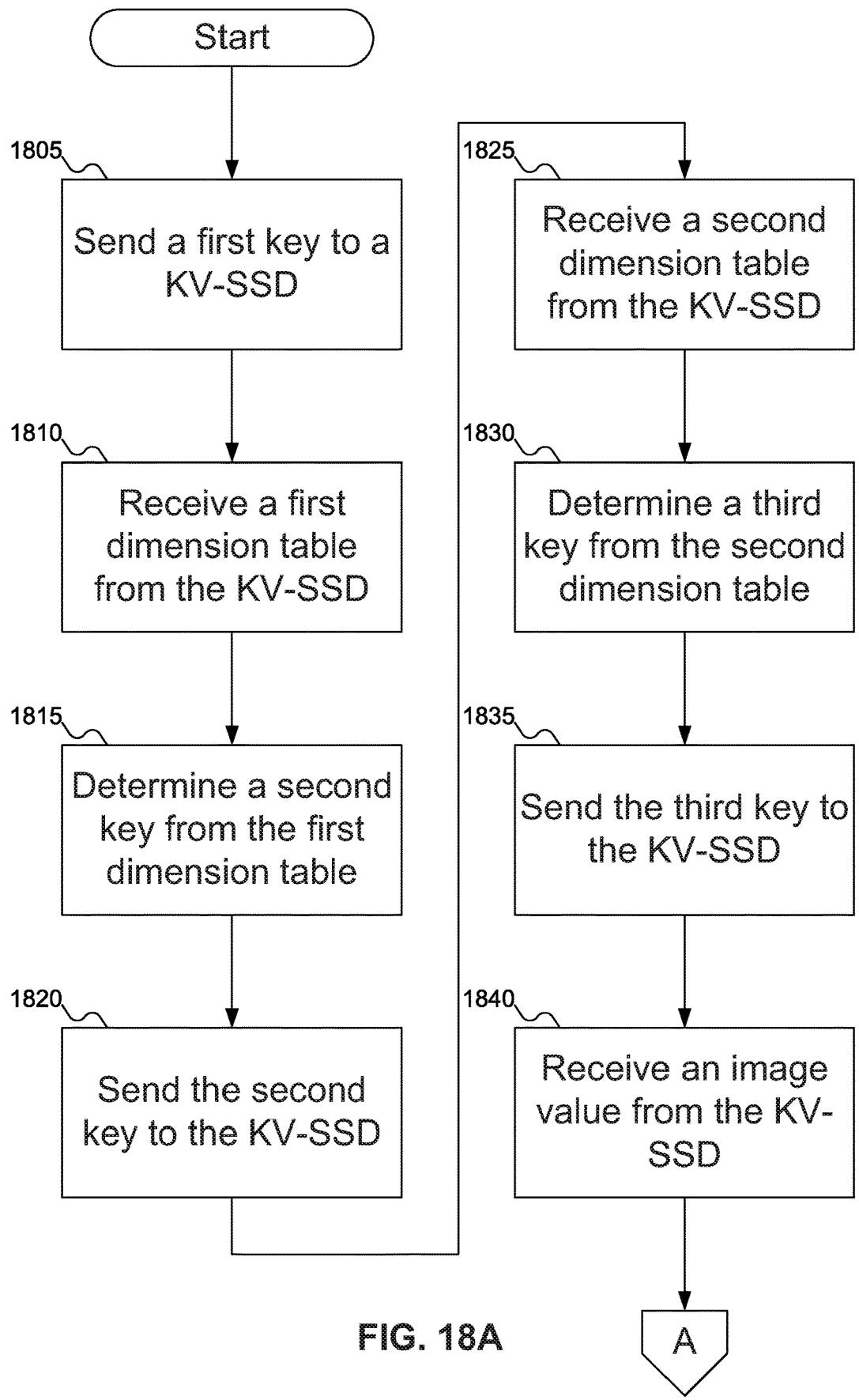
FIGS. 18A-18B show a flowchart of an example procedure for the application program of FIG. 1 to request image data in the image object of FIGS. 7 and 11 from the KV-SSD of FIG. 1, according to an embodiment of the inventive concept.
Figure 18B:
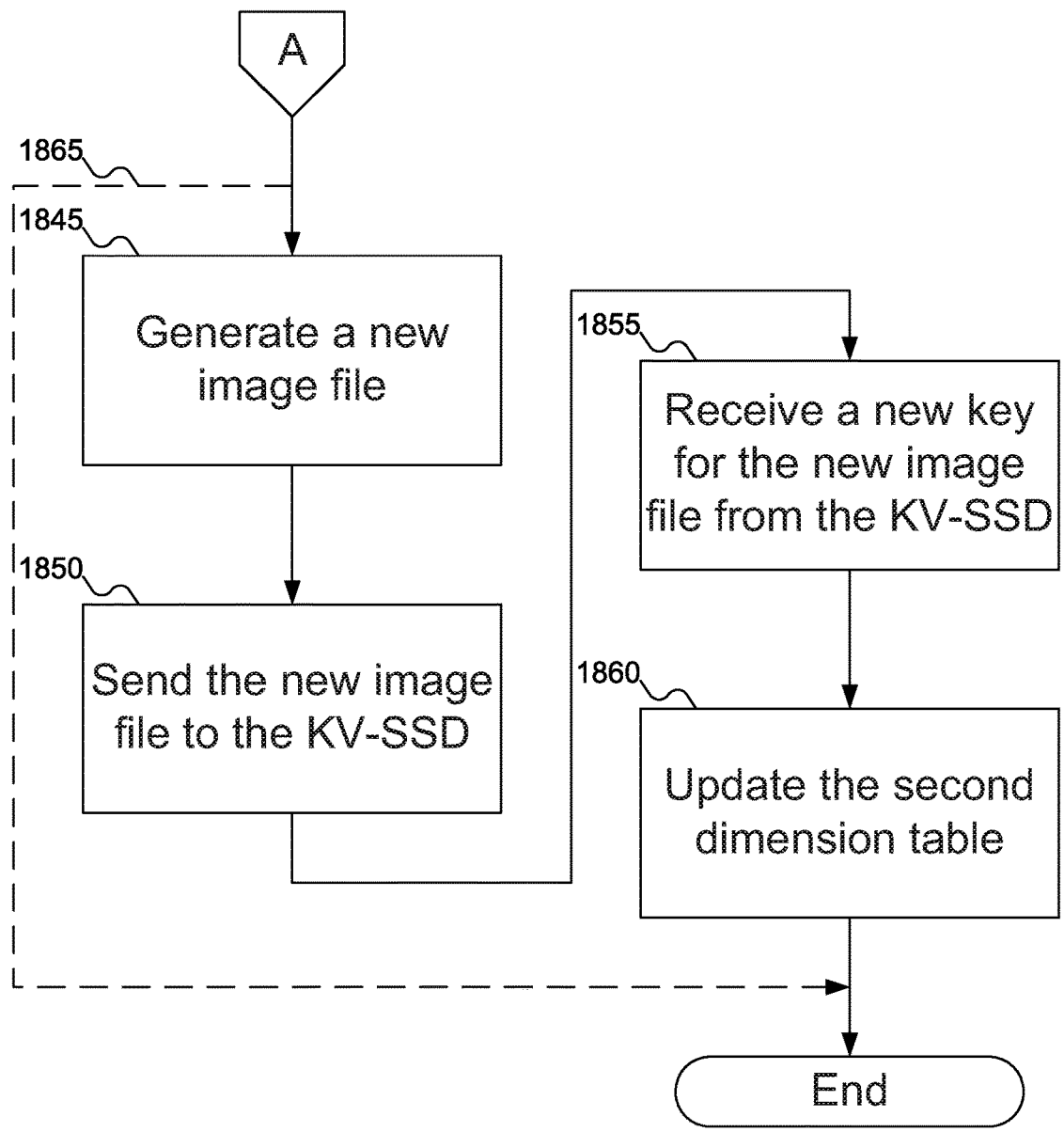

FIGS. 18A-18B show a flowchart of an example procedure for application program 125 of FIG. 1 to request image data in image object 405 of FIGS. 7 and 11 from KV-SSD 120 of FIG. 1, according to an embodiment of the inventive concept. In FIG. 18A, at block 1805, application program 125 of FIG. 1 may send a first key to KV-SSD 120 of FIG. 1. This first key may be a key for image object 405 of FIGS. 4-7 and 9-11. At block 1810, application program 125 of FIG. 1 may receive table 705 of FIG. 7, which may organize the image values according to a first dimension. At block 1815, application program 125 of FIG. 1 may determine a second key from table 705. Application program 125 of FIG. 1 may use a desired resolution or Chroma Subsampling scheme for the image value being sought, depending on the data available in table 705, to select the second key. Note that if the specific resolution or Chroma Subsampling scheme sought is not available on KV-SSD 120 of FIG. 1, application program 125 of FIG. 1 may select an alternative resolution or Chroma Subsampling scheme, and potentially use the received image value to generate a new image file at the desired resolution and Chroma Subsampling scheme.

At block 1820, application program 125 of FIG. 1 may send a second key to KV-SSD 120 of FIG. 1. At block 1825, application program 125 of FIG. 1 may receive table 710-1, 710-2, or 710-3 of FIG. 7, which may organize the image values according to a second dimension. At block 1830, application program 125 of FIG. 1 may determine a third key from the received table. Application program 125 of FIG. 1 may use a desired resolution or Chroma Subsampling scheme for the image value being sought, depending on the data available in the received table, to select the third key.

At block 1835, application program 125 of FIG. 1 may send the third key to KV-SSD 120 of FIG. 1. At block 1840, application program 125 of FIG. 1 may receive desired image value 410-1, 410-4, 415-1, 415-2, 415-3, 415-4, 415-5, 415-6, or 420 of FIG. 7 from KV-SSD 120 of FIG. 1.

At block 1845 (FIG. 18B), application program 125 of FIG. 1 may generate a new image file. At block 1850, application program 125 of FIG. 1 may send the new image file to KV-SSD 120 of FIG. 1. At block 1855, application program 125 of FIG. 1 may receive a new key for the new image value from KV-SSD 120 of FIG. 1. At block 1860, application program 125 of FIG. 1 may use the new key to update tables 705, 710-1, 710-2, and/or 710-3 of FIG. 7, to reflect the storage of the new image value. Note that in some embodiments of the inventive concept blocks 1855 and 1860 may be performed by KV-SSD 120 of FIG. 1, if KV-SSD 120 of FIG. 1 has enough information to determine which data structures on KV-SSD 120 of FIG. 1 relate to the image object of which the new image file is a new resolution/Chroma Subsampling scheme. In addition, if no new image file needs to be generated, blocks 1845-1860 may be skipped, as shown by dashed line 1865.

Figure 19:
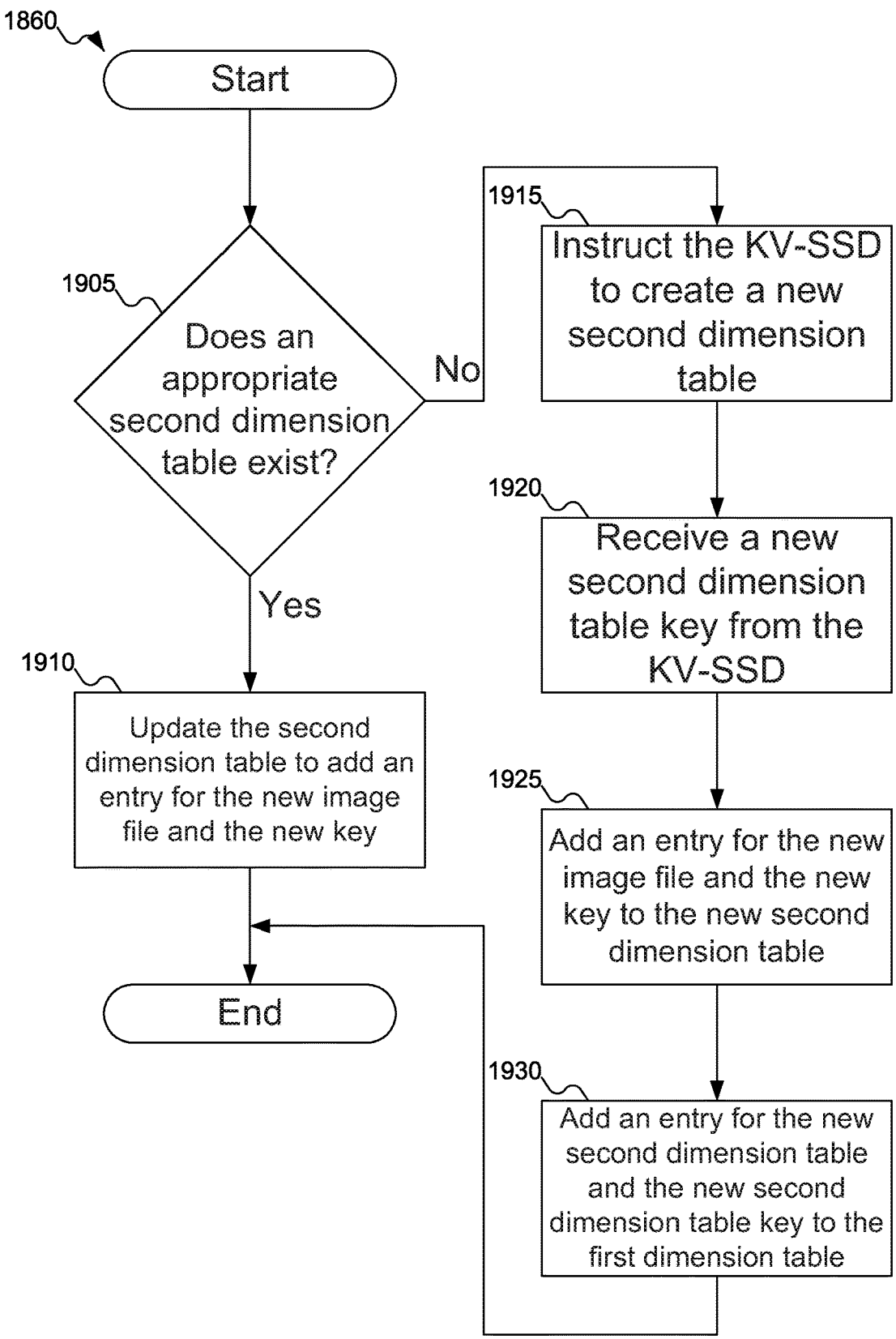
FIG. 19 shows a flowchart of an example procedure for the application program of FIG. 1 to update the data structures of FIG. 7 to store a new image value in the image object of FIGS. 7 and 11 in the KV-SSD of FIG. 1, according to an embodiment of the inventive concept.

FIG. 19 shows a flowchart of an example procedure for application program 125 of FIG. 1 to update data structures 705, 710-1, 710-2, and/or 710-3 of FIG. 7 to store a new image value in image object 405 of FIGS. 7 and 9 in KV-SSD 120 of FIG. 1, according to an embodiment of the inventive concept. In FIG. 19, at block 1905, application program 125 of FIG. 1 may determine if the appropriate second dimension table 710-1, 710-2, or 710-3 of FIG. 7 exists. If so, then at block 1910 application program 125 of FIG. 1 may add a new entry to the appropriate second dimension table to reflect the new image value/new key pair. Otherwise, at block 1915, application program 125 of FIG. 1 may instruct KV-SSD 120 of FIG. 1 to create a new second dimension table object. At block 1920, application program 125 of FIG. 1 may receive a key for the new second dimension table from KV-SSD 120 of FIG. 1. At block 1925, application program 125 of FIG. 1 may add an entry to the new second dimension table object to reflect the new image value/new key pair. Finally, at block 1930, application program 125 of FIG. 1 may update first dimension table 705 of FIG. 7 to reflect the new second dimension table/new second dimension table key pair. Note that first dimension table 705 of FIG. 7 must exist, or else KV-SSD 120 of FIG. 1 does not store image object 405 of FIG. 4 at all. Note also that in some embodiments of the inventive concept the flowchart shown in FIG. 19 may be performed by KV-SSD 120 of FIG. 1, if KV-SSD 120 of FIG. 1 has enough information to determine which data structures on KV-SSD 120 of FIG. 1 relate to the image object of which the new image file is a new resolution/Chroma Subsampling scheme.

The above description focuses on how to manage storage of a single image using a single KV-SSD. But not all storage devices are the same. Various different storage devices offer different levels of performance. As a general rule, Dynamic Random Access Memory (DRAM) and other forms of volatile memory are faster than KV-SSDs, which are faster than other SSDs (such as block-based SSDs, Small Computer System Interface (SCSI) SSDs, Serial Attached SCSI (SAS) SSDs, and Serial AT Attachment (SATA) SSDs), which are faster than hard disk drives (using any desired interface, such as SCSI, SAS, or SATA), which are faster than tape drives. But while the speed of access (also termed latency) of these devices may vary, so does the storage capacity offered by the storage devices, as well as their overall cost. Again, as a general rule, faster devices tend to be more expensive and offer less overall storage capacity. Thus, storage systems often offer a mix of different storage types, with different performance offerings.

Thus, it would be beneficial to utilize the different performance characteristics of different classes of storage devices to best effect. Images that are accessed with relative frequency may be stored in storage devices that offer faster access time, whereas images that are accessed less frequently may be stored in storage devices that offer greater storage capacity. Much like a cache system, images may be migrated from tier to tier as appropriate for the image.

But if an image may be stored in any of a number of different storage devices (which may be assigned to different storage tiers), the time required to locate the image may become a significant factor. A simplistic implementation would simply try storage devices, either sequentially or in parallel, until the image is successfully located. But the time required to perform a sequential hunt for the image might end up being significant: the time required grows roughly proportionately to the number of storage devices. And performing a hunt in parallel, while faster than a sequential search, places a burden on every storage device in the storage system to look for the image, even though most of the time the image might be stored on no more than one storage device.

Thus, in addition to offering multiple tiers of storage, a storage system should have a way to quickly locate where a particular image is stored so that a request may be sent to a single storage device to retrieve the image. The time required to perform this search should be relatively small so that the search time does not dominate the time required to retrieve the image, and still avoid needing to send requests to retrieve the image from multiple storage devices.

Figure 20:
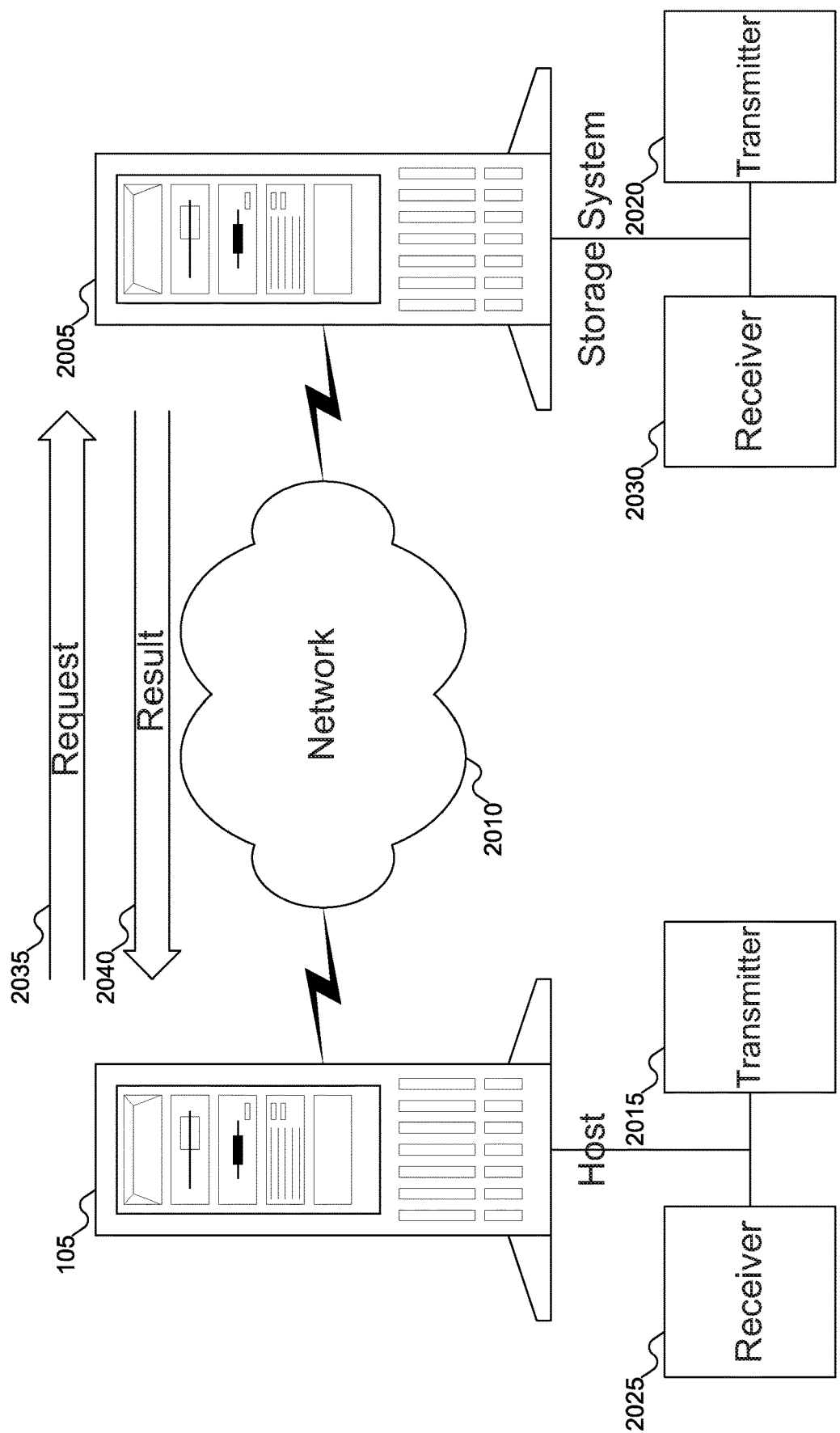
FIG. 20 shows a host and a storage system communicating to manage image access, according to an embodiment of the inventive concept.

FIG. 20 shows a host and a storage system communicating to manage image access, according to an embodiment of the inventive concept. In FIG. 20, host 105 is shown communicating with storage system 2005. Host 105 and storage system 2005 may be connected by network 2010. Network 2010 may be any desired network. Examples of possible networks include Local Area Networks (LANs), Wide Area Networks (WANs), Metropolitan Area Networks (MANs), and global networks (such as the Internet). Network 2010 may also be a direct connection between host 105 and storage system 2005 (that is, communication without any routing equipment interposed between host 105 and storage system 2005). Network 2010 may also use either wired or wireless connections. Further, network 2010 may include any desire combination of network types. For example, network 2010 may include a wireless connection between host 105 and a router, which then connects to a global network, which connects to a wired LAN to which storage system 2005 is connected.

In some embodiments of the inventive concept, network 2010 may be eliminated entirely: host 105 and storage system 2005 may be the same physical machine. In such embodiments of the inventive concept, the functions of transmitters 2015 and 2020 and receivers 2025 and 2030 (discussed below) are more theoretical than physical: there may be no need to manage converting a message from a form used internally by a computer into another form for transmission across a network.

Transmitters 2015 and 2020 enable host 105 and storage system 2005, respectively, to send data across network 2010. Receivers 2025 and 2030 enable host 105 and storage system 2005, respectively, to receive data across network 2010. Transmitters 2015 and 2020 and receivers 2025 and 2030 may be conventional transmitters and receivers designed to send and receive data across networks, and may be embodied, for example, in conventional network interface cards or other network interface hardware (such as Wi-Fi®, Bluetooth®, cellular wireless networks such as 5G, or other wireless technology). (Wi-Fi is a registered trademark of Wi-Fi Alliance. Bluetooth is a registered trademark owned by Bluetooth SIG, Inc.)

In operation, host 105 may send request 2035 to storage system 2005. Request 2035 may be a request to store a new image in storage system 2005, or it may be a request to retrieve a particular image from storage system 2005. Storage system 2005 may then process request 2035 (as discussed below) and return result 2040 to host 105. Result 2040 may be a result indicating whether the image was successfully stored in storage system 2005 (if request 2035 was a request to store a new image in storage system 2005), or result 2040 may be a copy of the requested image or a message that the image could not be located in storage system 2005 (if request 2035 was a request to retrieve an image from storage system 2005).

Figure 21:
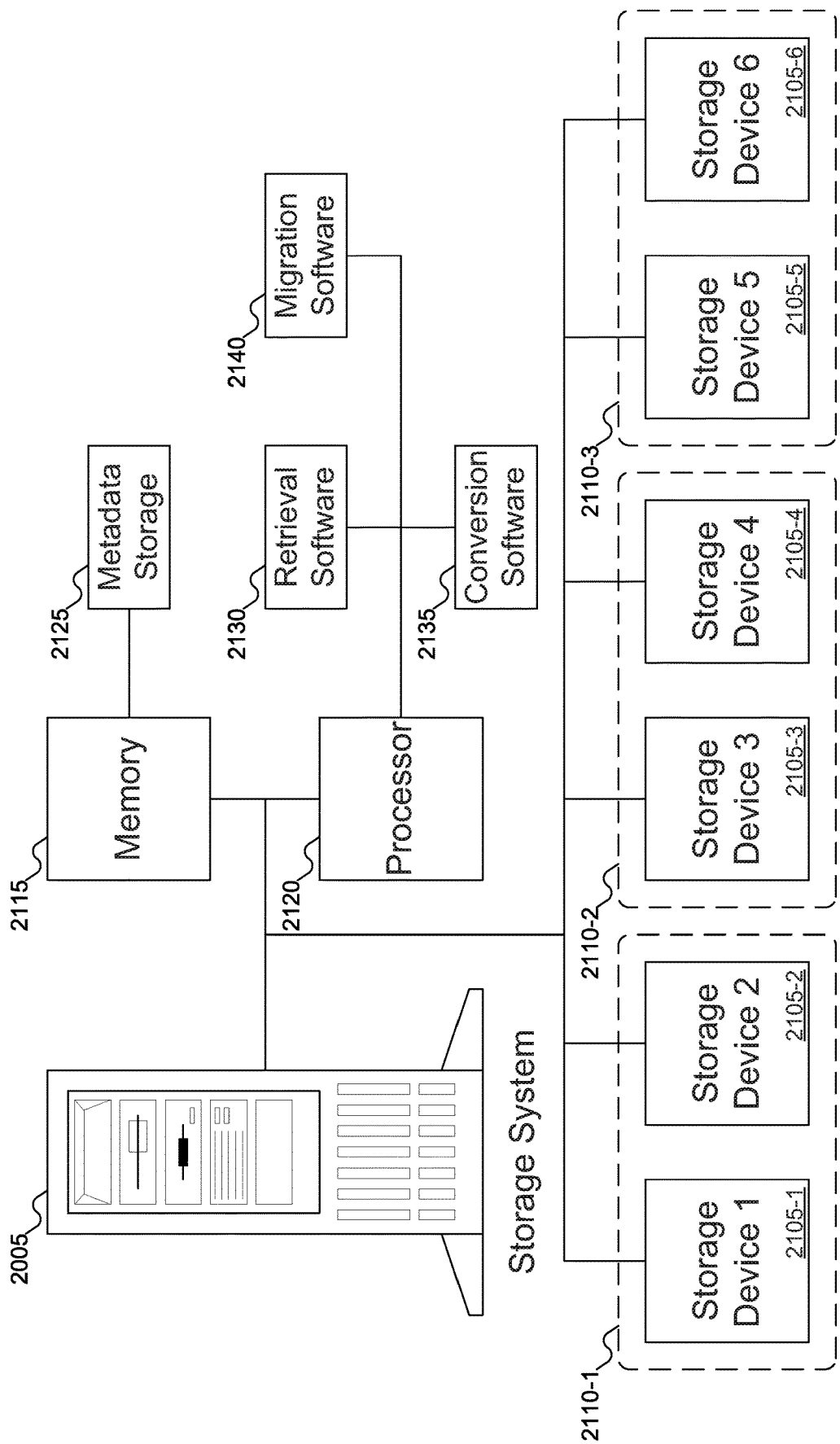
FIG. 21 shows details of the storage system of FIG. 20.

When requesting that a new image be stored in storage system 2005, it would seem clear that request 2035 should include a copy of the image to be stored. But request 2035 may also include an image when requesting an image be retrieved from storage system 2005. This may seem unusual: why request an image be retrieved from storage system 2005 if host 105 already has a copy of the image? The answer is that the copy of the image host 105 already has might not be usable by host 105. For example, the image be of insufficient resolution or color depth, or the image might be in a format that may not be easily converted to the format host 105 desires, or the cost to convert the image from one format to another might be sufficiently high that it is worth checking if the desired image format already exists in storage system 2005. In such circumstances, host 105 may provide a copy of the image to be retrieved from storage system 2005, to enable storage system 2005 to locate the image. Request 2035 may then also include other information identifying the desired image. For example, request 2035 may include the particular format for the desired image, the resolution of the image, and/or the color depth (for example, when using an image in the YUV format, the Chroma Subsampling rate to use, as discussed above). Request 2035 may also attempt to identify the image in other ways rather than by providing a copy of the image. For example, request 2035 might attempt to identify the image using a file name or some other properties that (hopefully uniquely) identify the image. FIG. 21 shows details of storage system 2005 of FIG. 20. In FIG. 21, storage system 2005 is shown as including six storage devices 2105-1, 2105-2, 2105-3, 2105-4, 2105-5, and 2105-6. Storage devices 2105-1 through 2105-6 are shown as organized into three storage tiers 2110-1, 2110-2, and 2110-3. While FIG. 21 shows six storage devices divided into pairs with each pair constituting a particular storage tier, embodiments of the inventive concept may include any number of storage devices, which may be organized into any number of storage tiers, and that different storage tiers may have different numbers of storage devices. It is not required that the storage devices in a particular storage tier offer necessarily identical performance, but for simplicity's sake, as a general rule the storage devices in a particular storage tier offer generally similar performance (for example, approximately equivalent latency or another similar characteristic), and that different storage tiers generally offer different performance (again, considering latency or another similar characteristic). For example, storage devices 2105-1 and 2105-2 might be KV-SSDs, storage devices 2105-3 and 2105-4 might be hard disk drives, and storage devices 2105-5 and 2105-6 might be tape drives. Any desired types of storage devices may be used. Examples of different storage device types include KV-SSDs, Small Computer System Interface (SCSI) SSDs, Serial Attached SCSI (SAS) SSDs, Serial AT Attachment (SATA) SSDs, SCSI hard disk drives, SAS hard disk drives, SATA hard disk drives, and tape drives. In addition, storage devices 2105-1 through 2105-6 may include volatile devices, such as memory devices. For example, one storage device might be DRAM, SRAM, or Persistent Random Access Memory, FRAM. Other forms storage devices 2105-1 through 2105-6 might take include NVRAM, such as Magnetoresistive Random Access Memory (MRAM). Storage devices 2105-1 through 2105-6 may include both storage for images and a controller to manage access to the storage.

Since the objective of embodiments of the inventive concept is to provide rapid access to images stored in storage system 2005, it is reasonable to organize storage tiers 2110-1 through 2110-3 along the lines of latency (that is, how quickly data may be read from a storage device and returned to host 105 of FIG. 20). Thus, storage tier 2110-1 might provide the most rapid access to images, storage tier 2110-2 might offer mid-level access to images, and storage tier 2110-3 might provide slow access to images. In terms of temperature, storage tiers 2110-1 through 2110-3 might be thought of as "hot", "warm", and "cold" tiers. Other models may be used to describe the different storage tiers. For example, using colors storage tiers 2110-1 through 2110-3 might be thought of as "red", "green", and "blue" (from "warmest" color to "coldest" color). But in general, there is no requirement that storage tiers 2110-1 through 2110-3 be described along any such lines: it is sufficient that the storage tiers offer different performance levels for some particular performance characteristic (again, such as latency).

When an image is stored in a particular storage tier, in some embodiments of the inventive concept, storage system 2005 may select the storage device to store the image. For example, if storage system 2005 selects storage tier 2110-1 as being appropriate to store an image (either because a new image is being added or because an image is being migrated from another storage tier, as discussed further below), storage system 2005 might select either storage device 2105-1 or 2105-2 to store the image. But in some embodiments of the inventive concept the storage tiers themselves may include some logic to manage image storage. For example, storage tiers 2110-1 through 2110-3 may include logic to keep the use of all storage devices within a given storage tier balanced. Thus, if storage device 2105-1 has a higher percentage of its capacity used than storage device 2105-2, storage tier 2110-1 might direct a new image to be stored on storage device 2105-2 to keep things in balance. Embodiments of the inventive concept also support a mix of such capabilities: some storage tiers might include logic to manage which storage devices store new images, whereas other storage tiers might leave the selection of the storage device to store a new image up to storage system 2005.

Storage system 2005 may include memory 2115 and processor 2120. Like storage devices 2105-1 through 2105-6, memory 2115 may be any type of storage, and may be implemented using the same types of storage devices as storage devices 2105-1 through 2105-6. Usually, however, the term "memory" implies some form of DRAM, SRAM, or some other form of Random Access Memory as discussed above, or High Bandwidth Memory (HBM) or even non-volatile memory. Memory 2115 may include metadata storage 2125, which is used to locate where a particular image is stored. Thus, it is helpful if memory 2115 provides rapid access to information to expedite the search process.

While FIG. 21 shows memory 2115 as separate from storage devices 2105-1 through 2105-6, in some embodiments of the inventive concept memory 2115 may use a portion of storage in one of the storage tiers, rather than being a separate component. For example, storage device 2105-1 may include a portion of storage dedicated to operate as memory 2115. Again, since memory 2115 is used in searching for an image to locate where the image is stored in storage system 2005, it is helpful in such embodiments of the inventive concept if memory 2115 shares a storage device with fast access to data. For example, using a KV-SSD to store memory 2115 would provide faster access to information in memory 2115 than using a hard disk drive (or a tape drive).

Having memory 2115 be a non-volatile storage device (be it some form of NVRAM or sharing space with one of storage devices 2105-1 through 2105-6) has one advantage over using a volatile storage device: metadata storage 2125 would not be lost if something unexpected— such as a computer crash or power outage—were to occur. If memory 2115 is a volatile form of storage, then either metadata storage 2125 needs to be copied to non-volatile storage as metadata 2125 is changed (or copied periodically, with some form of log used to represent what information may have changed since the last time metadata 2125 was copied to non-volatile storage), or else storage system 2005 may need to reconstruct metadata storage 2125 after an unexpected event. How metadata storage 2125 might be so reconstructed is discussed further below.

Processor 2120 may execute software to perform a search for an image. Processor 2120 may be any variety of processor: for example, an Intel Xeon, Celeron, Itanium, or Atom processor, an AMD Opteron processor, an ARM processor, etc. While FIG. 21 shows a single processor 2120 in storage system 2005, storage system 2005 may include any number of processors, each of which may be single core or multi-core processors, and may be mixed in any desired combination. In addition, embodiments of the inventive concept may use processor 110 of FIG. 1 in machine 105 of FIG. 1 to perform functionality attributed to processor 2120. (Machine 105 of FIG. 1 may also be termed a "host machine", and processor 110 of FIG. 1 may also be termed a "host processor", to identify these components as being part of the host requesting the data access.)

To implement image search and management as desired in embodiments of the inventive concept, processor 2120 may execute three software components: retrieval software 2130, conversion software 2135, and migration software 2140. Retrieval software 2130 may use metadata storage 2125 to determine where a particular image is stored, then issue the appropriate request to that storage device to retrieve the desired image. How metadata storage 2125 supports the use of retrieval software 2130 is discussed further with reference to FIG. 22 below.

Conversion software 2135 may convert an image from one format to another as needed. For example, as discussed above, request 2035 of FIG. 20 might provide an image desired by host 105 of FIG. 20. Further, the human eye is more sensitive to luma data than to Chroma data. Thus, in some embodiments of the inventive concept metadata storage 2125 might store only luma data (from the YUV format) for an image for search purposes. If host 105 of FIG. 20 provides an image in RGB format, then conversion software 2135 may convert the image from RGB format to YUV format, then extract the luma data from the YUV format of the image. Conversion software may also need to change the resolution of the image for the search to be usable. For example, in some embodiments of the inventive concept, to keep metadata storage 2125 as small as possible, the metadata for a particular image might include a low resolution version of the image (fewer pixels means less data to store). In such embodiments of the inventive concept, conversion software 2135 may convert the image from one resolution to another, thereby achieving the target resolution used by storage system 2005 to support image search. How conversion software 2135 may be used is discussed further with reference to FIG. 22 below.

Migration software 2140 may use metadata storage 2125 to determine whether an image should be migrated from one storage tier to another. For example, a particular image might be requested with a relatively high frequency, but might currently be stored on a hard disk drive. Moving the image to a faster storage tier, such as one including SSDs, might be beneficial, as it would provide faster access to such a currently desirable image. Migration software 2140 is discussed further with reference to FIG. 23 below.

In the above discussion, processor 2120 is described as a general-purpose processor executing various software components. But embodiments of the inventive concept are not limited to implementations of general-purpose processors executing software. Retrieval software 2130, conversion software 2135, and migration software 2140, individually or collectively, may be implemented in other forms. For example, retrieval software 2130, conversion software 2135, and migration software 2140 might be implemented as firmware executed by an appropriate processor. Or, processor 2120, in combination with retrieval software 2130, conversion software 2135, and migration software 2140, may be implemented using a Field Programmable Gate Array (FPGA), an Application-Specific Integrated Circuit (ASIC), a Graphics Processing Unit (GPU), General-Purpose computing on Graphics Processing Units (GPGPUs), or an In-Storage Computing (ISC) capability of an SSD, just to name a few possibilities.

In FIG. 21, storage devices 2105-1 through 2105-6 are implied to be separate physical storage devices. While this implementation is certainly possible, embodiments of the inventive concept may also include virtual storage devices that may span multiple physical storage devices. That is, some or all of storage devices 2105-1 through 2105-6 may be virtual storage devices. For example, consider an implementation using a Redundant Array of Independent Disks (RAID). RAID implementations take multiple physical disks and make them appear to be a single device (with an overall larger capacity and/or redundancy capability). A RAID 0 implementation that includes two 2 TB disks appears to host 105 of FIG. 20 to be a single 4 TB disk. (There are also other ways to simulate a virtual storage device using two or more individual storage devices other than RAID: RAID is merely an example implementation.)

Thus, storage devices 2105-1 through 2105-6 might be virtual storage devices rather than separate physical storage devices.

In addition, it is possible that a single (physical) storage device might span more than one of storage tiers 2110-1 through 2110-3. For example, SSDs read data from flash storage by applying a voltage: at some input voltage the cell triggers a change in the value of the output. Single Level Cells (SLC), which store only one bit per cell, may determine the value stored in the cell by trying just low and high voltages: the outputs will identify the value stored in the cell. (In fact, it may only be necessary to try one voltage, since the result of applying the other voltage would be implied.)

But it is also possible to be more fine-grained in terms of identifying the voltage at which the cell changes the output. For example, instead of using just two points of discrimination (low and high), four points of discrimination may be used. Because the cell may now differentiate among four different voltages, the cell effectively stores two bits of data. Such cells are called Multi-Level Cells (MLCs). By using even more points of discrimination, the amount of data stored in a cell may be increased further: current technology permits Triple-Level Cells (TLCs) and Quad-Level Cells (QLCs), which support three and four bits of data per cell, respectively, and higher bit density cells are in development.

But increasing the bit density per cell has a cost. First, the number of write/erase operations a cell may support before failures become sufficiently likely decrease as the number of bits per cell increases. Thus, SLCs support more write/erase cycles than MLCs, which support more write/erase cycles than TLCs, and so on. In addition, the time required to read a value from a cell increases as the number of voltage discriminations increases, since more different voltages need to be tried to determine the value stored in the cell. This means that SLCs may be read faster than MLCs, which may be read faster than TLCs, and so on.

This additional time required to read a cell with a higher bit density may result in a higher density cell being considered to be part of a different storage tier than a cell with a lower bit density. In other words, if an SSD includes multiple media types, the different media types may be considered to be part of different storage tiers. Assuming that the SSD permits an application to direct data to a particular media type, a single SSD may end up spanning multiple storage tiers: how many storage tiers a single SSD might span would depend on the number of different media types offered and the dividing lines between the storage tiers. In theory, a single SSD might span every possible storage tier offered by storage system 2005. Thus, for example, if an SSD includes both SLC and TLC media, the SLC media might be part of storage tier 2110-1, whereas the TLC media might be part of storage tier 2110-2 (or 2110-3).

The above discussion focuses on SSDs, because of the different speeds associated with different cell types. But embodiments of the inventive concept may include storage devices of other types that may span multiple storage tiers. Further, a single storage device might include multiple different forms of storage. For example, a storage device might include both flash storage and a hard disk drive, each of which might be assigned to a different storage tier.

One of storage tiers 2110-1, 2110-2, and 2110-3 may be selected as a default storage tier. That is, one of storage tiers 2110-1, 2110-2, and 2110-3 may be used to store new images received at storage system 2005. Since such newly received images may have no history of prior access requests, there may be no information about the relative probability of accessing the new image as compared with images already stored in storage system 2005. Possible choices for the default storage tier may include the storage tier with the lowest level of performance (using the theory that the new image must "earn" its position in the higher performance storage tiers) or a middle level storage tier (using the theory that the image is likely to have "average" access in the near term: "middle" being a relative term and not necessarily meaning a storage tier that has a median level of performance); but embodiments of the inventive concept may support selecting any storage tier as the default storage tier.

Figure 22:
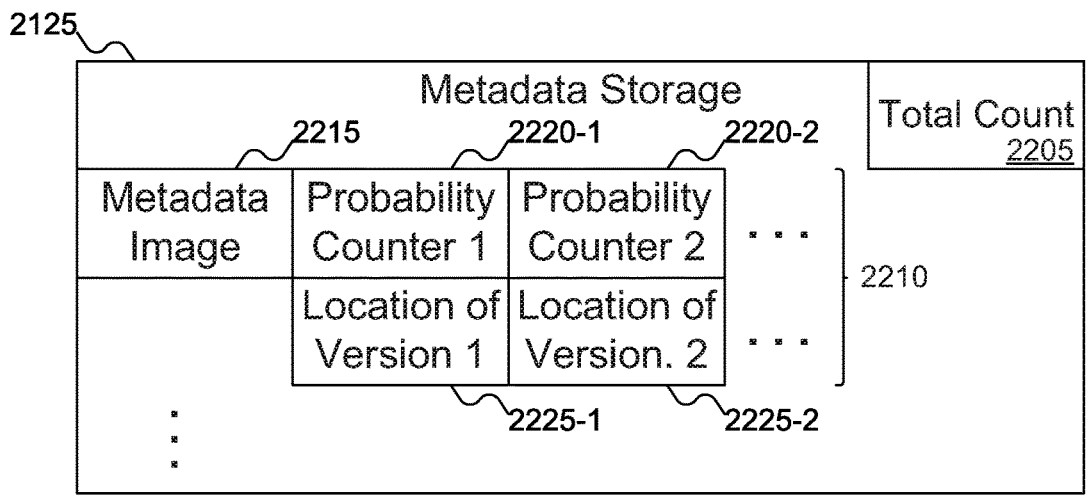
FIG. 22 shows details of the metadata storage of FIG. 21.

FIG. 22 shows details of metadata storage 2125 of FIG. 21. In FIG. 22, metadata storage 2125 is shown as total count 2205. Total count 2205 may be a count of the total number of image requests handled by storage system 2005 of FIG. 20. Total count 2205 may be used in combination with counters for individual images to determine the relative probability that a particular image is accessed, as discussed below.

For any particular image, metadata storage 2125 may store metadata 2210. Metadata 2210 may include metadata image 2215. Metadata image 2215 may be information that uniquely (or hopefully uniquely) identifies a particular image, at least within storage system 2005 of FIG. 20 (there might be other images that satisfy metadata image 2215 outside storage system 2005 of FIG. 20). Metadata image 2215 may be any desired mechanism for identifying the image. Examples of information that may be used for metadata image 2215 include a unique identifier of the image (such as might be generated using an appropriate hash function on the data of the image), a description of the image, key features of the image, metadata (not visible in the actual image) that otherwise identifies the image.

But metadata image 2215 may actually be a version of the image itself as well. For example, metadata image 2215 might be a version of the image at a particular resolution. Since there is a direct relationship between image resolution and the size of the data, it is helpful to keep the image resolution low to minimize the amount of data stored in metadata image 2215. On the other hand, the image resolution should not be so low that enough details are lost that the image is not necessarily uniquely identifiable. For example, an image that 4 pixels high by 3 pixels wide, using 8 bits of color per pixel, would require only 12 bytes of data. But by the time an image that was originally 640×480 is scaled down to 4×3 (and potentially the color depth is reduced to 8-bit color), the result may be little different from the scaled-down versions of other images, making it difficult or impossible to distinguish among different images. A balance is needed between keeping an image small to reduce the amount of data required, but not so small that the image is not distinguishable from other images.

One way to keep the size of metadata image 2215 small is to store metadata image 2215 in YUV format, but use only the luma data. Since the human eye is more sensitive to brightness than to color, storing only the luma data (and discarding the Chroma data) helps to reduce the amount of space needed to store metadata image 2215 without necessarily discarding too much information. Alternatively, some Chroma data might be kept as well, but at perhaps a lower subsampling rate, thereby storing less Chroma data. These embodiments of the inventive concept may be combined with selecting a lowest image resolution: a target image resolution may be selected and the image scaled to that resolution, then converted to YUV format and the luma data extracted or the Chroma data subsampled at a lower rate.

The process may also be reversed: the image may be converted to YUV format and the desired data extracted/subsampled, then the resulting data scaled to the desired lowest image resolution.

Earlier, conversion software 2135 of FIG. 21 was discussed. Recall that conversion software 2135 may be used to convert an image from one resolution to another, or from one format to another. Since it is desirable that metadata image 2215 be kept small, metadata image 2215 may be stored at a particular resolution and in a particular format that minimizes the amount of data stored. For example, storing just luma data and discarding Chroma data from a YUV formatted image helps to reduce the amount of data stored, as does using the lowest target resolution for the image. But when storage system 2005 of FIG. 20 is attempting to search for an image, the received image might be in a different format, or at a different resolution, or using a different color depth. Since the search might fail if the images being compared are different, conversion software 2135 of FIG. 21 may convert the received image to a resolution, format, etc. that matches how metadata image 2215 is stored. For example, every metadata image 2215 in metadata 2210 might be stored at a particular resolution (for example, 320×240, or 640×480, or with some particular maximum or minimum value for a dimension of the image). Knowing this information, conversion software 2135 of FIG. 21 may adjust the resolution of the image accordingly. Similarly, knowing that metadata image 2215 stores just the luma data of a YUV format of the image, conversion software 2135 of FIG. 21 may convert the image from the received format into YUV format, then extract the luma data (and discard the Chroma data).

It is also helpful if conversion software 2135 of FIG. 21 is also used to generate metadata image 2215 initially. Conversions that occur in the same way are more likely to match. So if conversion software 2135 of FIG. 21 initially generates metadata image 2215, then using conversion software 2135 of FIG. 21 to convert a received image for a search is more likely to result in storage system 2005 of FIG. 20 successfully matching the converted received image to metadata image 2215.

Aside from metadata image 2215, metadata 2210 may also include other information relating to a given image. Metadata 2210 may also include probability counters 2220-1 and 2220-2. Probability counters 2220-1 and 2220-2 may measure how often the image in question is accessed, which may be expressed as a percentage of all image accesses. Thus, by counting the number of times each image is accessed, the probability that a particular image is accessed may be computed by dividing the probability counter for that image by total count 2205. For example, if there have been 200 image accesses of storage system 2005 of FIG. 20, and a particular image has been access 30 times, that image has been accessed 15% of the time (30÷200).

While FIG. 22 shows two probability counters 2220-1 and 2220-2, there may be any number of probability counters associated with an image. In addition, while the above discussion implies that probability counters 2220-1 and 2220-2 simply count the number of accesses of the corresponding versions of the image, probability counters may actually store the probability of access of each version of the image. In such embodiments of the inventive concept, total count 2205 would not be needed. But in such embodiments of the inventive concept, probability counters 2220-1 and 2220-2 (along with every other probability counter in metadata 2210) are updated every time an image is accessed. Since incrementing just two counters (total count 2205 and the probability counter for the particular version of the image) is simpler than updating every probability counter in metadata storage 2125, the former represents an overall simpler implementation, even if additional computations are needed to determine the actual probability percentage for individual versions of the image.

The reason FIG. 22 shows more than one probability counter 2220-1 and 2220-2 follows directly from the discussion above regarding how to access a particular image at a given resolution and Chroma Subsampling rate. Each image may have several versions, representing different resolutions and Chroma Subsampling rates. Generalizing this concept even further, copies of the image in other formats may also be considered different versions of the image. That is, a given image, with a resolution of 640×480, but one copy in RGB format and one copy in YUV format, may be considered different versions of the same image. More generally still, two copies of an image may be considered to be different versions if they differ from each other along some axis, of which resolution, Chroma Subsampling rate, storage format, and color depth may be considered examples. If storage system 2005 of FIG. 20 stores two different versions of the same image, the probability of access of each version may be tracked independently of the others. Thus, probability counter 2220-1 may track a different version of the image from probability counter 2220-2, even though the picture represented by both versions represent the same content. Of course, even if storage system 2005 of FIG. 20 might store multiple different versions of the same image, that fact does not mean that metadata 2210 must include probability counters for each version separately: metadata 2210 might include only one probability counter 2220-1, which represents the probability of accessing any version of the image stored in storage system 2005 of FIG. 20.

Metadata 2210 may also include locations 2225-1 and 2225-2 for the versions of the image tracked by probability counters 2220-1 and 2220-2, respectively. Locations 2225-1 and 2225-2 may specify "where" the corresponding version of the image is stored. So when a request to access a particular image is received at storage system 2005 of FIG. 20, storage system 2005 of FIG. 20 may use location 2225-1 and 2225-2 to determine where the image is actually stored, thereby avoiding the need to access all the storage devices, either serially or sequentially.

Location 2225-1 and 2225-2 is described above as storing "where" the corresponding version of the image is stored. The term "where" is not necessarily intended to represent a definitive location for the image (although location 2225-1 and 2225-2 certainly may be definitive). For example, location 2225-1 and 2225-2 may identify a logical address (used by a block storage device) or a key (used by a key-value storage device) that locates the desired image. It is then up to the storage device to interpret that logical address or key to correctly retrieve the desired image, which may involve translating the information provided from location 2225-1 and 2225-2 into a specific address where the image is actually stored.

In some embodiments of the inventive concept, location 2225-1 and 2225-2 may specify the particular storage device on which the desired image is stored. In such embodiments of the inventive concept, storage system 2005 of FIG. 20 may send the request directly to the target storage device. But in other embodiments of the inventive concept, location 2225-1 and 2225-2 may only specify the storage tier where the data is stored. This information may be sufficient if, for example, a particular storage tier includes just one storage device. But in such embodiments of the inventive concept, if a particular storage tier includes more than one storage device, storage system 2005 of FIG. 20 may still need to send queries to more than one storage device to attempt to retrieve the image. But since storage devices that are in other storage tiers need not be queried for the image, overall performance should be acceptable, even with storage system 2005 of FIG. 20 querying more than one storage device.

As with probability counters 2220-1 and 2220-2, the question may arise why metadata 2210 might include more than one location for an image. The answer is that while the above discussion regarding using KV-SSDs that organize objects hierarchically assumes all versions of the image are stored on a single storage device, this assumption has now been discarded. If two or more storage devices exist in storage system 2005 of FIG. 20, then a particular image might be stored on just one of the storage devices. The same concept generalizes to different versions of an image. From a practical point of view, images are simply data; therefore, different versions of the same image are different data. While storing all versions of an image together may simplify matters in some regards, that choice may also complicate matters in other regards. For example, it might be that a particular version of an image is frequently desired, whereas other versions of the image are not desired frequently (or at all). Keeping all the versions of an image together means that if the desirable version of an image is moved to a higher performance storage tier, then so are the less desirable versions of the image. Thus, moving the "image" from one storage tier to another requires moving more data than just moving a particular "version" of the image, and may also consume more resources of a higher performance storage tier. Handling different versions of the image differently, and storing them in different locations, may result in more efficient management of storage system 2005.

Note that FIG. 22 does not show which version of the image is associated with a particular probability counter and location. But only a few bytes should be needed to encode information such as resolution, format, color depth, and Chroma Subsampling rate (if used). These additional bytes may be used in metadata 2210 to identify which versions of the image are associated with a particular probability counter and location. Alternatively, metadata 2210 may include an identifier that (hopefully) uniquely identifies each version of the image, which might be generated (for example) as a hash of the data of the image.

Figure 23:
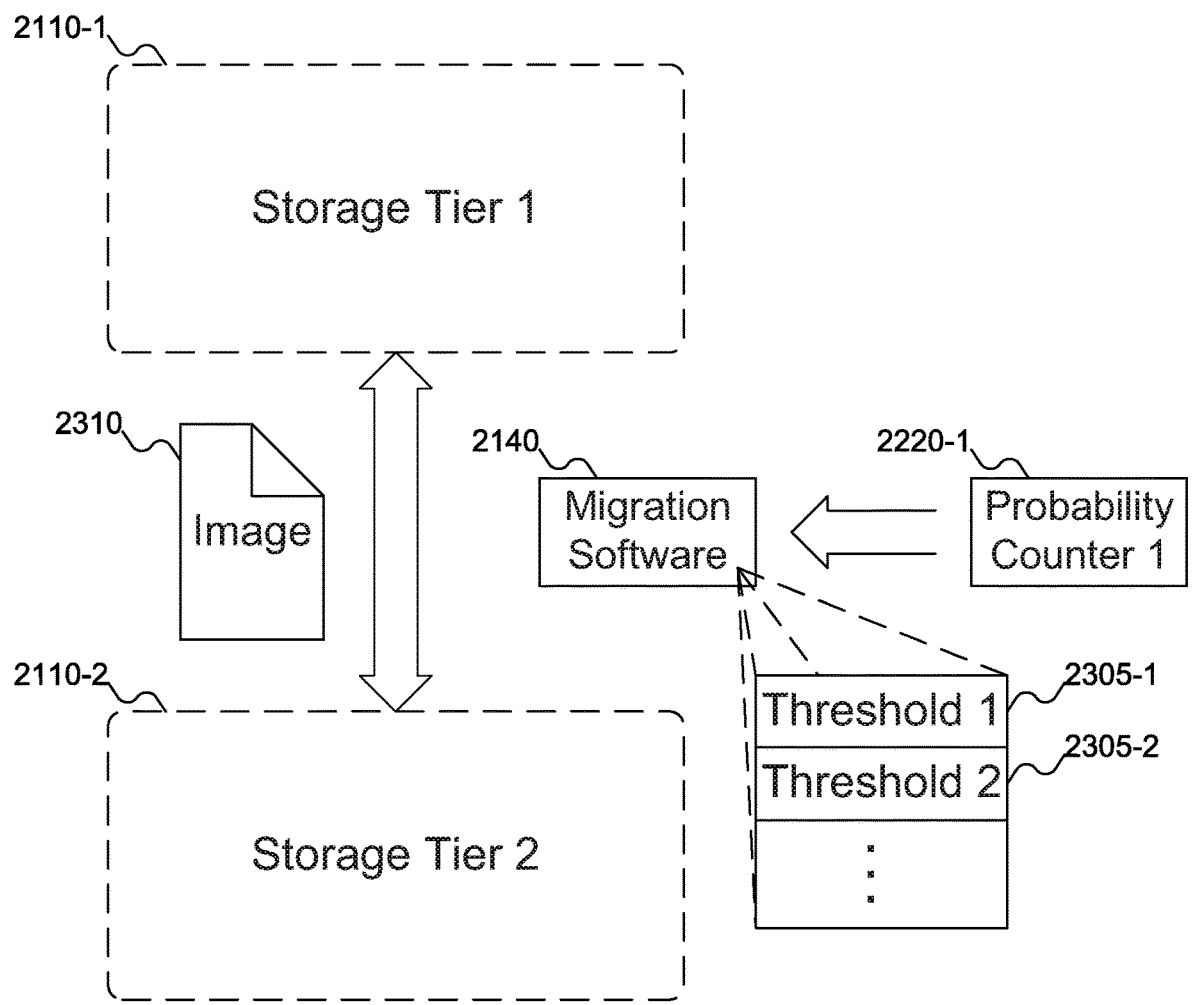
FIG. 23 shows how an image may be migrated between storage tiers based on a probability counter in the metadata storage of FIG. 21.

FIG. 23 shows how an image may be migrated between storage tiers 2110-1, 2110-2, and 2110-3 of FIG. 21 based on probability counters 2220-1 and 2220-2 of FIG. 22 in metadata storage 2125 of FIG. 21. In FIG. 23, migration software 2140 may receive probability counter 2220-1 (and, if needed, total count 2205 of FIG. 22). Migration software 2140 may then determine the relative probability of access for the version of the image, which may then be compared to various thresholds, such as thresholds 2305-1 and 2305-2. Presumably, the storage tier with the highest performance may have the highest threshold 2305-1, the storage tier with the next highest performance may have the second highest threshold 2305-2, and so on. Migration software 2140 may identify the storage tier to which an image should be moved by identifying the highest performance tier for which probability counter 2220-1 for the image exceeds the corresponding threshold 2305-1 and 2305-2.

The number of thresholds may be one less than the number of storage tiers, as the thresholds represent the points at which an image is moved from one storage tier to the next. Put another way, there must be one storage tier that acts as the default storage tier for an image that does not meet the criteria for the other storage tiers: that default storage tier does not need its own threshold (although a threshold of zero may be used). Thus, for example, thresholds for migrating data between storage tiers 2110-1, 2110-2, and 2110-3 of FIG. 21 may be 10% and 25%. Alternatively, thresholds 2110-1 and 2110-2 may represent ranges of probabilities: an image that fits in a particular range should be stored in the corresponding storage tier. Thus, for example, data with a probability counter between 0 and 10% may be stored in storage tier 2110-3 of FIG. 21, data with a probability counter that is higher than 10% but no higher than 25% may be stored in storage tier 2110-2, and data with a probability counter that is higher than 25% may be stored in storage tier 2110-1. (The threshold values/ranges presented here are merely exemplary: other values may be used as desired.)

If a version of an image has a probability counter that indicates that the version of the image qualifies for a different storage tier, migration software 2140 may move the version of the image from one storage tier to another. For example, in FIG. 23, image 2310 is shown being moved between storage tiers 2110-1 and 2110-2. Note that image 2310 might be moved in either direction (from storage tier 2110-1 to storage tier 2110-2, or from storage tier 2110-2 to storage tier 2110-1). This possibility reflects the fact that the probability of accessing a particular image may change over time: an image may become more popular at one point in time, justifying it being moved to a higher performance tier, and may become less popular at another point in time, justifying it being moved to a lower performance tier.

Once image has been migrated to a new storage tier, migration software 2140 may update locations 2225-1 and/or 2225-2 of FIG. 22 to reflect the new location for image 2310. In this manner, when the next request to access image 2310 comes in, storage system 2005 of FIG. 20 will know where to find the image after migration. For example, migration software 2140 may update locations 2225-1 and/or 2225-2 to store an address (which may be a logical address or a physical address) returned from the storage device in the new storage tier. If migration software 2140 attempted to write image 2310 to a KV-SSD (or other key-value storage device), then presumably migration software 2140 provided the key to be used in storing image 2310, and this key may be stored in locations 2225-1 and/or 2225-2.

Obviously, to migrate image 2310 from one storage tier to another, migration software 2140 compares probability counter 2220-1 (relative to total count 2205 of FIG. 22) to thresholds 2305-1 and 2305-2. While migration software 2140 might operate continuously (or after every image access) to determine when a particular image should be migrated from one tier to another, such a process would consume significant resources (constantly calculating the probability of access for each image or version of the image and comparing the result of that calculation with thresholds 2305-1 and 2305-2). Thus, instead of running continuously, migration software 2140 might scan metadata storage 2125 of FIG. 23 periodically—for example, after every 100 image accesses—to see if any images should be migrated between storage tiers.

Another way in which migration software 2140 might operate is to use existing multi-level algorithms to select data to migrate between storage tiers. Examples of such existing algorithms include 2-Level Least Recently Used (LRU) and Multiple Bloom Filter. Such algorithms have not been previously used to migrate data between different tiers in a storage system.

Regardless of what storage device is used to store an image (or a version of an image), it is desirable that the data be organized in a manner that expedites retrieval. For example, data may be stored in the storage device in a manner that capitalizes on pre-fetching/caching of data. Thus, it may be desirable to store the entirety of an image file in consecutive physical addresses within the device. For example, consider a block-based SSD. Since pre-fetching algorithms operate on the assumption that adjacent data is likely to be requested soon, it may be advantageous to store different parts of the image file in contiguous pages within a single block, or (if the data is large enough to span more than one block) in contiguous blocks.

Figure 24:
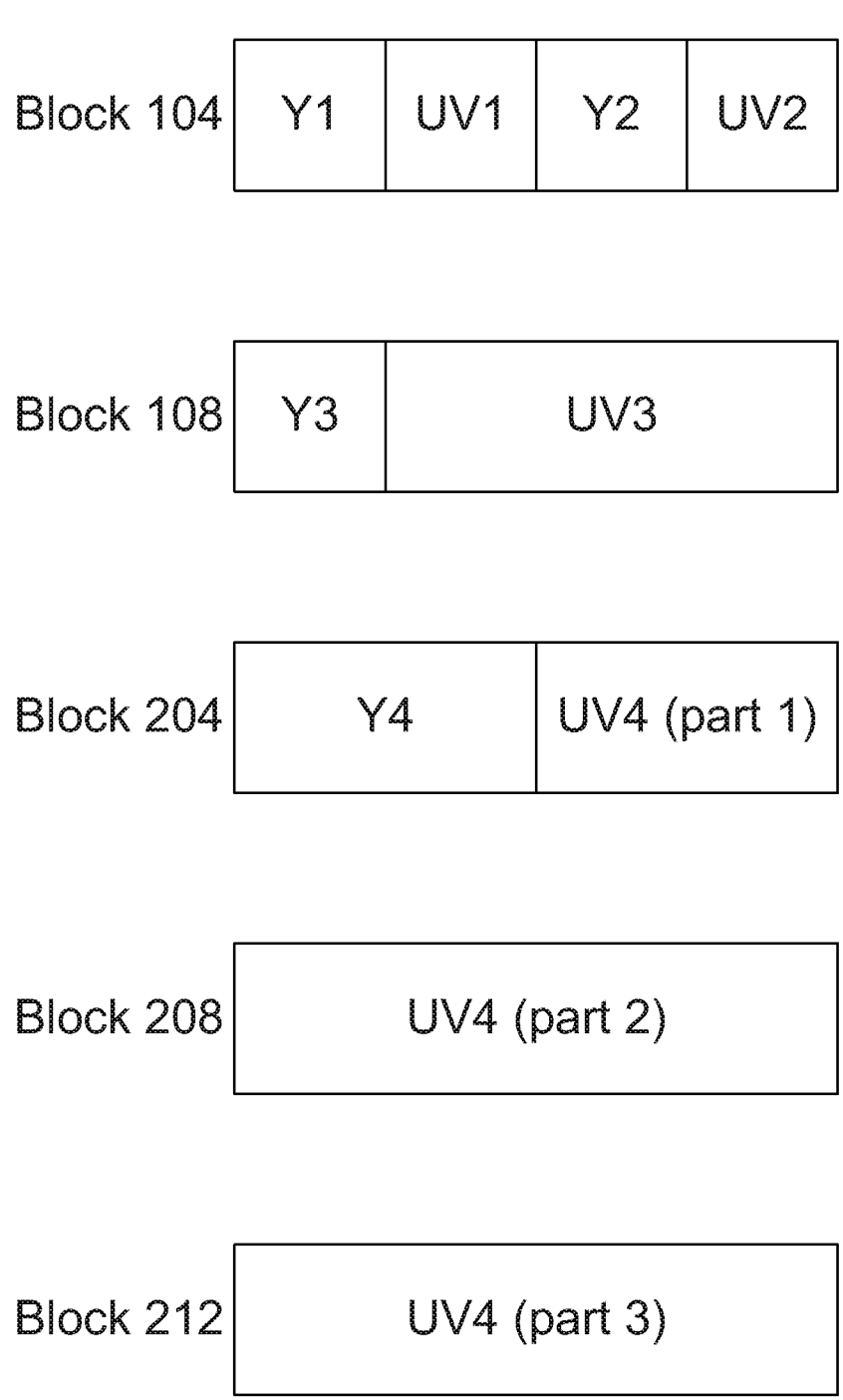
FIG. 24 shows storage of images in a block-based SSD.

FIG. 24 illustrates this concept (with reference to images in the YUV format). In FIG. 24, block 104 is shown as storing two images: the luma (Y) data for the first image is stored first, then the Chroma (UV) data for the first image is stored. Next is the luma (Y) data for the second image, followed by the Chroma (UV) data for the second image.

In block 108, a third image is shown as stored: the luma (Y) data is stored first, then the Chroma (UV) data. The block is not shown as having room for additional data.

In blocks 204, 208, and 212, a fourth image is stored. Block 204 stores the luma (Y) data; the Chroma (UV) data is stored partially in each of blocks 204, 208, and 212.

The organization shown in FIG. 24 may expedite image retrieval. When storage system 2005 of FIG. 20 requests the luma (Y) data for any of the images, prefetching algorithms may automatically start reading at least some of the Chroma (UV) data for the image as well, which means that the SSD will return the Chroma (UV) data even faster when requested.

While FIG. 24 focuses on the storage of data in a block-based SSD, the concepts shown generalize to other storage devices as well. Embodiments of the inventive concept may leverage this concept regardless of the particular form taken by an individual storage device.

Earlier, it was discussed how it is desirable for memory 2115 of FIG. 21 to be non-volatile storage (or at least backed up to non-volatile storage), since that choice would prevent the loss of data in metadata storage 2125 of FIG. 21 in the event of something unexpected, such as a power failure. But in case the data in metadata storage 2125 of FIG. 21 is lost and is not stored somewhere in non-volatile storage, storage system 2005 of FIG. 20 may need to rebuild the data in metadata storage 2125 of FIG. 21.

To rebuild the data in metadata storage 2125 of FIG. 21, storage system 2005 of FIG. 20 may scan each of storage devices 2105-1 through 2105-6 of FIG. 21 and identify every image stored thereon. For each image found in storage devices 2105-1 through 2105-6 of FIG. 21, storage system 2005 of FIG. 20 may establish an entry in metadata storage 2125 of FIG. 21. In each such entry, metadata image 2215 of FIG. 22 may be stored, generated by selecting the image and (possibly) converting the image using conversion software 2135 of FIG. 21 (and possibly using the same conversion rules as those discussed above with reference to FIG. 22 to convert the image to a particular resolution, format, and color depth and possibly extracting just luma data). The location where the image was found (which may specify the storage tier and/or storage device), as well as the address (logical or physical) or key for the image, may be stored in locations 2225-1 and 2225-2 of FIG. 22. (Obviously, if the same image is stored on multiple storage devices, storage system 2005 of FIG. 20 would need to recognize this fact: but metadata image 2215 of FIG. 22 may be used to recognize this situation and merely update an existing entry to reflect a different version of the image rather than establishing a new entry in metadata storage 2125 of FIG. 21 for the new version of the image.) If a storage device stores multiple versions of a particular image, storage system 2005 of FIG. 20 may make note of this fact as well by including multiple probability counters 2220-1 and 2220-2 of FIG. 22 and multiple locations 2225-1 and 2225-2 of FIG. 22 in the entry in metadata storage 2125 of FIG. 21.

Obviously, some data may not be reconstructed. For example, the values of total count 2205 of FIG. 22 and of probability counters 2220-1 and 2220-2 of FIG. 22 may be permanently lost if not stored somewhere. Such values may simply be reset to some target value. This target value could be zero, to reflect that no accesses have yet been recorded. But using zero for all probability counters would have a negative consequence: any images not currently stored in the storage tier associated with that probability would need to be migrated to that storage tier. Or worse, such migration might happen automatically the next time migration software 2140 of FIG. 21 was invoked.

To prevent this undesirable result from occurring (after all, images that are in storage tiers representing higher probabilities of access are in those storage tiers for a reason), total count 2205 of FIG. 22 and probability counters 2220-1 and 2220-2 of FIG. 21 may be set to values that reflect the current distribution of image probabilities. For example, a middle value for each storage tier may be selected relative to the thresholds, as discussed above with reference to FIG. 23, around that storage tier (or from the threshold range that storage tier represents), appropriately scaled to an integer value. So, if a storage tier stores images with probabilities of access between 10% and 25%, probability counters 2220-1 and 2220-2 of FIG. 22 for these images may be set to 175 (the arithmetic mean of 10% and 25%, multiplied by 1000, although any other scaling value may be used). Total count 2205 of FIG. 22 may then be set to the total of all probability counters 2220-1 and 2220-2 of FIG. 22. In this manner, migration software 2140 of FIG. 21 will not immediately start to shift images around immediately upon restart of storage system 2005 of FIG. 20, but will instead wait a bit to let probability counters 2220-1 and 2220-2 of FIG. 22 actually change and reflect a new probability for the corresponding image (or version of the image).

Another approach would be to reset all counters to 0, but to prevent migration software 2140 of FIG. 21 from operating until total count 2205 of FIG. 22 reaches some threshold value (for example, 1000). This approach, too, would give probability counters 2220-1 and 2220-2 of FIG. 22 to settle down before images are migrated.

Figure 25A:
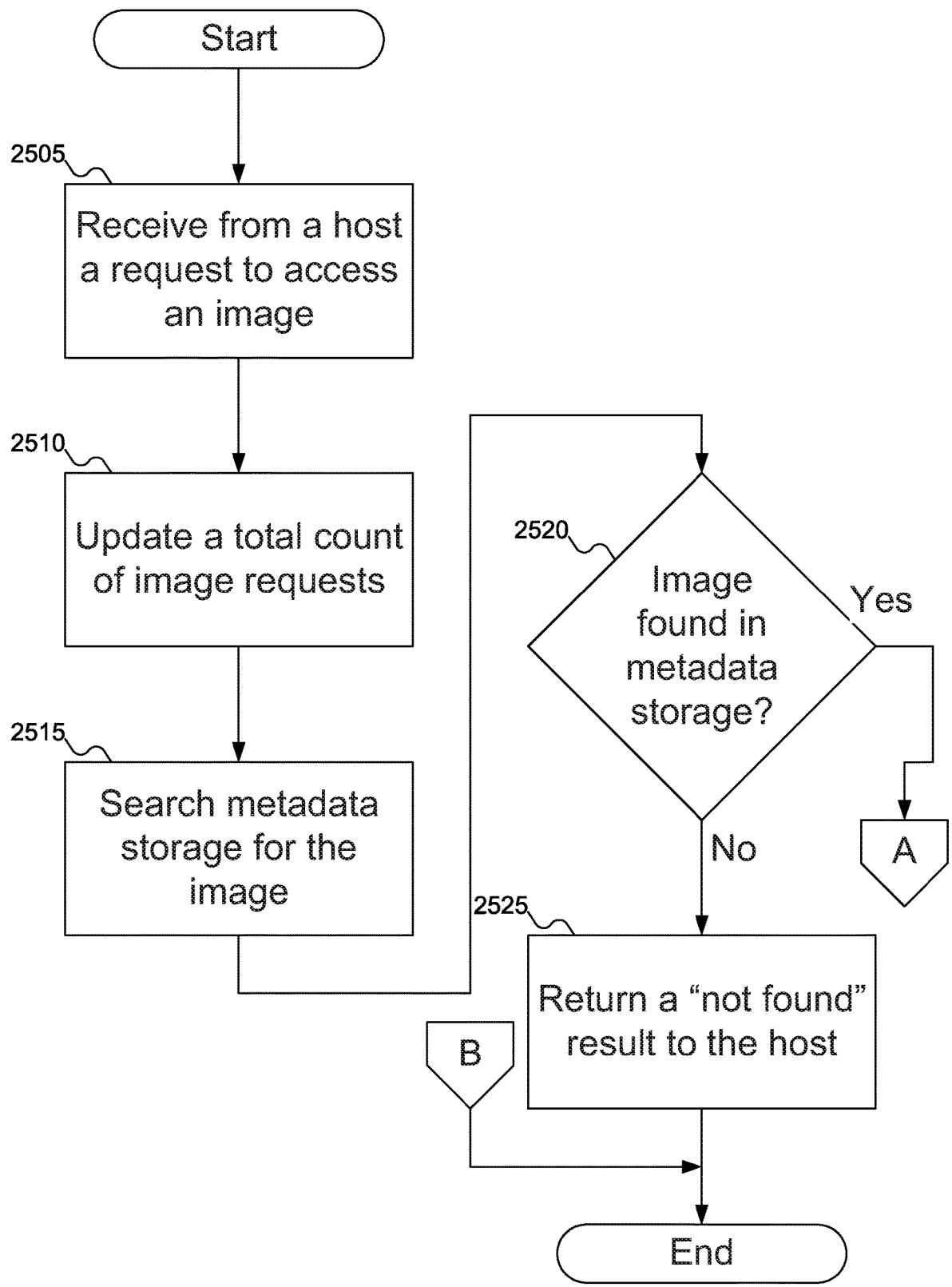
FIGS. 25A-25B show a flowchart of an example procedure for the storage system of FIG. 20 to locate and retrieve an image requested by the host of FIG. 20, according to an embodiment of the inventive concept.
Figure 25B:
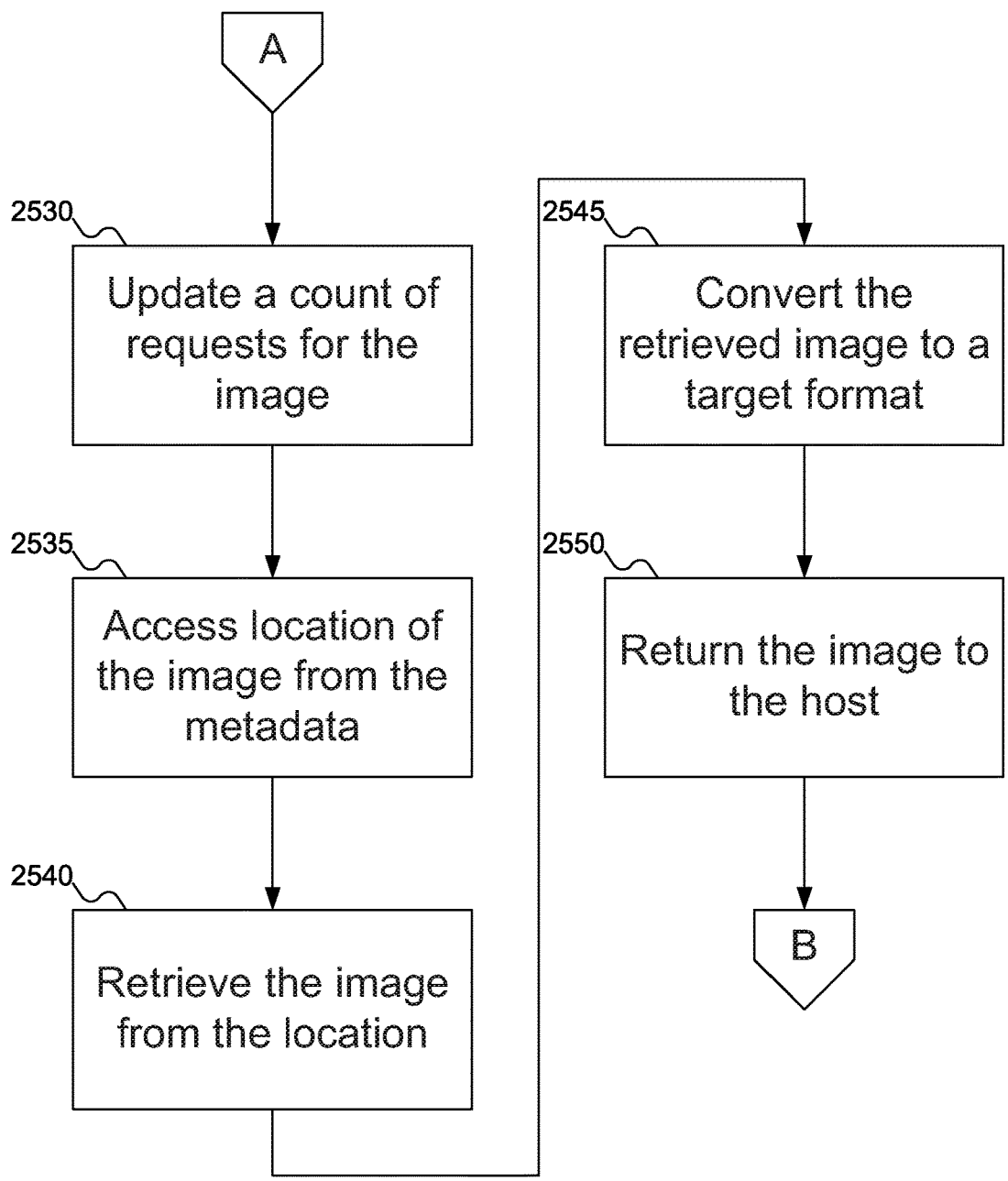

FIGS. 25A-25B show a flowchart of an example procedure for storage system 2005 of FIG. 20 to locate and retrieve an image requested by host 105 of FIG. 20, according to an embodiment of the inventive concept. In FIG. 25A, at block 2505, receiver 2030 of FIG. 20 may receive request 2035 of FIG. 20 from host 105 of FIG. 20, requesting access to an image. As discussed above, request 2035 of FIG. 20 may identify the requested image in any supported manner: a unique identifier for the image, a description of the image, key features of the image, metadata (not visible in the actual image) that otherwise identifies the image, or a version of the image itself. At block 2510, retrieval software 2130 of FIG. 21 may update total count 2205 that tracks the total number of image access requests.

At block 2515, retrieval software 2130 of FIG. 21 may search metadata storage 2125 of FIG. 21 to see if metadata storage 2125 includes metadata image 2215 of FIG. 22 that matches the image requested in request 2035 of FIG. 20. At block 2520, retrieval software 2130 of FIG. 21 may determine whether the search of metadata storage 2125 of FIG. 21 resulted in a match. If no match for the requested image was found, then at block 2525 (implying that storage system 2005 does not store the requested image), transmitter 2020 of FIG. 20 may return result 2040 of FIG. 20 indicating that no match was found for the requested image.

But if metadata image 2215 of FIG. 22 matches the image requested in request 2035 of FIG. 20, then at block 2530 (FIG. 25B), retrieval software 2130 of FIG. 21 may update probability counter 2220-1 or 2220-2 of FIG. 22 that tracks the total number of requests for that image. As discussed above with reference to FIG. 22, if metadata storage 2125 of FIG. 21 includes multiple probability counters 2220-1 and 2220-2 of FIG. 22, each probability counter may be associated with a different version of the image: in that situation, at block 2530 storage system 2005 of FIG. 20 may update the probability counter 2220-1 or 2220-2 of FIG. 22 associated with the requested version of the image (which may be identified by request 2035 of FIG. 20 specifying the desired version of the image, again using a unique identifier or by specifying the resolution, format, color depth, and/or Chroma Subsampling rate desired, among other possibilities). Further, if the requested version of the image is not currently stored in storage system 2005 of FIG. 20 (but other versions of the image are stored), retrieval software 2130 of FIG. 21 may add a new probability counter 2220-1 or 2220-2 of FIG. 22 to metadata storage 2125 of FIG. 21 to track requests for the new version of the image. (Although storage system 2005 of FIG. 20 might not currently store the requested version of the image, storage system 2005 of FIG. 20 may store the requested version as a new version of the image later, as discussed below).

At block 2535, retrieval software 2130 of FIG. 21 may access location 2225-1 and/or 2225-2, to determine where the desired version of the image is stored. If the desired version of the image is not currently stored in storage system 2005 of FIG. 20, then retrieval software 2130 of FIG. 21 may access another version of the image that may be converted into the desired version of the image. At block 2540, retrieval software 2130 of FIG. 21 may retrieve the desired version of the image (or an appropriate version of the image) from storage device 2105-1 through 2105-6 of FIG. 21 that stores that version of the image. This retrieval may be accomplished by issuing an appropriate command to access the version of the image: for example, a GET command sent to a KV-SSD, a read command sent to a block-based SSD or a hard disk drive, and so on.

At block 2545, assuming that version of the image that was retrieved at block 2540 was not the desired version of the image (such as may occur if the desired version of the image is not currently stored by storage system 2005 of FIG. 20), conversion software 2135 of FIG. 21 may convert the retrieved version of the image into the desired version of the image. Conversion software 2135 of FIG. 21 may change the resolution, the format, the color depth, etc. of the image as needed to convert the retrieved image into the desired version of the image. At this point, storage system 2005 of FIG. 20 may store the desired version of the image back into storage devices 2105-1 through 2105-6 of FIG. 21 (perhaps initially storing the desired version of the image in a default storage tier), and storing that location in metadata storage 2125 of FIG. 21 as location 2225-1 or 2225-2 of FIG. 22. Finally, at block 2550, transmitter 2020 of FIG. 20 may send the desired version of the image back to host 105 of FIG. 20 as result 2040 of FIG. 20.

Figure 26:
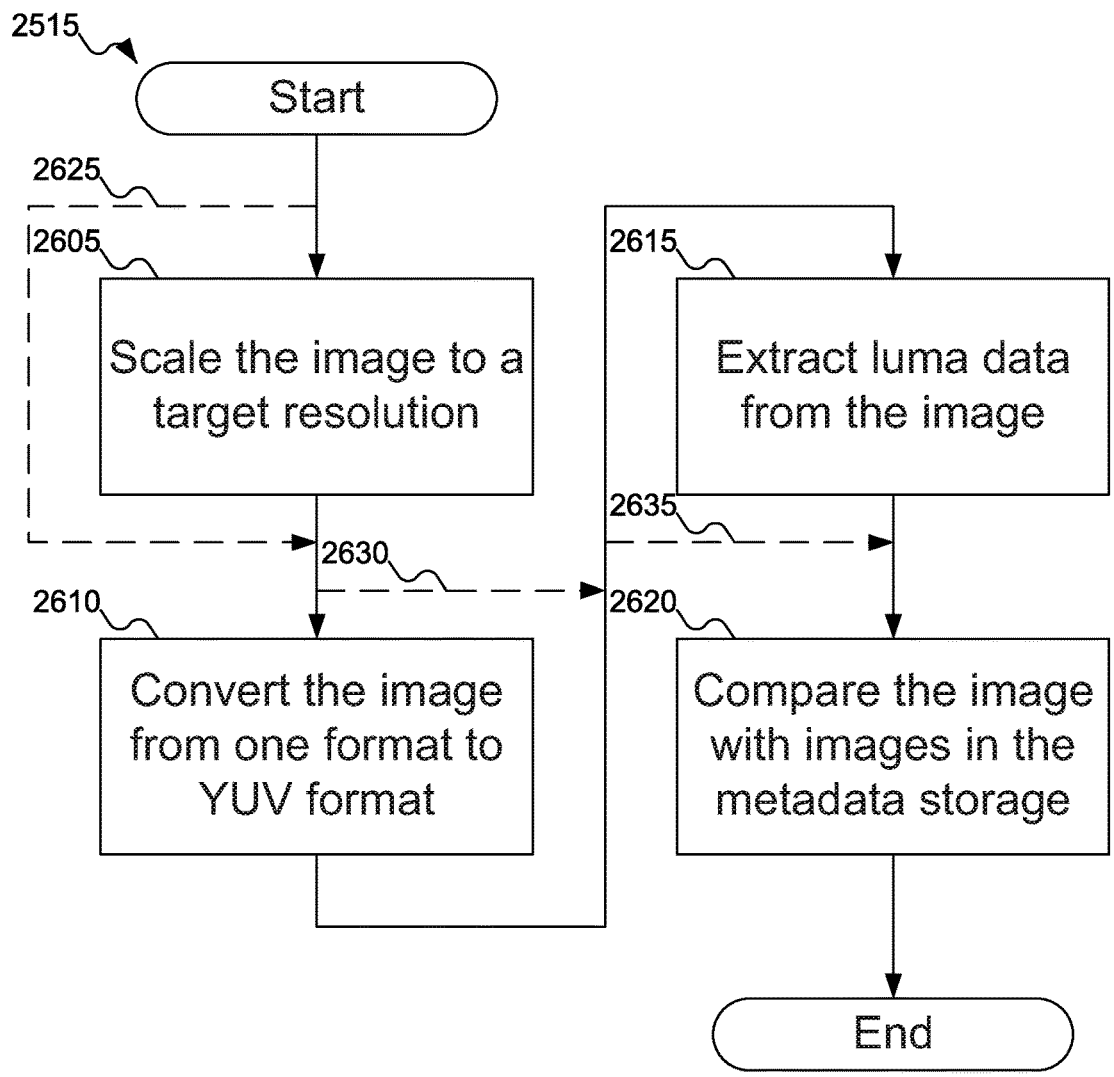
FIG. 26 shows a flowchart of an example procedure for an image to be modified for comparison with an image in the metadata storage of FIG. 21.

FIG. 26 shows a flowchart of an example procedure for an image to be modified for comparison with an image in metadata storage 2125 of FIG. 21. As discussed above, this modification may be done by conversion software 2135 of FIG. 21. At block 2605, conversion software 2135 of FIG. 21 may scale the image to a target resolution: for example, the lowest resolution permitted by storage system 2005 of FIG. 20 for use as metadata image 2215 of FIG. 22. At block 2610, conversion software 2135 of FIG. 21 may convert the image from another format into YUV format. At block 2615, conversion software 2135 of FIG. 21 may extract the luma data from the image: the Chroma data may be discarded. Finally, at block 2620, retrieval software 2130 of FIG. 21 may compare the converted image with metadata image 2215 of FIG. 22 in metadata storage 2125 of FIG. 21 to see if the image is stored in storage system 2005 of FIG. 20.

As may be seen in FIG. 26, blocks 2605, 2610, and 2615 may all be omitted when not needed, as shown by dashed arrows 2625, 2630, and 2635. For example, if the image requested in request 2035 of FIG. 20 is at the correct resolution and in YUV format but includes the Chroma data, then blocks 2605 and 2610 may be omitted, with only block 2615 being performed. Or, if the image is the appropriate resolution and in black and white but not in the correct format, blocks 2605 and 2615 may be omitted, since all that is needed is to convert the image to YUV format. Other combinations of blocks 2605, 2610, and 2615 are possible, depending on the resolution, format, and color usage of the image: embodiments of the inventive concept may therefor include none, some, or all of blocks 2605, 2610, and 2615 as appropriate.

While FIG. 26 is shown as elaborating on block 2515 of FIG. 25A, the process is applicable with little variation to block 2545 of FIG. 25B as well. The only real differences are that in block 2610 the image may be converted to the desired format (which might be a format other than YUV) and that blocks 2615 and 2620 may not be needed (it likely, although not absolutely required, that the desired image would include color data, and there would no need to compare the result of the conversion with other metadata images 2215 of FIG. 22).

Figure 27:
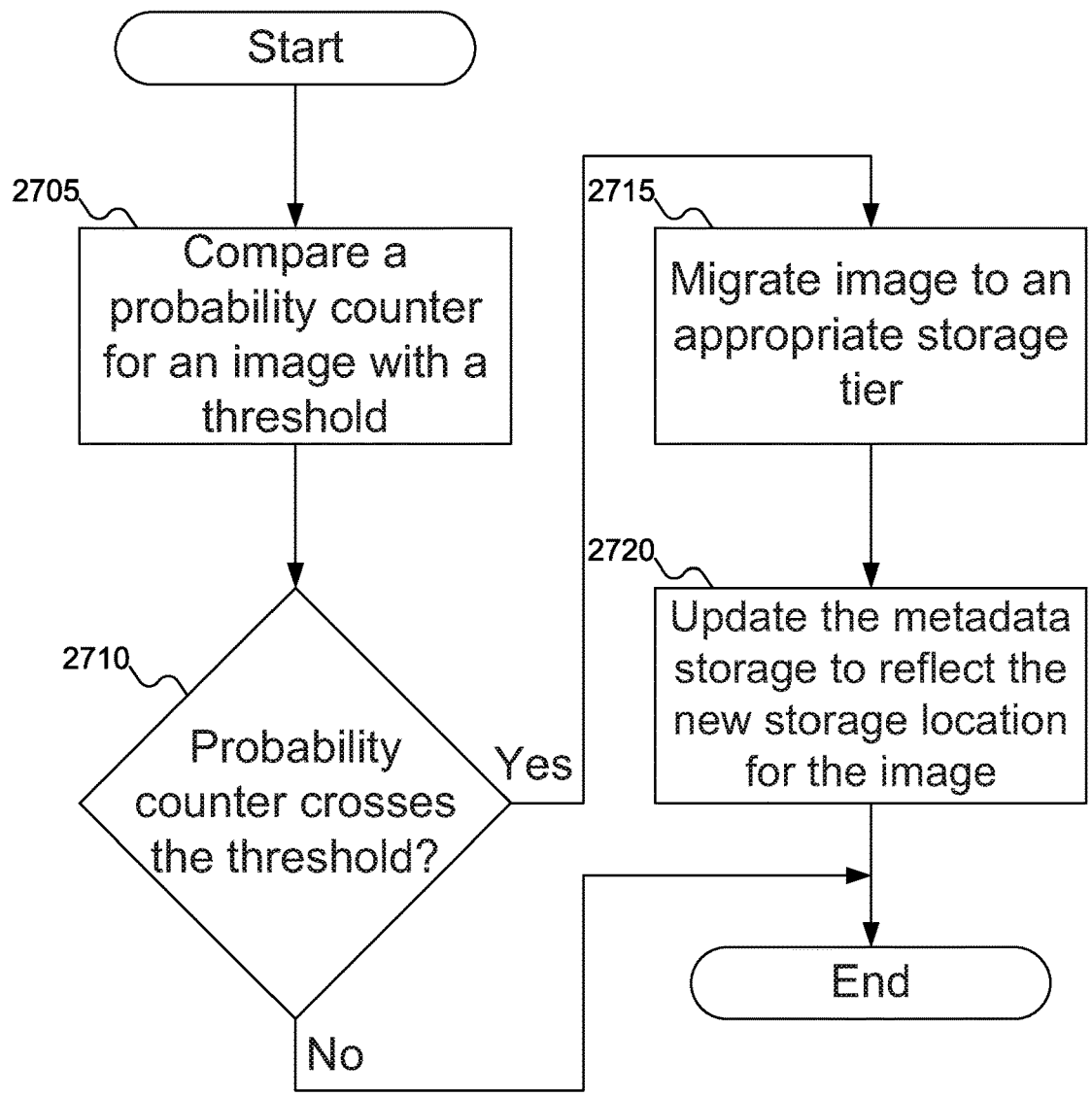
FIG. 27 shows a flowchart of an example procedure for migrating an image between storage tiers in the storage system of FIG. 20, according to an embodiment of the inventive concept.

FIG. 27 shows a flowchart of an example procedure for migrating an image between storage tiers 2110-1, 2110-2, and 2110-3 of FIG. 21 in storage system 2005 of FIG. 20, according to an embodiment of the inventive concept. In FIG. 27, at block 2705, migration software 2140 of FIG. 21 may compare probability counter 2220-1 and/or 2220-2 of FIG. 22 with thresholds 2305-1 and/or 2305-2 of FIG. 23. At block 2710, migration software 2140 of FIG. 21 considers whether probability counter 2220-1 and/or 2220-2 of FIG. 22 crosses any of thresholds 2305-1 and/or 2305-2 of FIG. 21. If probability counter 2220-1 and/or 2220-2 of FIG. 22 has crossed a threshold for migrating an image to a new storage tier 2110-1 through 2110-3 of FIG. 21, then at block 2715, migration software 2140 of FIG. 21 may migrate the image to the appropriate storage tier based on probability counter 2220-1 and/or 2220-2 of FIG. 22. Finally, at block 2720, migration software 2140 of FIG. 21 may update location 2225-1 and/or 2225-2 of FIG. 22 with the new location for the migrated image.

Figure 28:
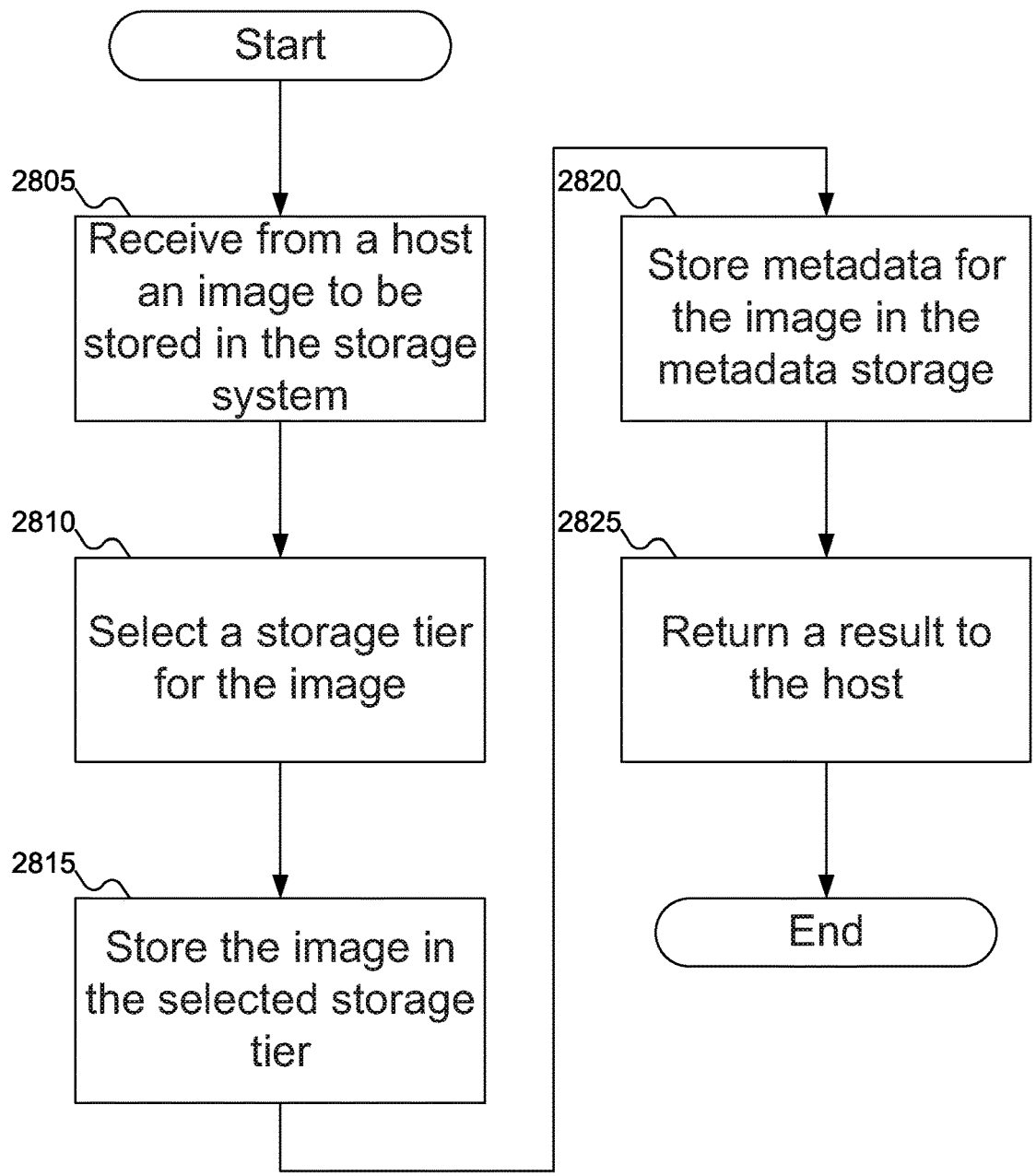
FIG. 28 shows a flowchart of an example procedure for storing a new image in the storage system of FIG. 20, according to an embodiment of the inventive concept.

FIG. 28 shows a flowchart of an example procedure for storing a new image in storage system 2005 of FIG. 20, according to an embodiment of the inventive concept. In FIG. 28, at block 2805, receiver 2030 of FIG. 20 may receive request 2035 of FIG. 20 from host 105 of FIG. 20, requesting that an image be stored in storage system 2005 of FIG. 20. At block 2810, storage system 2005 of FIG. 20 may select an appropriate storage tier for the image. As discussed above, this may involve selecting a default storage tier for new images. Alternatively, storage system 2005 of FIG. 20 might select a storage tier that stores related images, concluding that the new image is likely to be requested with the same relative frequency as related images. (A "related image" might be identified by host 105 of FIG. 20 as part of request 2035 of FIG. 20; or storage system 2005 of FIG. 20 might use machine learning or artificial intelligence strategies to identify images that include features similar to those of the new image.) At block 2815, storage system 2005 of FIG. 20 may store the new image in the selected storage tier. More specifically, storage system 2005 of FIG. 20 may select a storage device within the selected storage tier and store the image on that storage device. But if the selected storage tier is capable of managing where images are stored within that storage tier for itself, storage system 2005 of FIG. 20 may send the image to the selected storage tier and leave it to the storage tier to select the appropriate storage device to store the new image.

At block 2820, storage system 2005 of FIG. 20 may store metadata for the image in metadata storage 2125 of FIG. 21. The process of storing metadata in metadata storage 2125 of FIG. 21 is discussed further with reference to FIG. 29 below. Finally, at block 2825, transmitter 2020 of FIG. 20 may send result 2040 to host 105 of FIG. 20, indicating that the image was successfully stored in storage system 2005 of FIG. 20.

Figure 29:
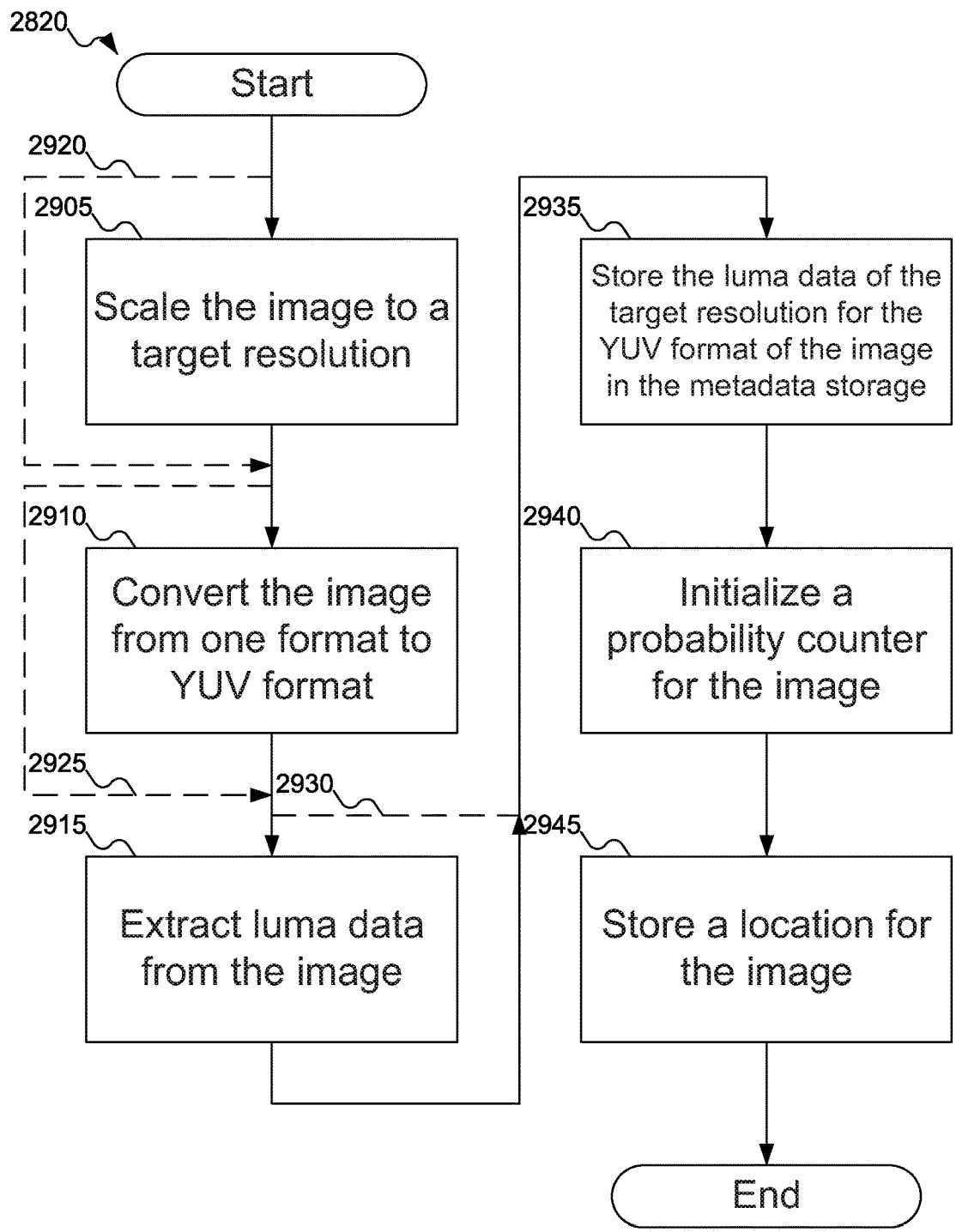
FIG. 29 shows a flowchart of an example procedure for preparing an image for storage in the metadata storage of FIG. 21.

FIG. 29 shows a flowchart of an example procedure for preparing an image for storage in metadata storage 2125 of FIG. 21. At block 2905, conversion software 2135 of FIG. 21 may scale the image to a target resolution (such as the lowest resolution supported by metadata storage 2125 of FIG. 21); at block 2910, conversion software 2135 of FIG. 21 may convert the image into YUV format; and at block 2915 conversion software 2135 of FIG. 21 may extract the luma data from the image (and discard the Chroma data). Much like blocks 2605, 2610, and 2615 of FIG. 26, not all of blocks 2905, 2910, and 2915 may be applied to a particular image, depending on the image's resolution, format, and color; dashed arrows 2920, 2925, and 2930 show that the blocks may be individually omitted as appropriate. At block 2935, metadata image 2215 of FIG. 22 may be stored, which may include just the luma data of the YUV format of the image at the target resolution. At block 2940, one or more probability counters 2220-1 and/or 2220-2 of FIG. 22 for the image may be initialized. Finally, at block 2945, the location where the image was stored (in block 2815 of FIG. 28) may be stored as location 2225-1 and/or 2225-2 of FIG. 22 in metadata storage 2125 of FIG. 21.

In all of the above discussion, particularly when discussing storing a new image or migrating an image from one storage tier to another, the assumption has been that the storage tier to which the image is being stored has room for the image. Most of the time, this assumption is reasonable: for the storage tier to have no room to store the image, the storage tier must be essentially full. But it is possible that a storage tier might be so full that there is no room to store a new image. In that situation, to make room for the image, the storage tier may evict an existing image.

In principle, this is little different from a cache used by a processor evicting a cache line to make room for new data. Using an eviction algorithm, such as Least Recently Used (LRU), Least Frequently Used (LFU) or others, a cache line may be selected, its data written to main memory, and the new cache line stored in place of the evicted cache line. In a similar manner, to make room for a new image, a storage tier may select an existing image for eviction, transfer the image to another storage tier (and update locations 2225-1 and/or 2225-2 of FIG. 22 appropriately), and thereby have room for a new image. Note that while a cache typically evicts a cache line and sends the data back to a slower form of storage, embodiments of the inventive concept permit a storage tier to evict an image and transfer that image to a higher performance storage tier: there is no requirement that an evicted image be transferred to a lower performance storage tier.

Alternatively, the new image may be sent to another storage tier that has room for the image. For example, referring back to FIG. 21, assume that migration software 2140 is attempting to migrate an image from storage tier 2110-3 to storage tier 2110-2. If storage tier 2110-2 has no room for a new image, instead of storage tier 2110-2 evicting another image to make room, migration software 2140 might simply transfer the image to storage tier 2110-1 instead, or simply cancel the migration of the image.

Note that the possibility exists that no storage tier has any room. In that situation, the problem is not really that a single storage tier lacks capacity, but rather that the overall storage capacity of storage system 2005 is insufficient. In that situation, the solution is either to delete some images from storage system 2005 to make room, or to add additional storage devices to one or more storage tiers.

In FIGS. 13A-19 and 25A-29, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer several technical advantages over the prior art. First, the image object 405 of FIGS. 4-7 and 9-11 may store data for an image in any number of resolutions and/or using Chroma Subsampling schemes. By storing all the data in a single image object 405 of FIGS. 4-7 and 9-11, data is organized so that any application program may find the desired image data in image object 405 of FIGS. 4-7 and 9-11, without having to search all available storage in the hopes of finding an image file at a particular resolution using a particular Chroma Subsampling scheme. This advantage also helps save storage space, since redundant copies of the same image data do not need to be managed independently by each application program in different locations in storage.

As a corollary, as application program 125 of FIG. 1 generates new image data, the new image data may also be stored in image object 405 of FIGS. 4-7 and 9-11, permitting other application programs to find the new image data.

Third, using KV-SSD 120 of FIG. 1 to store image object 405 of FIGS. 4-7 and 9-11 also permits leveraging the power of key-value storage for image object 405 of FIGS. 4-7 and 9-11. Whereas a conventional file system stores and manages each file separately (creating the complications of image data file management that embodiments of the inventive concept are designed to solve), objects permit data to be grouped and stored as a unit, regardless of the actual structure of the data in the object. Mapping keys to storage locations on KV-SSD 120 of FIG. 1 also tends to be fast, permitting faster access to image data. And containers, which may be used to impose a structure (of sorts) on the objects stored on KV-SSD 120 of FIG. 1 permit organization of the data in image object 405 of FIGS. 4-7 and 9-11, enabling fast location of particular image data within image object 405 of FIGS. 4-7 and 9-11.

Fourth, KV-SSD 120 of FIG. 1 may receive both key 815 of FIG. 8 and container 820 of FIG. 8. KV-SSD 120 of FIG. 1 may then use container 820 of FIG. 8 to locate and return particular image data from image object 405 of FIGS. 4-7 and 9-11, rather than returning the entirety of image object 405 of FIGS. 4-7 and 9-11. This, too, expedites operation of application program 125 of FIG. 1, since application program 125 of FIG. 1 does not need to wait for all of image object 405 of FIGS. 4-7 and 9-11 to be returned from KV-SSD 120 of FIG. 1, or to extract the desired image data (and discard the rest of image object 405 of FIGS. 4-7 and 9-11).

Fifth, embodiments of the inventive concept may be combined with other inventive concepts to further enhance the overall operation of KV-SSD 120 of FIG. 1. For example, by combining embodiments of the inventive concept with a KV-SSD that supports multi-streaming, such as is disclosed in U.S. patent application Ser. No. 15/146,708, filed May 4, 2016, now U.S. Pat. No. 9,898,202, issued Feb. 20, 2018, which is a continuation-in-part of U.S. patent application Ser. No. 15/046,439, filed Feb. 17, 2016, now U.S. Pat. No. 9,880,780, issued Jan. 30, 2018, which claims the benefit of U.S. Provisional Patent Application Ser. No. 62/302,162, filed Mar. 1, 2016, all of which are incorporated by reference herein for all purposes, all requests that involve image object 405 of FIGS. 4-7 and 9-11 may be assigned to a single stream, thereby keeping all image data stored in related erase blocks on KV-SSD 120 of FIG. 1. This, in turn, may improve garbage collection performance on KV-SSD 120 of FIG. 1, since the data for image object 405 of FIGS. 4-7 and 9-11 may fill (either partly or completely) an erase block, which will be more likely filled with valid data or invalidated at about the same time. Embodiments of the inventive concept may also be combined with other concepts, such as erase block targeting mechanisms and channel targeting mechanisms, again to attempt to keep image object 405 of FIGS. 4-7 and 9-11 stored in common erase blocks so that the erase blocks are either likely filled with invalid data (and therefore may be erased without needing to program any data during garbage collection: a good choice for garbage collection) or filled with valid data (and therefore a poor choice for garbage collection).

Sixth, by using both key 815 of FIG. 8 and container 820 of FIG. 8 to identify the particular image values desired by application program 125 of FIG. 1, KV-SSD 120 of FIG. 1 may avoid returning the entirety of image object 405 of FIGS. 4-7 and 9-11. Since application program 125 of FIG. 1 likely wants image data in a particular resolution and using a particular Chroma Subsampling scheme, returning the entirety of image object 405 of FIGS. 4-7 and 9-11 requires transmitting more data than application program 125 of FIG. 1 actually wants, which takes additional time. In addition, application program 125 of FIG. 1 would then have to locate the desired data within image object 405 of FIGS. 4-7 and 9-11 (again taking time), and then discard all the undesired data from image object 405 of FIGS. 4-7 and 9-11 (using temporary storage). Modifying KV-SSD 120 of FIG. 1 to isolate the desired data from image object 405 of FIGS. 4-7 and 9-11 before transmitting anything to application program 125 of FIG. 1 saves application program 125 of FIG. 1 from having to do undesired data filtering and reduces transmission time. KV-SSD 120 of FIG. 1 may perform this data extraction from image object 405 of FIGS. 4-7 and 9-11 in any desired manner: for example, by using in-storage computing capability of KV-SSD 120 of FIG. 1 if such exists.

Seventh, in a storage system such as storage system 2005 of FIG. 20, images may be stored on any of a number of storage devices, rather than all being stored on a single storage device. The storage devices may be organized into different storage tiers offering different levels of performance. By using metadata storage 2125 of FIG. 21, storage system 2005 of FIG. 20 may quickly identify which storage device (or at least, which storage tier) stores the image, without the application having to search each storage device separately or keep track of which storage device stores the image. Embodiments of the inventive concept may also extend to storing different versions of the same image on different storage devices, to try and optimize image retrieval.

Eighth, image in storage system 2005 of FIG. 20 may be migrated between the different storage tiers. By migrating images between storage tiers, images that are accessed more frequently may be returned more quickly than images that are accessed less frequently. This arrangement takes advantage of faster storage devices without using those storage devices until full to capacity and ignoring other (slower) storage devices that may be available.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein. The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage system, comprising:
  a plurality of storage tiers, each storage tier including at least one storage device, each of the at least one storage device including a storage and a controller;
  a metadata storage to store a first metadata for a first image stored in the plurality of storage tiers, the first metadata including a first location in the plurality of storage tiers where the first image is stored;
  a receiver to receive from a host a request to access the first image;
  retrieval software that may be executed by a processor to retrieve the first image from the plurality of storage tiers responsive to the first location in the plurality of storage tiers where the first image is stored; and
  a transmitter to transmit the first image to the host.

Statement 2. An embodiment of the inventive concept includes the storage system according to statement 1, wherein each storage tier offers a performance that differs from other storage tiers.

Statement 3. An embodiment of the inventive concept includes the storage system according to statement 1, wherein the plurality of storage tiers includes a first tier that includes the metadata storage.

Statement 4. An embodiment of the inventive concept includes the storage system according to statement 1, wherein the retrieval software is operative to return a "not found" message based at least in part on the first image not being found in the metadata storage.

Statement 5. An embodiment of the inventive concept includes the storage system according to statement 1, the first metadata for the first image includes a first metadata image at a lowest resolution of the first image.

Statement 6. An embodiment of the inventive concept includes the storage system according to statement 5, further comprising conversion software that may be executed by the processor to scale the first image in the request from a first resolution to the lowest resolution.

Statement 7. An embodiment of the inventive concept includes the storage system according to statement 1, wherein the first metadata for the first image includes a metadata luma data of the first image.

Statement 8. An embodiment of the inventive concept includes the storage system according to statement 7, further comprising conversion software that may be executed by the processor to convert the first image in the request from a first image format to a YUV format.

Statement 9. An embodiment of the inventive concept includes the storage system according to statement 8, wherein the conversion software is operative to extract a luma data from the YUV format.

Statement 10. An embodiment of the inventive concept includes the storage system according to statement 7, wherein the first metadata for the first image omits a Chroma data of the first image.

Statement 11. An embodiment of the inventive concept includes the storage system according to statement 1, further comprising conversion software that may be executed by the processor to convert a first image format for the first image into a second image format for the first image.

Statement 12. An embodiment of the inventive concept includes the storage system according to statement 1, wherein:
  the first metadata for the first image includes a first probability counter for the first image; and
  the system further comprises migration software that may be executed by the processor to migrate the first image from a first storage tier in the plurality of storage tiers to a second storage tier in the plurality of storage tiers responsive to the first probability counter for the first image.

Statement 13. An embodiment of the inventive concept includes the storage system according to statement 12, wherein:

the metadata storage includes a second metadata for a second image, the second metadata including a second probability counter for the second image; and the migration software is operative to migrate the second image from the second storage tier in the plurality of storage tiers to the first storage tier in the plurality of storage tiers responsive to the second probability counter for the second image.

Statement 14. An embodiment of the inventive concept includes the storage system according to statement 12, wherein the first metadata includes a first probability counter and a second probability counter for the first image, the first probability counter associated with a first version of the first image and the second probability counter associated with a second version of the first image.

Statement 15. An embodiment of the inventive concept includes the storage system according to statement 14, wherein the plurality of storage tiers includes a first storage tier and a second storage tier, the first storage tier including the first version of the first image and the second storage tier including the second version of the first image.

Statement 16. An embodiment of the inventive concept includes the storage system according to statement 15, wherein:

the first version of the first image includes a first combination of resolution and Chroma Subsampling scheme for the first image; and the second version of the first image includes a second combination of resolution and Chroma Subsampling scheme for the first image.

Statement 17. An embodiment of the inventive concept includes the storage system according to statement 15, wherein the migration software is operative to migrate the first version of the first image independently from the second version of the first image.

Statement 18. An embodiment of the inventive concept includes the storage system according to statement 1, wherein the at least one storage device is one of a Key-Value Sold State Drive (KV-SSD), a Solid State Drive (SSD), a Small Computer System Interface (SCSI) SSD, a Serial Attached SCSI (SAS) SSD, a Serial AT Attachment (SATA) SSD, a SCSI hard disk drive, a SAS hard disk drive, a SATA hard disk drive, and a tape drive.

Statement 19. An embodiment of the inventive concept includes the storage system according to statement 1, wherein the at least one storage device includes a KV-SSD, including:

a data structure stored on the KV-SSD, the data structure including a plurality of image values for the first image, the data structure including:
 a plurality of first dimension containers to organize data in an image object for the first image according to a first dimension;
 within each of the plurality of first dimension containers, at least one image value storing image data for the image object for the first image at a resolution and a Chroma Subsampling scheme.

Statement 20. An embodiment of the inventive concept includes the storage system according to statement 19, wherein the data structure further comprises:

a plurality of second dimension containers to organize data in the image object for the first image according to a second dimension;
within each of the plurality of second dimension containers, at least one pointer to the at least one image value storing the image object at the resolution and the Chroma Subsampling scheme, wherein the second dimension is different from the first dimension.

Statement 21. An embodiment of the inventive concept includes the storage system according to statement 1, wherein the metadata storage includes either volatile storage or non-volatile storage.

Statement 22. An embodiment of the inventive concept includes a method, comprising:

receiving, from a host, at a storage system, a request to access a first image;
searching a metadata storage for a first metadata for the first image;
accessing from the first metadata a first location in a plurality of storage tiers where the first image is stored, each storage tier including at least one storage device, each of the at least one storage device including a storage and a controller;
retrieving the first image from the first location in the plurality of storage tiers; and
returning, to the host, the first image.

Statement 23. An embodiment of the inventive concept includes the method according to statement 22, wherein the plurality of storage tiers includes a first storage tier including the metadata storage.

Statement 24. An embodiment of the inventive concept includes the method according to statement 22, further comprising returning, to the host, a "not found" message based at least in part on the first image not being found in the metadata storage.

Statement 25. An embodiment of the inventive concept includes the method according to statement 22, wherein searching a metadata storage for a first metadata for the first image includes comparing the first image with a first metadata image in the first metadata for the first image.

Statement 26. An embodiment of the inventive concept includes the method according to statement 25, wherein:

the first metadata image in the first metadata for the first image is at a lowest resolution; and comparing the first image with a first metadata image in the first metadata for the first image includes:
 scaling the first image down to a lowest resolution first image; and
 comparing the lowest resolution first image with the first metadata image in the first metadata for the first image.

Statement 27. An embodiment of the inventive concept includes the method according to statement 25, wherein the first metadata image in the first metadata for the first image includes a first metadata Chroma image in the first metadata for the first image; and comparing the first image with a first metadata image in the first metadata for the first image includes:
 converting the first image from a first image format to converted first image in a YUV format; and
 comparing the converted first image in the YUV format with the first metadata Chroma image in the first metadata for the first image.

Statement 28. An embodiment of the inventive concept includes the method according to statement 27, wherein:

the first metadata image in the first metadata for the first image includes a first metadata luma data in the first metadata for the first image;

converting the first image from a first image format to converted first image in a YUV format includes extracting a first luma data from the converted first image in the YUV format; and comparing the converted first image in the YUV format with the first metadata Chroma image in the first metadata for the first image includes comparing the first luma data with the first metadata luma data in the first metadata for the first image.

Statement 29. An embodiment of the inventive concept includes the method according to statement 22, wherein returning, to the host, the first image includes:
converting a first image format for the first image into a second image format for the first image; and
returning, to the host, the second image format for the first image.

Statement 30. An embodiment of the inventive concept includes the method according to statement 22, wherein:
the first metadata for the first image includes a first probability counter for the first image; and
the method further comprises migrating the first image from a first storage tier in the plurality of storage tiers to a second storage tier in the plurality of storage tiers responsive to the first probability counter.

Statement 31. An embodiment of the inventive concept includes the method according to statement 30, wherein migrating the first image from a first storage tier in the plurality of storage tiers to a second storage tier in the plurality of storage tiers responsive to the first probability counter includes migrating the first image from the first storage tier in the plurality of storage tiers to the second storage tier in the plurality of storage tiers responsive to the first probability counter and a total count of all accesses to images in the storage system.

Statement 32. An embodiment of the inventive concept includes the method according to statement 30, wherein migrating the first image from a first storage tier in the plurality of storage tiers to a second storage tier in the plurality of storage tiers responsive to the first probability counter includes updating the first location in the plurality of storage tiers in the first metadata for the first image to identify the second storage tier in the plurality of storage tiers.

Statement 33. An embodiment of the inventive concept includes the method according to statement 30, wherein:
the metadata storage includes a second metadata for a second image stored in the plurality of storage tiers, the second metadata including a second location in the plurality of storage tiers where the second image is stored and a second probability counter for the second image; and
the method further comprises migrating the second image from the second storage tier in the plurality of storage tiers to the first storage tier in the plurality of storage tiers responsive to the second probability counter.

Statement 34. An embodiment of the inventive concept includes the method according to statement 30, further comprising updating the first probability counter whenever an image in the storage system is accessed.

Statement 35. An embodiment of the inventive concept includes the method according to statement 34, wherein updating the first probability counter whenever an image in the storage system is accessed includes incrementing the first probability counter when the first image is accessed.

Statement 36. An embodiment of the inventive concept includes the method according to statement 34, wherein updating the first probability counter whenever an image in the storage system is accessed includes decrementing the first probability counter when a second image is accessed.

Statement 37. An embodiment of the inventive concept includes the method according to statement 30, further comprising incrementing the first probability counter when the first image is accessed.

Statement 38. An embodiment of the inventive concept includes the method according to statement 37, further comprising incrementing a total count of all accesses to images in the storage system.

Statement 39. An embodiment of the inventive concept includes the method according to statement 30, wherein:
the first metadata includes the first probability counter and a second probability counter for the first image, the first probability counter associated with a first version of the first image and the second probability counter associated with a second version of the first image the first version of the first image stored on the first storage tier; and
migrating the first image from a first storage tier in the plurality of storage tiers to a second storage tier in the plurality of storage tiers responsive to the first probability counter includes migrating the first version of the first image from the first storage tier in the plurality of storage tiers to the second storage tier in the plurality of storage tiers responsive to the first probability counter.

Statement 40. An embodiment of the inventive concept includes the method according to statement 39, wherein migrating the first version of the first image from the first storage tier in the plurality of storage tiers to the second storage tier in the plurality of storage tiers responsive to the first probability counter includes migrating the first version of the first image from the first storage tier in the plurality of storage tiers to the second storage tier in the plurality of storage tiers responsive to the first probability counter without migrating the second version of the first image in the plurality of storage tiers.

Statement 41. An embodiment of the inventive concept includes the method according to statement 39, wherein:
the first version of the first image includes a first combination of resolution and Chroma Subsampling scheme for the first image; and
the second version of the first image includes a second combination of resolution and Chroma Subsampling scheme for the first image.

Statement 42. An embodiment of the inventive concept includes the method according to statement 39, wherein the plurality of storage tiers includes a third storage tier including the second version of the first image.

Statement 43. An embodiment of the inventive concept includes the method according to statement 22, wherein:
the metadata storage includes the first location in the plurality of storage tiers where a first version of the first image is stored and a second location in the plurality of storage tiers where a second version of the first image is stored; and
retrieving the first image from the first location in the plurality of storage tiers includes:
retrieving the first version of the first image from the first storage tier based at least in part on the request requesting the first version of the first image; and
retrieving the second version of the first image from the second storage tier based at least in part on the request requesting the second version of the first image.

Statement 44. An embodiment of the inventive concept includes the method according to statement 22, wherein:
the request to access a first image includes an information; and
retrieving the first image from the first location in the plurality of storage tiers includes:
using a container in the information to attempt to identify a dimension container containing at least one image value storing the first image at a resolution using a Chroma Subsampling in an image object on a Key- Value Solid State Drive (KV-SSD), the dimension container storing a subset of data in the image object according to a first dimension;

using a key in the information to identify a desired value of the at least one image value in the image object on the KV-SSD; and based at least in part on the desired value being stored in the image object on the KV-SSD;

retrieving the desired value from the image object on the KV-SSD; and returning the desired value from the KV-SSD to the application program, wherein the image object includes a plurality of dimension containers to organize the at least one image value according to the first dimension, and wherein an undesired value from the image object is not returned from the KV-SSD.

Statement 45. An embodiment of the inventive concept includes a method comprising:

receiving, from a host, at a storage system, a request to store an image;

selecting a first storage tier in a plurality of storage tiers to store the image;

storing the image in the first storage tier; and storing a metadata for the image in the metadata storage.

Statement 46. An embodiment of the inventive concept includes the method according to statement 45, further comprising returning a second result to the host.

Statement 47. An embodiment of the inventive concept includes the method according to statement 45, wherein storing the metadata for the image in the metadata storage includes storing a lowest resolution of the image in the metadata for the image.

Statement 48. An embodiment of the inventive concept includes the method according to statement 45, wherein storing the metadata for the image in the metadata storage includes:

converting the image from a first image format to a YUV format; and storing the image in the YUV format in the metadata for the image.

Statement 49. An embodiment of the inventive concept includes the method according to statement 48, wherein:

converting the image from a first image format to a YUV format includes extracting first metadata luma data from the image in the YUV format; and storing the image in the YUV format in the metadata for the image includes storing the metadata luma data format in the metadata for the image.

Statement 50. An embodiment of the inventive concept includes the method according to statement 49, wherein storing the metadata luma data format in the metadata for the image includes omitting a first metadata Chroma data from the metadata for the image.

Statement 51. An embodiment of the inventive concept includes the method according to statement 45, wherein storing the metadata for the image in the metadata storage includes initializing a first probability counter for the image in the metadata.

Statement 52. An embodiment of the inventive concept includes the method according to statement 45, wherein storing the metadata for the image in the metadata storage includes storing a location for the image in the metadata.

Statement 53. An embodiment of the inventive concept includes the method according to statement 52, wherein the location includes an identifier of a storage device storing the image.

Statement 54. An embodiment of the inventive concept includes the method according to statement 53, wherein the location includes one of an address where the image is stored on the storage device and a key identifying the image on the storage device.

Statement 55. An embodiment of the inventive concept includes the method according to statement 53, wherein the location includes an identifier of the first storage tier storing the image.

Statement 56. An embodiment of the inventive concept includes an article, comprising a non-transitory storage medium, the non-transitory storage medium having stored thereon instructions that, when executed by a machine, result in:

receiving, from a host, at a storage system, a request to access a first image;

searching a metadata storage for a first metadata for the first image;

accessing from the first metadata a first location in a plurality of storage tiers where the first image is stored, each storage tier including at least one storage device, each of the at least one storage device including a storage and a controller;

retrieving the first image from the first location in the plurality of storage tiers; and returning, to the host, the first image.

Statement 57. An embodiment of the inventive concept includes the article according to statement 56, wherein the plurality of storage tiers includes a first storage tier including the metadata storage.

Statement 58. An embodiment of the inventive concept includes the article according to statement 56, the non-transitory storage medium having stored thereon further instructions that, when executed by the machine, result in returning, to the host, a "not found" message based at least in part on the first image not being found in the metadata storage.

Statement 59. An embodiment of the inventive concept includes the article according to statement 56, wherein searching a metadata storage for a first metadata for the first image includes comparing the first image with a first metadata image in the first metadata for the first image.

Statement 60. An embodiment of the inventive concept includes the article according to statement 59, wherein:

the first metadata image in the first metadata for the first image is at a lowest resolution; and comparing the first image with a first metadata image in the first metadata for the first image includes:

scaling the first image down to a lowest resolution first image; and comparing the lowest resolution first image with the first metadata image in the first metadata for the first image.

Statement 61. An embodiment of the inventive concept includes the article according to statement 59, wherein the first metadata image in the first metadata for the first image includes a first metadata Chroma image in the first metadata for the first image; and comparing the first image with a first metadata image in the first metadata for the first image includes:

converting the first image from a first image format to converted first image in a YUV format; and comparing the converted first image in the YUV format with the first metadata Chroma image in the first metadata for the first image.

Statement 62. An embodiment of the inventive concept includes the article according to statement 61, wherein:

the first metadata image in the first metadata for the first image includes a first metadata luma data in the first metadata for the first image;

converting the first image from a first image format to converted first image in a YUV format includes extracting a first luma data from the converted first image in the YUV format; and comparing the converted first image in the YUV format with the first metadata Chroma image in the first metadata for the first image includes comparing the first luma data with the first metadata luma data in the first metadata for the first image.

Statement 63. An embodiment of the inventive concept includes the article according to statement 56, wherein returning, to the host, the first image includes:

converting a first image format for the first image into a second image format for the first image; and returning, to the host, the second image format for the first image.

Statement 64. An embodiment of the inventive concept includes the article according to statement 56, wherein:

the first metadata for the first image includes a first probability counter for the first image; and the article further comprises migrating the first image from a first storage tier in the plurality of storage tiers to a second storage tier in the plurality of storage tiers responsive to the first probability counter.

Statement 65. An embodiment of the inventive concept includes the article according to statement 64, wherein migrating the first image from a first storage tier in the plurality of storage tiers to a second storage tier in the plurality of storage tiers responsive to the first probability counter includes migrating the first image from the first storage tier in the plurality of storage tiers to the second storage tier in the plurality of storage tiers responsive to the first probability counter and a total count of all accesses to images in the storage system.

Statement 66. An embodiment of the inventive concept includes the article according to statement 64, wherein migrating the first image from a first storage tier in the plurality of storage tiers to a second storage tier in the plurality of storage tiers responsive to the first probability counter includes updating the first location in the plurality of storage tiers in the first metadata for the first image to identify the second storage tier in the plurality of storage tiers.

Statement 67. An embodiment of the inventive concept includes the article according to statement 64, wherein:

the metadata storage includes a second metadata for a second image stored in the plurality of storage tiers, the second metadata including a second location in the plurality of storage tiers where the second image is stored and a second probability counter for the second image; and the article further comprises migrating the second image from the second storage tier in the plurality of storage tiers to the first storage tier in the plurality of storage tiers responsive to the second probability counter.

Statement 68. An embodiment of the inventive concept includes the article according to statement 64, the non-transitory storage medium having stored thereon further instructions that, when executed by the machine, result in updating the first probability counter whenever an image in the storage system is accessed.

Statement 69. An embodiment of the inventive concept includes the article according to statement 68, wherein updating the first probability counter whenever an image in the storage system is accessed includes incrementing the first probability counter when the first image is accessed.

Statement 70. An embodiment of the inventive concept includes the article according to statement 68, wherein updating the first probability counter whenever an image in the storage system is accessed includes decrementing the first probability counter when a second image is accessed.

Statement 71. An embodiment of the inventive concept includes the article according to statement 64, the non-transitory storage medium having stored thereon further instructions that, when executed by the machine, result in incrementing the first probability counter when the first image is accessed.

Statement 72. An embodiment of the inventive concept includes the article according to statement 71, the non-transitory storage medium having stored thereon further instructions that, when executed by the machine, result in updating a total count of all accesses to images in the storage system.

Statement 73. An embodiment of the inventive concept includes the article according to statement 64, wherein:

the first metadata includes the first probability counter and a second probability counter for the first image, the first probability counter associated with a first version of the first image and the second probability counter associated with a second version of the first image the first version of the first image stored on the first storage tier; and migrating the first image from a first storage tier in the plurality of storage tiers to a second storage tier in the plurality of storage tiers responsive to the first probability counter includes migrating the first version of the first image from the first storage tier in the plurality of storage tiers to the second storage tier in the plurality of storage tiers responsive to the first probability counter.

Statement 74. An embodiment of the inventive concept includes the article according to statement 73, wherein migrating the first version of the first image from the first storage tier in the plurality of storage tiers to the second storage tier in the plurality of storage tiers responsive to the first probability counter includes migrating the first version of the first image from the first storage tier in the plurality of storage tiers to the second storage tier in the plurality of storage tiers responsive to the first probability counter without migrating the second version of the first image in the plurality of storage tiers.

Statement 75. An embodiment of the inventive concept includes the article according to statement 73, wherein:

the first version of the first image includes a first combination of resolution and Chroma Subsampling scheme for the first image; and the second version of the first image includes a second combination of resolution and Chroma Subsampling scheme for the first image.

Statement 76. An embodiment of the inventive concept includes the article according to statement 73, wherein the plurality of storage tiers includes a third storage tier including the second version of the first image.

Statement 77. An embodiment of the inventive concept includes the article according to statement 56, wherein:

the metadata storage includes the first location in the plurality of storage tiers where a first version of the first image is stored and a second location in the plurality of storage tiers where a second version of the first image is stored; and retrieving the first image from the first location in the plurality of storage tiers includes:

retrieving the first version of the first image from the first storage tier based at least in part on the request requesting the first version of the first image; and
retrieving the second version of the first image from the second storage tier based at least in part on the request requesting the second version of the first image.

Statement 78. An embodiment of the inventive concept includes the article according to statement 56, wherein:
the request to access a first image includes an information; and
retrieving the first image from the first location in the plurality of storage tiers includes:
using a container in the information to attempt to identify a dimension container containing at least one image value storing the first image at a resolution using a Chroma Subsampling in an image object on a Key-Value Solid State Drive (KV-SSD), the dimension container storing a subset of data in the image object according to a first dimension;
using a key in the information to identify a desired value of the at least one image value in the image object on the KV-SSD; and
based at least in part on the desired value being stored in the image object on the KV-SSD:
retrieving the desired value from the image object on the KV-SSD; and
returning the desired value from the KV-SSD to the application program,
wherein the image object includes a plurality of dimension containers to organize the at least one image value according to the first dimension, and
wherein an undesired value from the image object is not returned from the KV-SSD.

Statement 79. An embodiment of the inventive concept includes an article, comprising a non-transitory storage medium, the non-transitory storage medium having stored thereon instructions that, when executed by a machine, result in:
receiving, from a host, at a storage system, a request to store an image;
selecting a first storage tier in a plurality of storage tiers to store the image;
storing the image in the first storage tier; and
storing a metadata for the image in the metadata storage.

Statement 80. An embodiment of the inventive concept includes the article according to statement 79, the non-transitory storage medium having stored thereon further instructions that, when executed by the machine, result in returning a second result to the host.

Statement 81. An embodiment of the inventive concept includes the article according to statement 79, wherein storing the metadata for the image in the metadata storage includes storing a lowest resolution of the image in the metadata for the image.

Statement 82. An embodiment of the inventive concept includes the article according to statement 79, wherein storing the metadata for the image in the metadata storage includes:
converting the image from a first image format to a YUV format; and
storing the image in the YUV format in the metadata for the image.

Statement 83. An embodiment of the inventive concept includes the article according to statement 82, wherein:
converting the image from a first image format to a YUV format includes extracting first metadata luma data from the image in the YUV format; and
storing the image in the YUV format in the metadata for the image includes storing the metadata luma data format in the metadata for the image.

Statement 84. An embodiment of the inventive concept includes the article according to statement 83, wherein storing the metadata luma data format in the metadata for the image includes omitting a first metadata Chroma data from the metadata for the image.

Statement 85. An embodiment of the inventive concept includes the article according to statement 79, wherein storing the metadata for the image in the metadata storage includes initializing a first probability counter for the image in the metadata.

Statement 86. An embodiment of the inventive concept includes the article according to statement 79, wherein storing the metadata for the image in the metadata storage includes storing a location for the image in the metadata.

Statement 87. An embodiment of the inventive concept includes the article according to statement 86, wherein the location includes an identifier of a storage device storing the image.

Statement 88. An embodiment of the inventive concept includes the article according to statement 87, wherein the location includes one of an address where the image is stored on the storage device and a key identifying the image on the storage device.

Statement 89. An embodiment of the inventive concept includes the article according to statement 87, wherein the location includes an identifier of the first storage tier storing the image.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage system, comprising:
a first storage tier and a second storage tier, the first storage tier including a first storage device including a first storage and a first controller, the second storage tier including a second storage device including a second storage and a second controller;
a metadata storage to store a metadata for a data stored in the first storage tier, the metadata including a location in the first storage tier where the data is stored;
a receiver to receive from a host a request to access the data;
retrieval software to be executed by a processor to retrieve the data from the first storage tier based at least in part on the location in the first storage tier where the data is stored; and
a transmitter to transmit the data to the host.

2. The storage system according to claim 1, wherein:
the metadata for the data includes a probability counter for the data; and
the system further comprises migration software to be executed by the processor to migrate the data from the first storage tier to the second storage tier based at least in part on the probability counter for the data.

3. The storage system according to claim 2, wherein the metadata includes the probability counter and a second probability counter for the data, the probability counter associated with a first version of the data and the second probability counter associated with a second version of the data.

4. The storage system according to claim 3, wherein the first storage tier includes the first version of the data and the second storage tier includes the second version of the data.

5. The storage system according to claim 4, wherein the migration software is operative to migrate the first version of the data independently from the second version of the data.

6. The storage system according to claim 1, wherein the at least one storage device includes a Key-Value Solid State Drive (KV-SSD), including:
 a data structure stored on the KV-SSD, the data structure including at least a first value for the data and a second value for the data, the data structure including:
 a first dimension container to organize the data according to a first dimension; and
 a second dimension container to organize the data according to a second dimension.

7. The storage system according to claim 6, wherein:
the first dimension container includes the first value; and
the second dimension container includes the second value.

8. A method, comprising:
receiving, from a host, at a storage system, a request to access a data;
searching a metadata storage for a metadata for the data;
accessing from the metadata a location in a first storage tier where the data is stored, the first storage tier including a first storage device including a first storage and a first controller;
retrieving the data from the location in the first storage tier; and
returning the data to the host,
wherein the storage system includes a second storage tier including a second storage device, the second storage device including a second storage and a second controller.

9. The method according to claim 8, wherein searching a metadata storage for a metadata for the data includes comparing the data with the metadata for the data.

10. The method according to claim 8, wherein:
the metadata for the data includes a probability counter for the data; and
the method further comprises migrating the data from the first storage tier to the second storage tier based at least in part on the probability counter.

11. The method according to claim 10, wherein migrating the data from the first storage tier to the second storage tier based at least in part on the probability counter includes updating the location in the metadata for the data to identify the second storage tier.

12. The method according to claim 10, further comprising incrementing the probability counter when the data is accessed.

13. The method according to claim 12, further comprising incrementing a total count of all accesses to data in the storage system.

14. The method according to claim 8, wherein:
the metadata storage includes the location in the first storage tier where a first version of the data is stored and a second location in the second storage tier where a second version of the first data is stored; and
retrieving the data from the location in the first storage tier includes:
retrieving the first version of the data from the first storage tier based at least in part on the request requesting the first version of the data; and
retrieving the second version of the first data from the second storage tier based at least in part on the request requesting the second version of the data.

15. The method according to claim 8, wherein:
the request to access a data includes an information; and
retrieving the data from the location in the first storage tier includes:
using a container in the information to attempt to identify a dimension container containing a value storing a version of the data in an object on a Key-Value Solid State Drive (KV-SSD), the dimension container storing a subset of the data in the object according to a dimension;
using a key in the information to identify a desired value of the value in the object on the KV-SSD; and
based at least in part on the desired value being stored in the object on the KV-SSD:
retrieving the desired value from the object on the KV-SSD; and
returning the desired value from the KV-SSD to an application program,
wherein the object includes the first dimension container and a second dimension container to organize the value according to the first dimension.

16. A method comprising:
receiving, from a host, at a storage system, a request to store a data;
selecting a first storage tier from the first storage tier and a second storage tier to store the data;
storing the data in the first storage tier;
storing a metadata for the data in a metadata storage;
initializing a probability counter for a first version of the data in the metadata; and
initializing a second probability counter for a second version of the data in the metadata.

17. A method comprising:
receiving, from a host, at a storage system, a request to store a data;
selecting a first storage tier from the first storage tier and a second storage tier to store the data;
selecting a dimension container to store the data;
storing the data using the dimension container in the first storage tier;
storing a metadata for the data in a metadata storage; and
initializing a probability counter for the data in the metadata.

* * * * *